(12) United States Patent
Conrad et al.

(10) Patent No.: US 10,465,825 B2
(45) Date of Patent: Nov. 5, 2019

(54) METHOD OF JOINING PIPES AND FITTINGS WITH MECHANICAL RESTRAINT MEMBERS

(71) Applicant: Omachron Intellectual Property Inc., Hampton (CA)

(72) Inventors: Wayne Ernest Conrad, Hampton (CA); Dave Petersen, Bowmanville (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 480 days.

(21) Appl. No.: 15/130,491

(22) Filed: Apr. 15, 2016

(65) Prior Publication Data
US 2016/0305583 A1 Oct. 20, 2016

(30) Foreign Application Priority Data
Apr. 16, 2015 (CA) .................................. 2888402

(51) Int. Cl.
*F16L 13/11* (2006.01)
*F16L 13/10* (2006.01)

(52) U.S. Cl.
CPC ........... *F16L 13/116* (2013.01); *F16L 13/103* (2013.01)

(58) Field of Classification Search
CPC ......... F16L 13/10; F16L 13/11; F16L 13/103; F16L 13/113; F16L 13/116; F16L 25/14; F16L 13/06
See application file for complete search history.

(56) References Cited

U.S. PATENT DOCUMENTS

| 365,425 | A | * | 6/1887 | Barclay ................. F16L 13/06 285/148.8 |
|---|---|---|---|---|
| 2,052,394 | A | | 8/1936 | Fullman |
| 2,961,363 | A | | 11/1960 | Lowes |
| 3,307,997 | A | | 3/1967 | Sherman |
| 3,475,239 | A | | 10/1969 | Fearon et al. |
| 3,663,335 | A | | 5/1972 | Sheedy |
| 3,751,308 | A | | 8/1973 | Bishop et al. |
| 3,847,694 | A | | 11/1974 | Stewing |
| 3,854,756 | A | | 12/1974 | Couch |
| 3,920,270 | A | | 11/1975 | Babb |
| 3,929,538 | A | | 12/1975 | Diebel |

(Continued)

FOREIGN PATENT DOCUMENTS

| CA | 2022840 C | 2/1991 |
|---|---|---|
| CA | 2094492 A1 | 5/1992 |

(Continued)

*Primary Examiner* — Jacob J Cigna
*Assistant Examiner* — Kyle A Cook
(74) *Attorney, Agent, or Firm* — Philip C. Mendes da Costa; Bereskin & Parr LLP/S.E.N.C.R.L., s.r.l.

(57) ABSTRACT

A method for joining a first conduit section having a longitudinally extending open first end and an inner surface with a second conduit section having a longitudinally extending end and an outer surface is provided. The method comprises:
a) inserting a first end of the second conduit section in the open first end of the first conduit section and forming a fluid tight seal between the first and second conduit sections; and,
b) bonding at least a portion of the inner surface of the first conduit section to at least a portion of the outer surface of the second conduit section.

14 Claims, 52 Drawing Sheets

(56) References Cited

U.S. PATENT DOCUMENTS

| | | | |
|---|---|---|---|
| 3,941,410 A | 3/1976 | Miyaoka | |
| 3,957,382 A | 5/1976 | Greuel et al. | |
| 4,132,578 A | 1/1979 | Gell | |
| 4,191,407 A | 3/1980 | Bretone | |
| 4,274,662 A | 6/1981 | De Groot et al. | |
| 4,417,754 A | 11/1983 | Yamaji et al. | |
| 4,438,954 A | 3/1984 | Hattori | |
| 4,585,607 A | 4/1986 | Krackeler et al. | |
| 4,799,714 A | 1/1989 | Collet | |
| 4,804,209 A | 2/1989 | Fischer | |
| 4,819,974 A | 4/1989 | Zeidler | |
| 4,852,914 A | 8/1989 | Lyall | |
| 4,880,579 A | 11/1989 | Murata et al. | |
| 5,071,175 A | 12/1991 | Kennedy | |
| 5,158,327 A | 10/1992 | Rowe | |
| 5,165,735 A | 11/1992 | Nardi et al. | |
| 5,182,440 A | 1/1993 | Dufour et al. | |
| 5,332,043 A | 7/1994 | Ferguson | |
| 5,351,999 A | 10/1994 | Hattori | |
| 5,431,453 A | 7/1995 | Yamashita et al. | |
| 5,443,056 A | 8/1995 | Smith et al. | |
| 5,466,916 A | 11/1995 | Iguchi et al. | |
| 5,487,411 A | 1/1996 | Goncalves | |
| 5,509,699 A | 4/1996 | Himmelberger | |
| 5,532,459 A | 7/1996 | Steinmetz et al. | |
| 5,685,577 A * | 11/1997 | Vanesky | B29C 66/5221 156/295 |
| 5,887,909 A * | 3/1999 | Tokuda | F16L 13/116 285/148.18 |
| 5,921,587 A | 7/1999 | Lueghamer | |
| 5,992,905 A | 11/1999 | Kennedy et al. | |
| 6,106,031 A | 8/2000 | Guginsky | |
| 6,173,993 B1 | 1/2001 | Shumard et al. | |
| 6,322,273 B1 | 11/2001 | Gentile, Jr. | |
| 6,328,343 B1 | 12/2001 | Hosie et al. | |
| 6,431,282 B1 | 8/2002 | Bosma et al. | |
| 6,652,690 B1 | 11/2003 | Rovira | |
| 7,266,875 B2 | 9/2007 | Longacre et al. | |
| 7,338,085 B2 | 3/2008 | Toriyabe et al. | |
| 7,341,288 B2 | 3/2008 | Lundstrom | |
| 7,997,628 B1 | 8/2011 | Smith, Jr. et al. | |
| 2002/0100540 A1 | 8/2002 | Savitski et al. | |
| 2003/0080561 A1 | 5/2003 | Martin | |
| 2004/0251575 A1 | 12/2004 | St. Onge et al. | |
| 2006/0033336 A1 * | 2/2006 | Pulver | F16B 11/006 285/417 |
| 2006/0197338 A1 | 9/2006 | Ziu et al. | |
| 2008/0257604 A1 | 10/2008 | Becker et al. | |
| 2010/0212766 A1 | 8/2010 | Kiest, Jr. | |
| 2011/0168289 A1 | 7/2011 | Kourogi et al. | |
| 2011/0197987 A1 | 8/2011 | Koravos et al. | |
| 2012/0048417 A1 | 3/2012 | Smith et al. | |
| 2016/0091131 A1 * | 3/2016 | Roach | F16L 13/116 285/285.1 |

FOREIGN PATENT DOCUMENTS

| | | |
|---|---|---|
| CA | 2109814 A1 | 1/1993 |
| CA | 2854953 A1 | 5/2013 |
| CA | 2817257 A1 | 11/2013 |
| DE | 102009061082 B4 | 5/2012 |
| WO | 2011045607 A1 | 4/2011 |

* cited by examiner

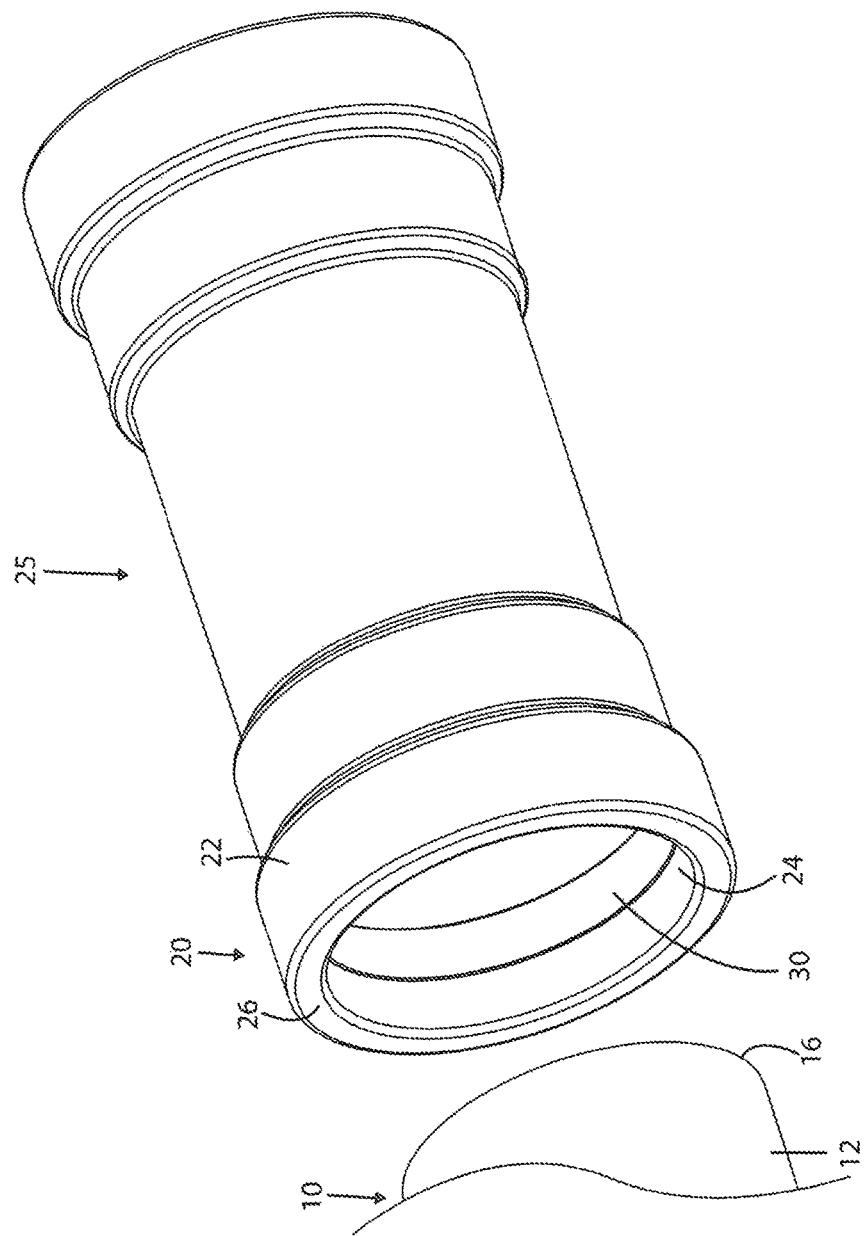

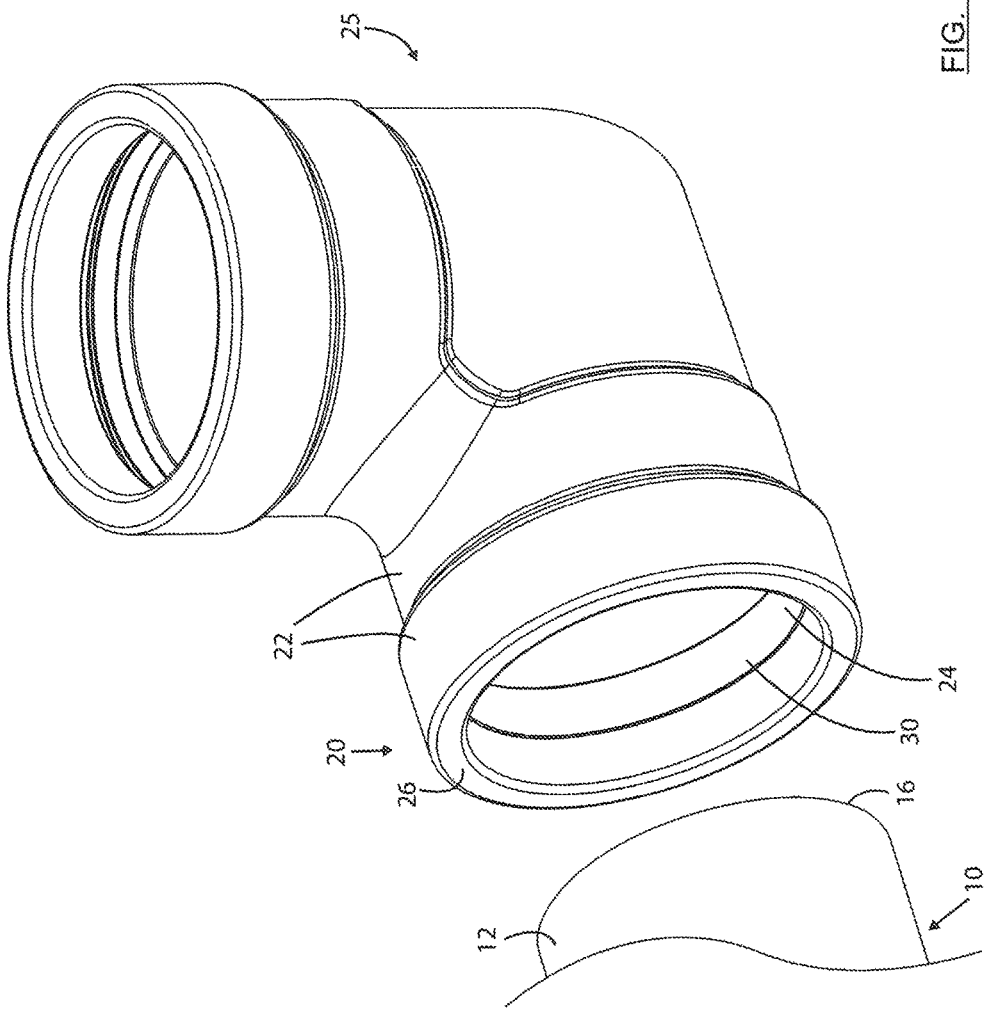

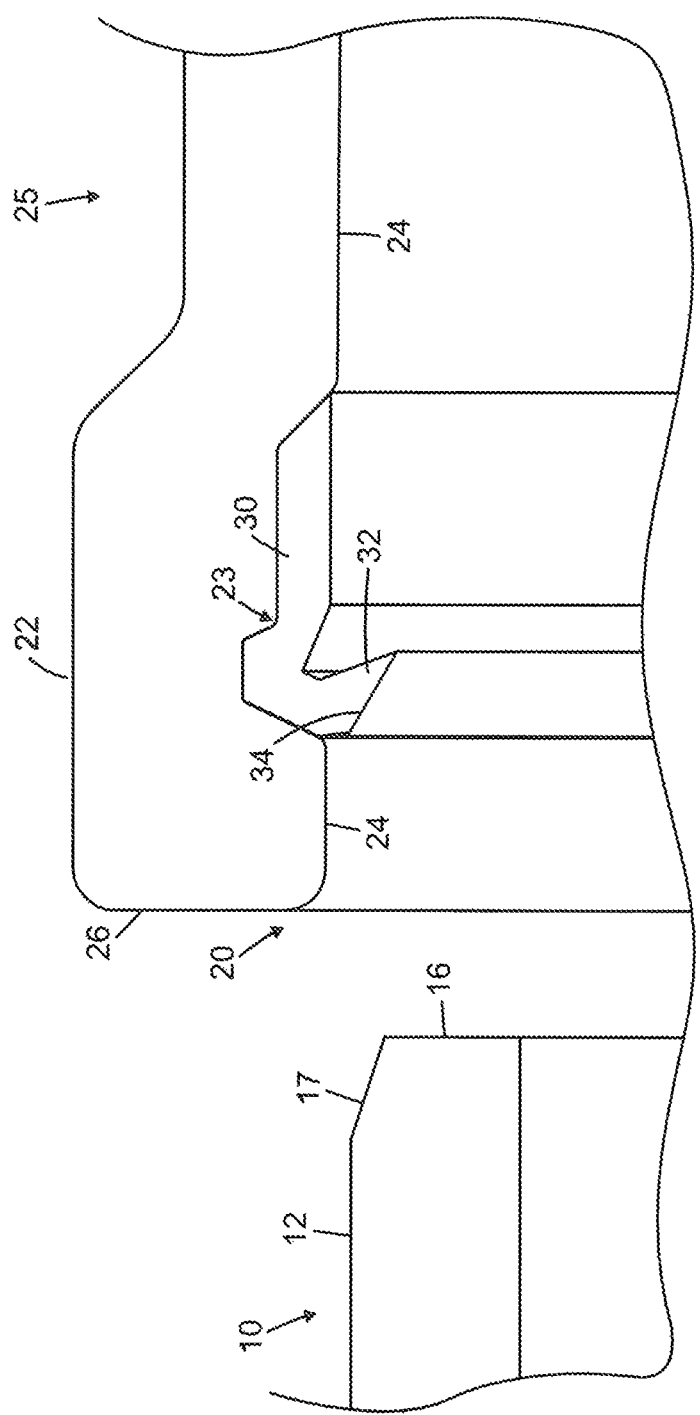

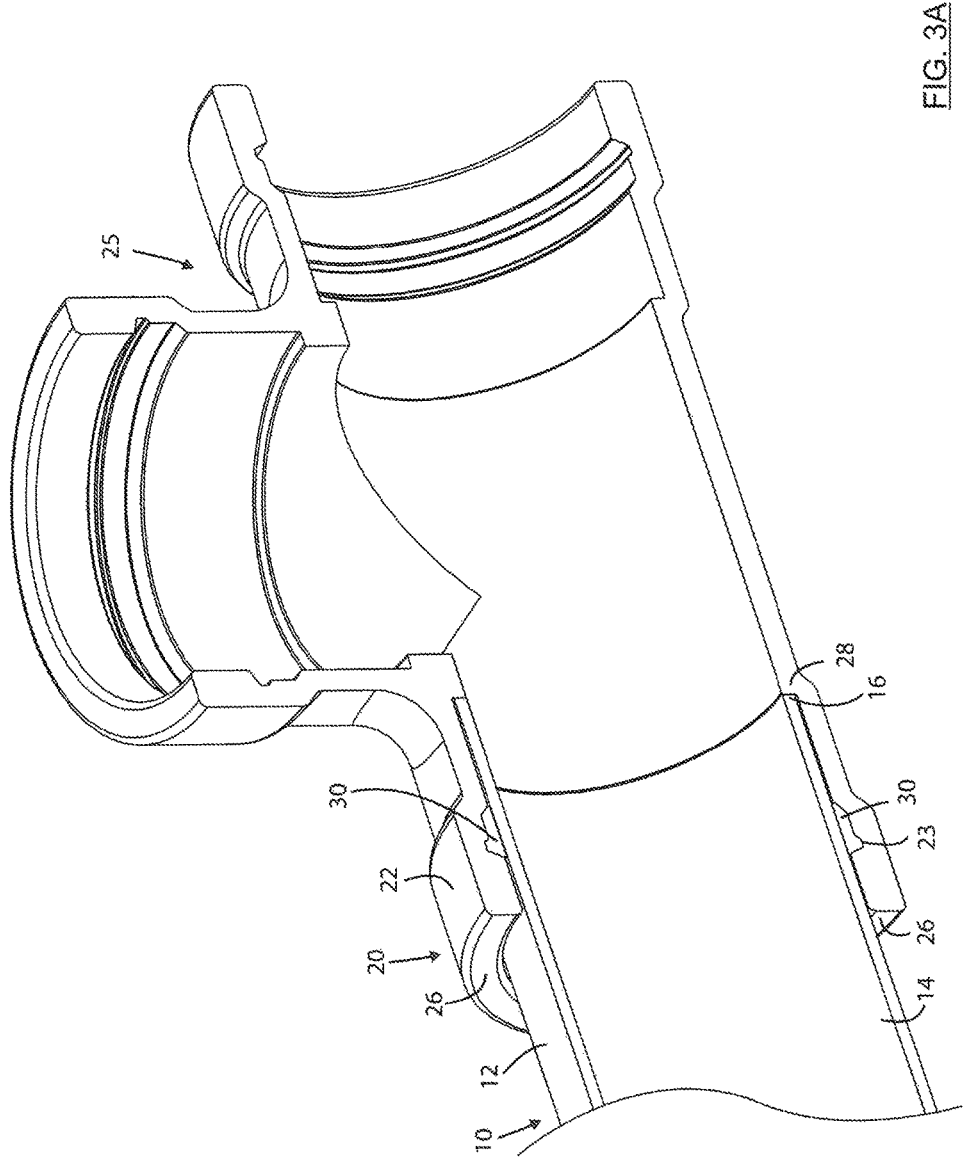

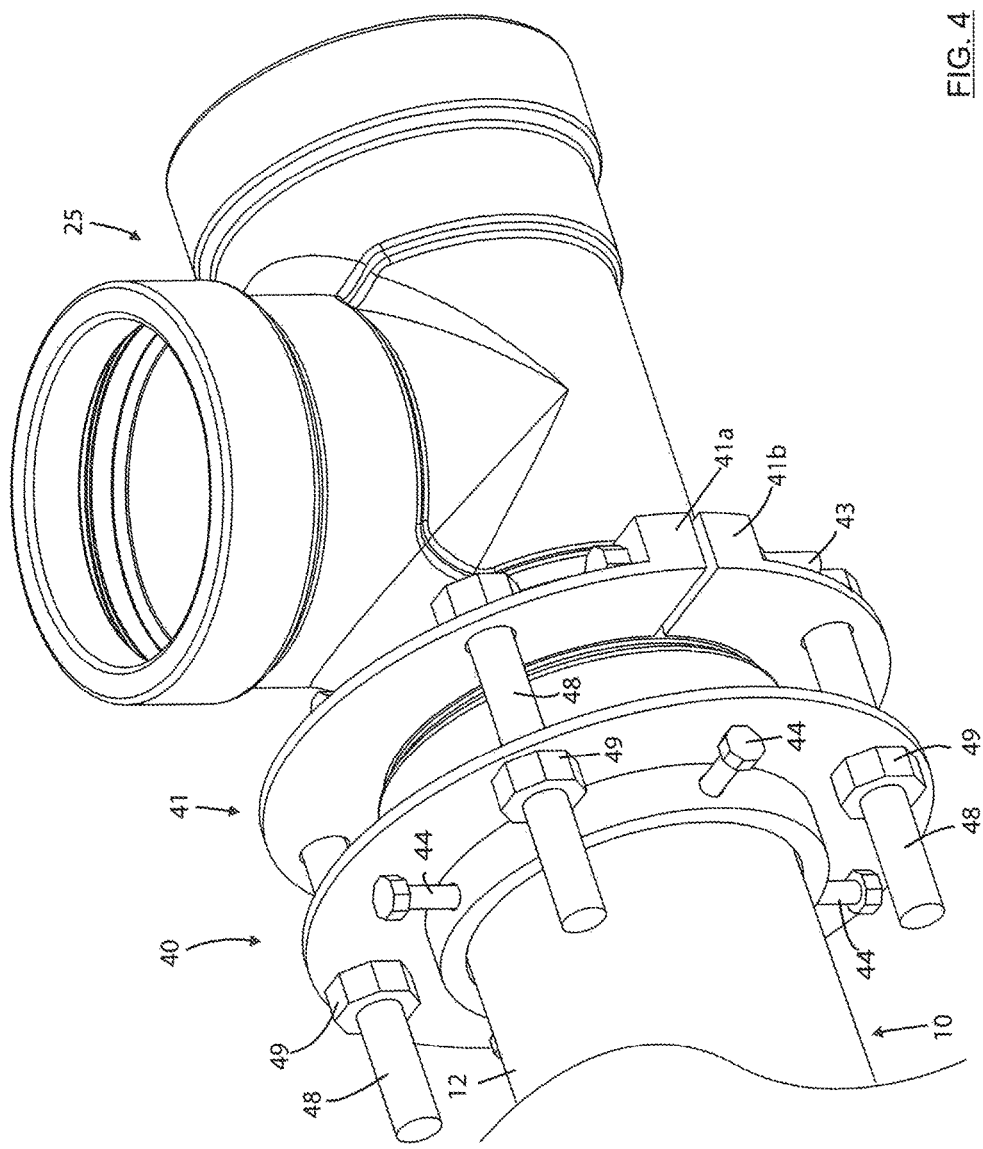

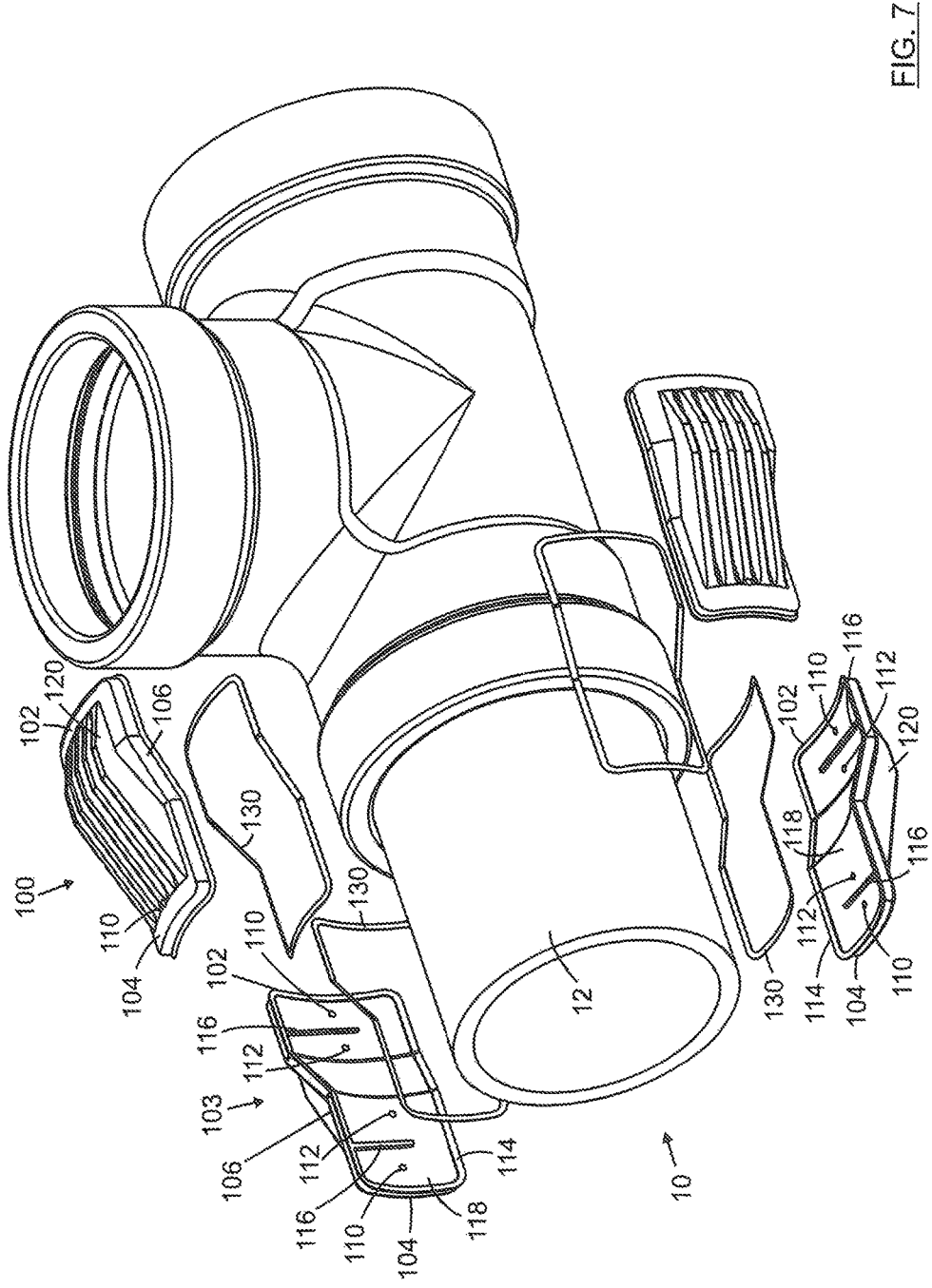

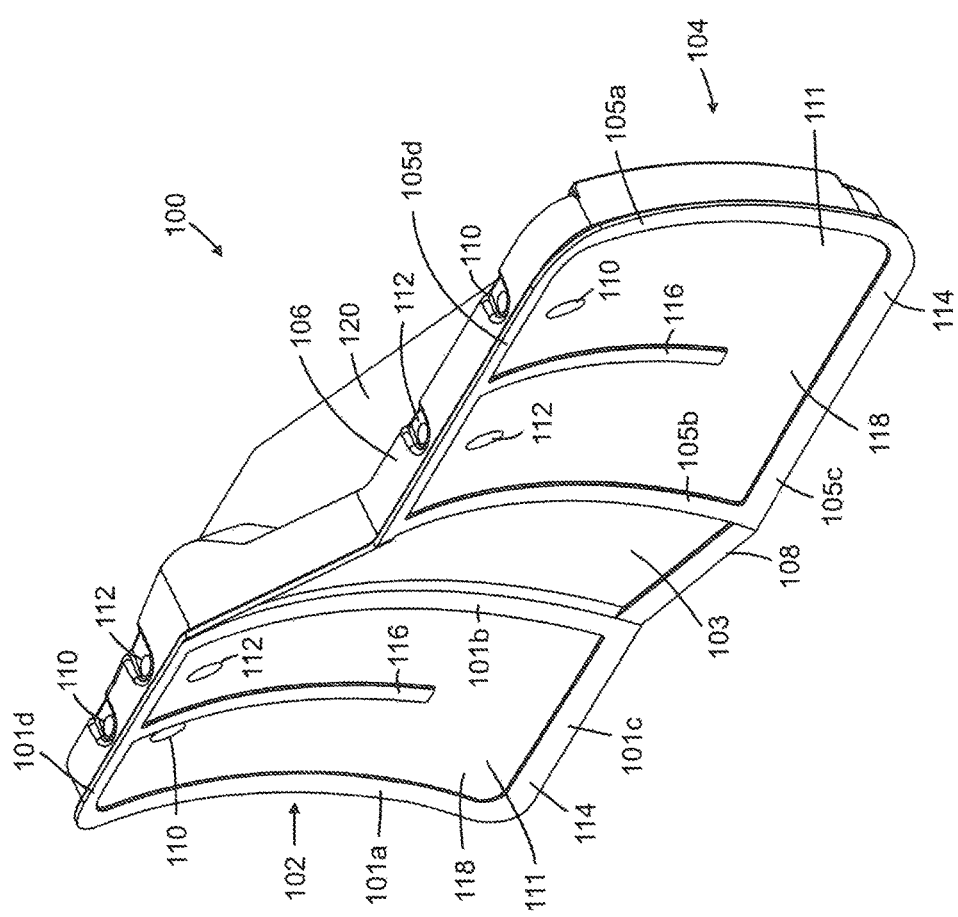

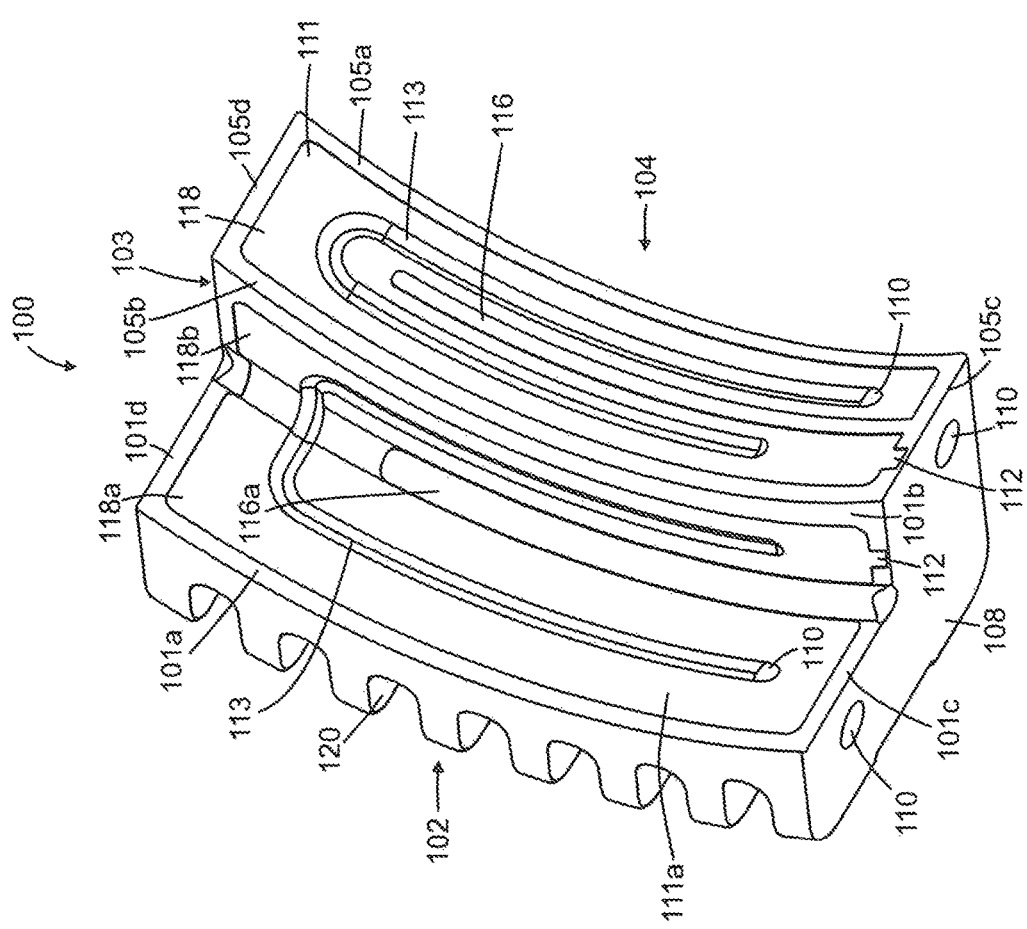

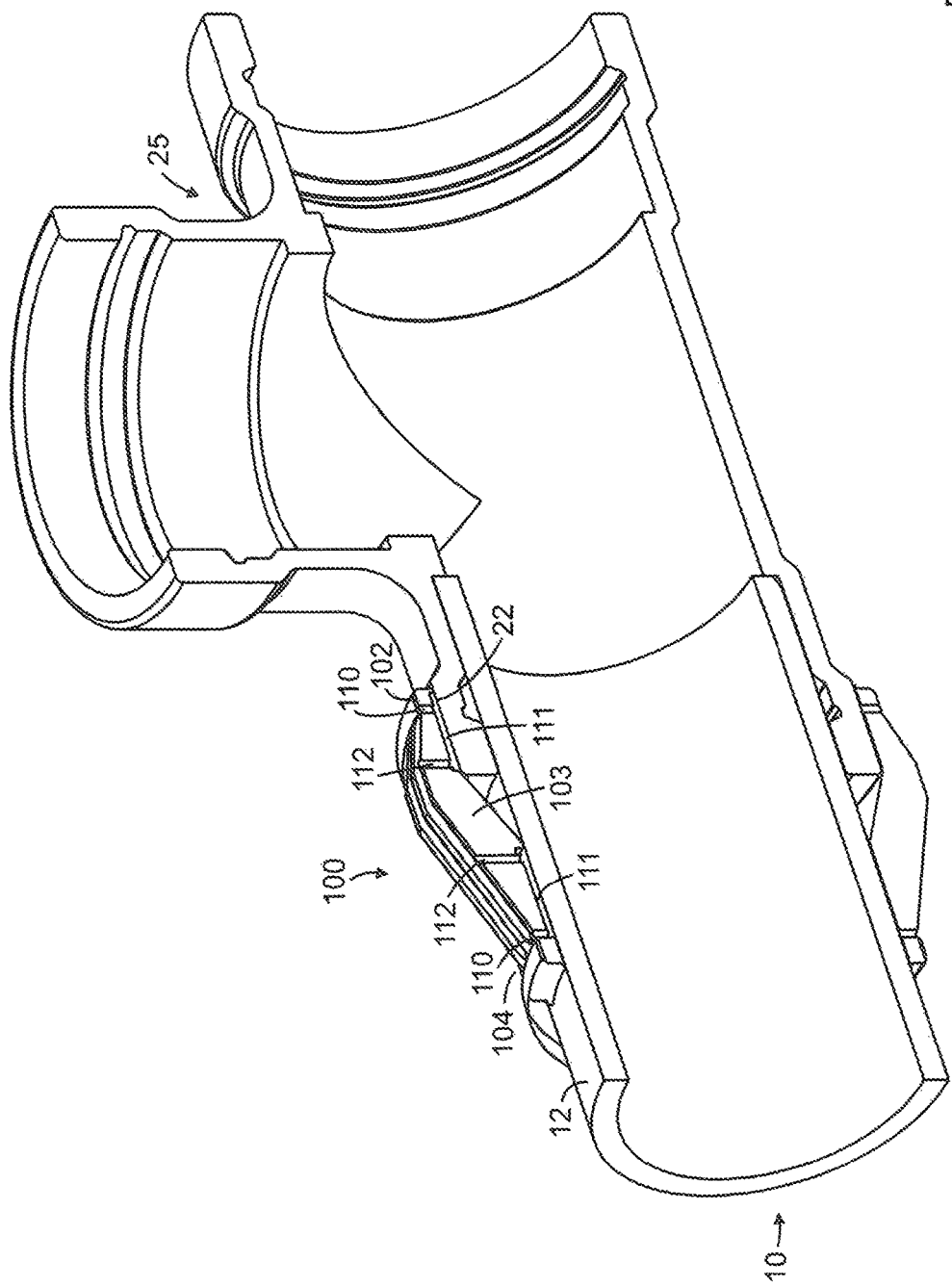

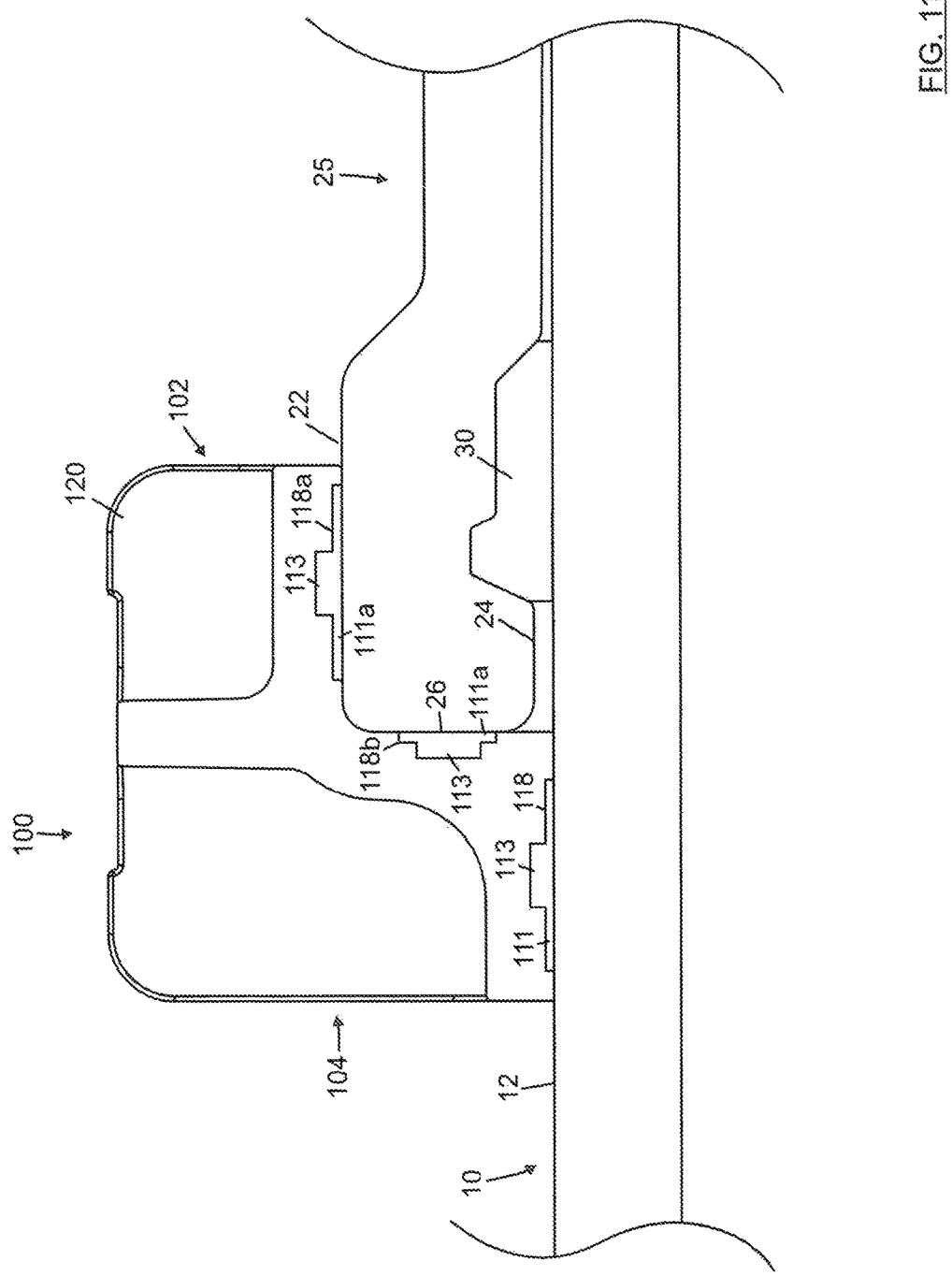

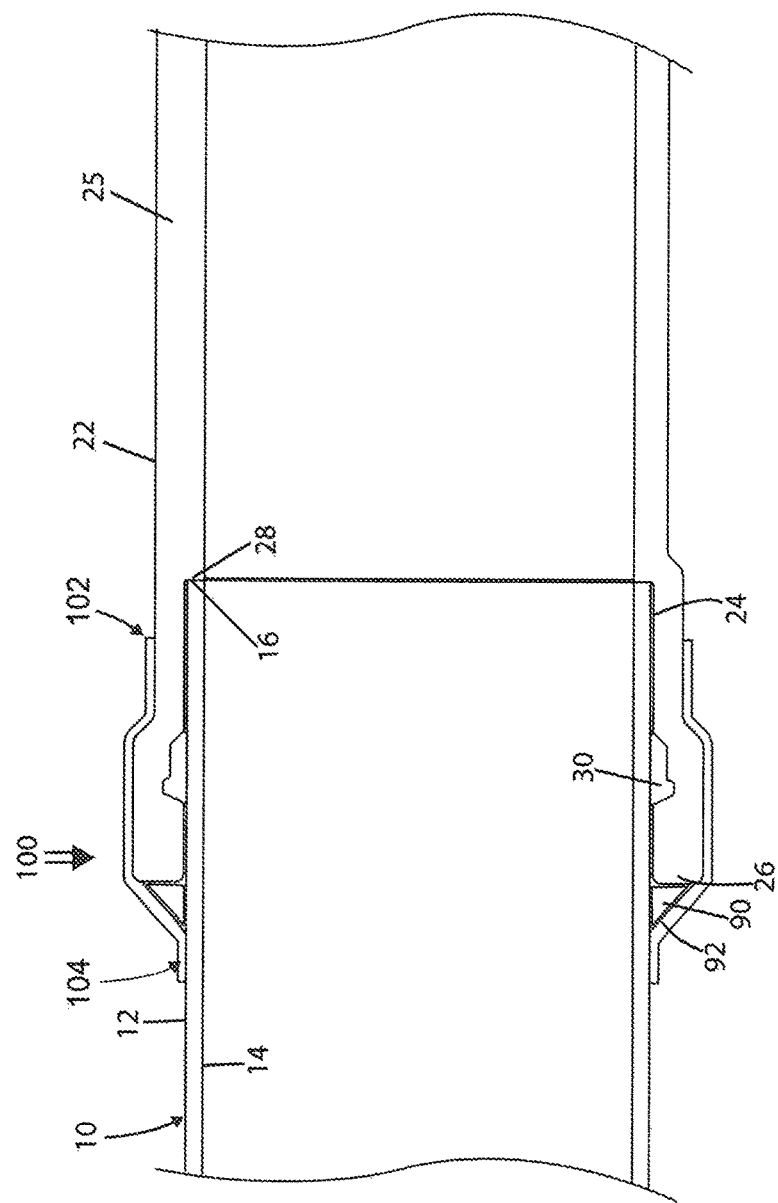

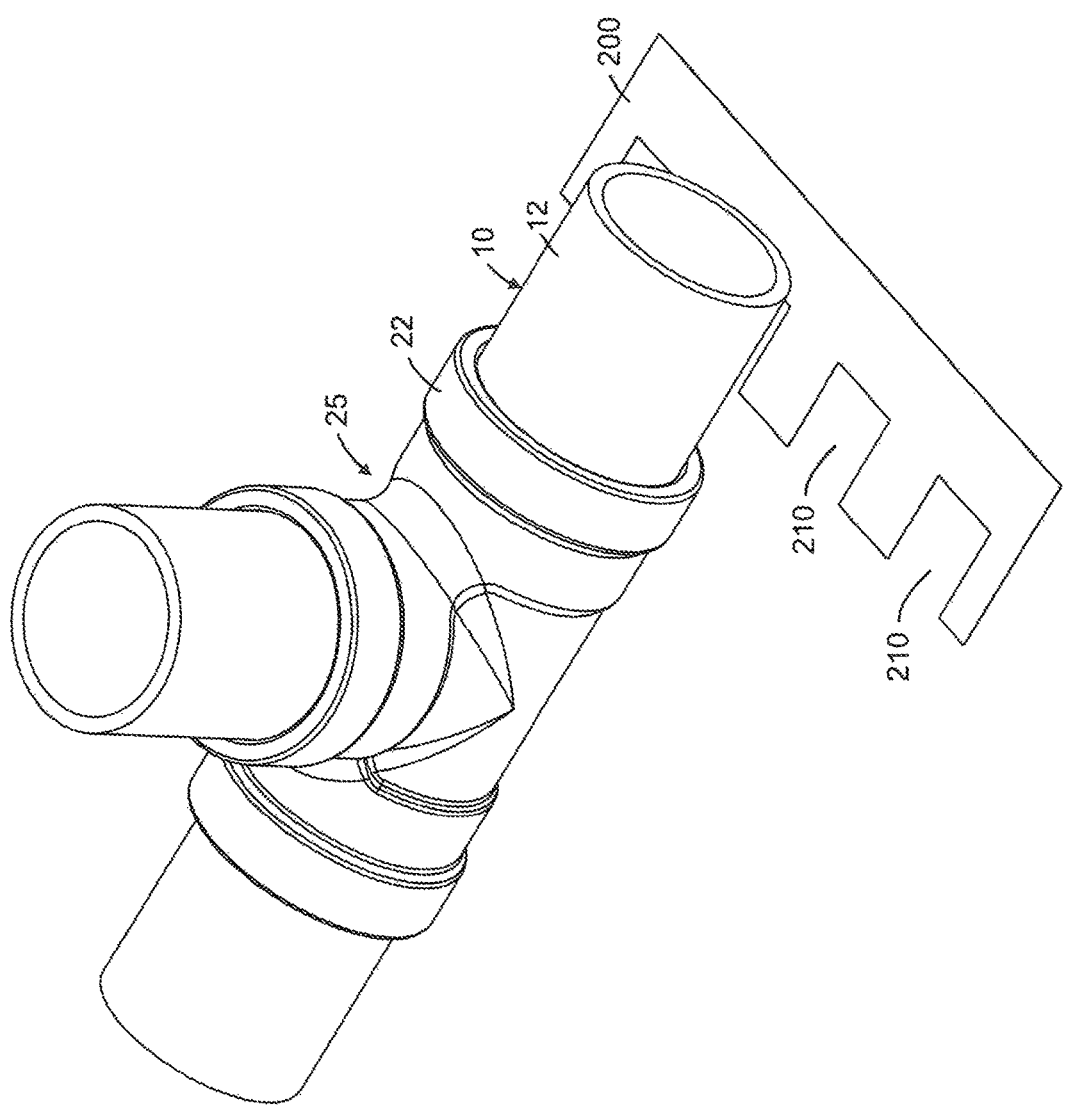

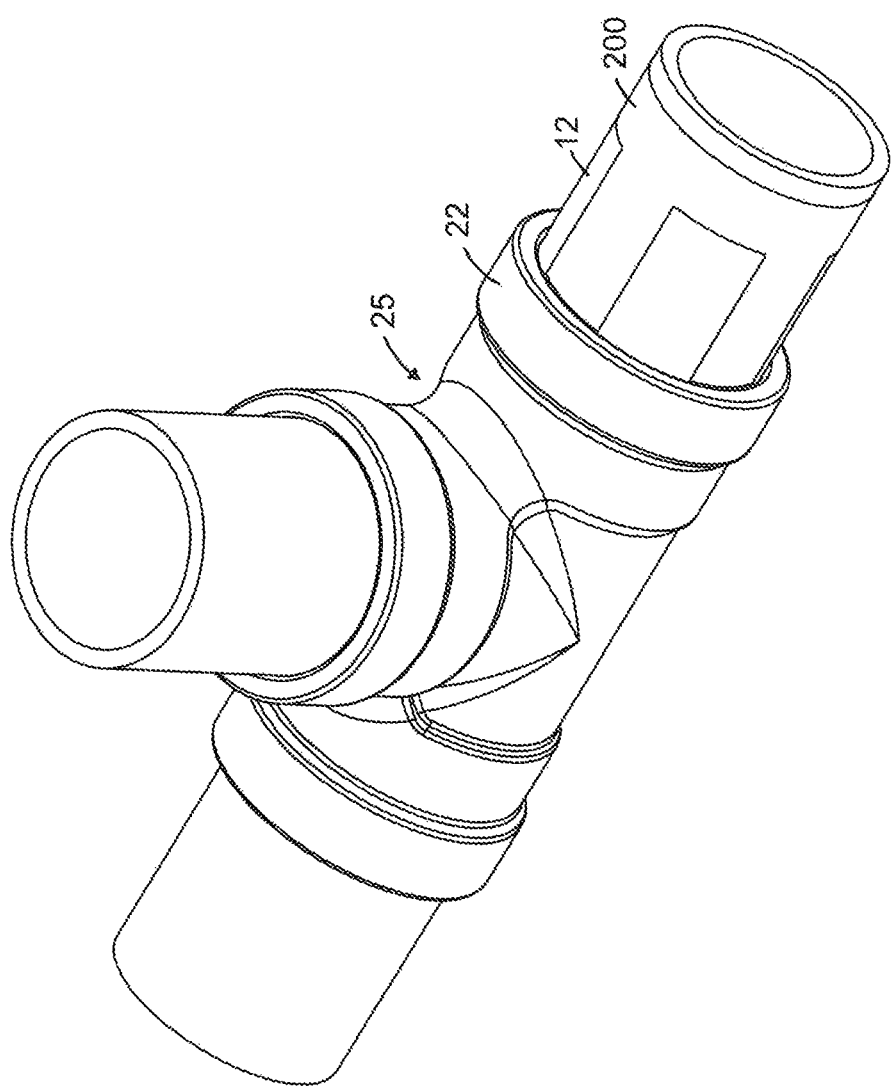

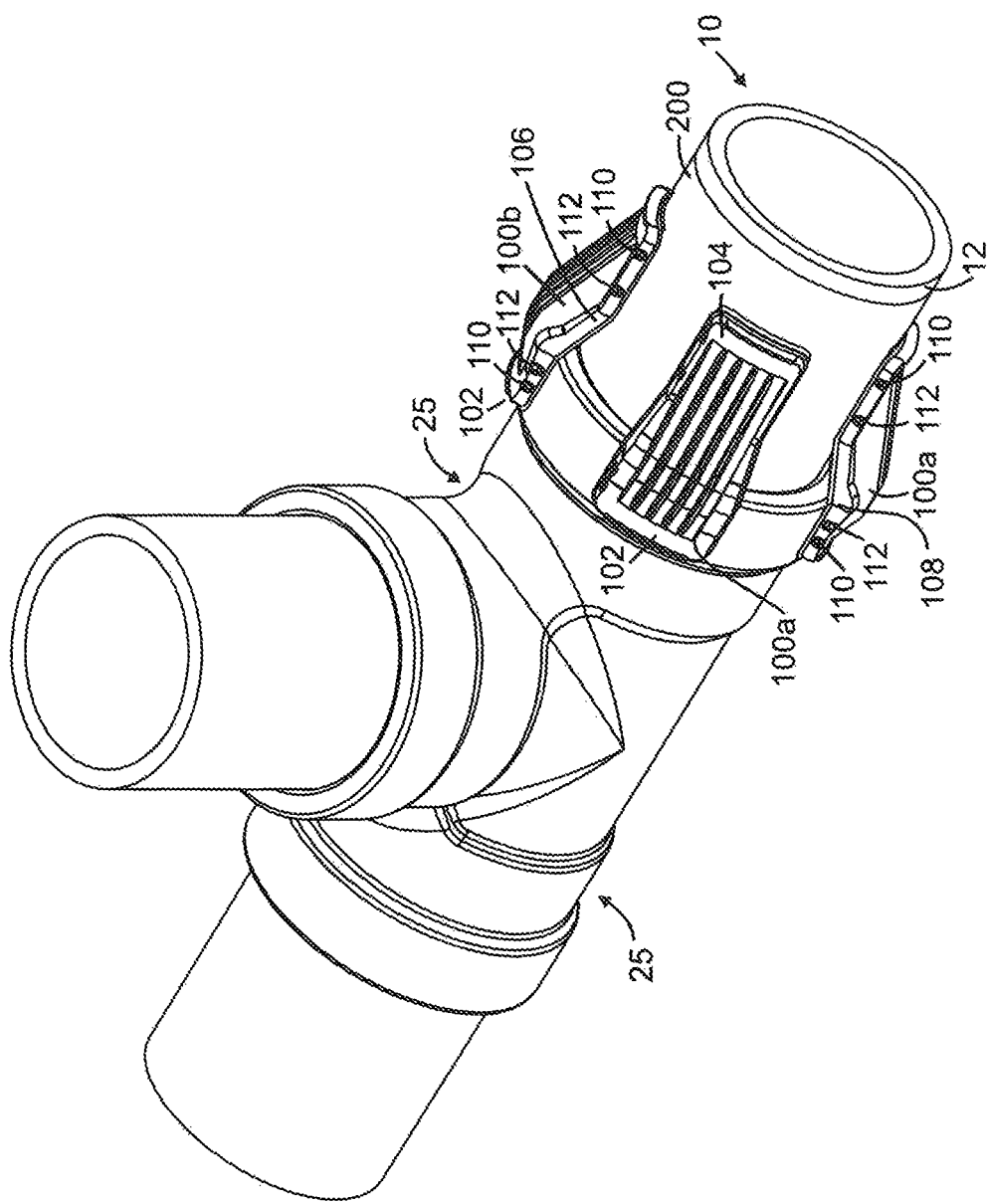

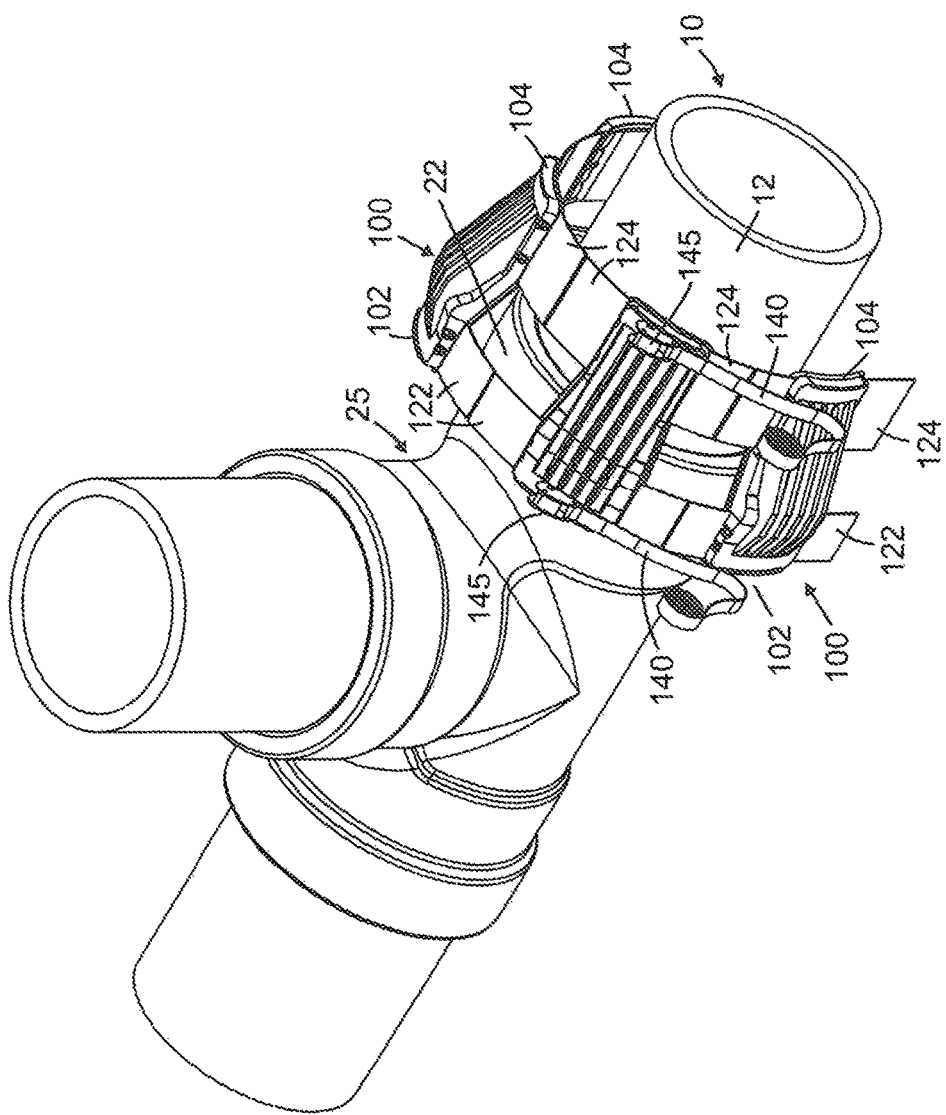

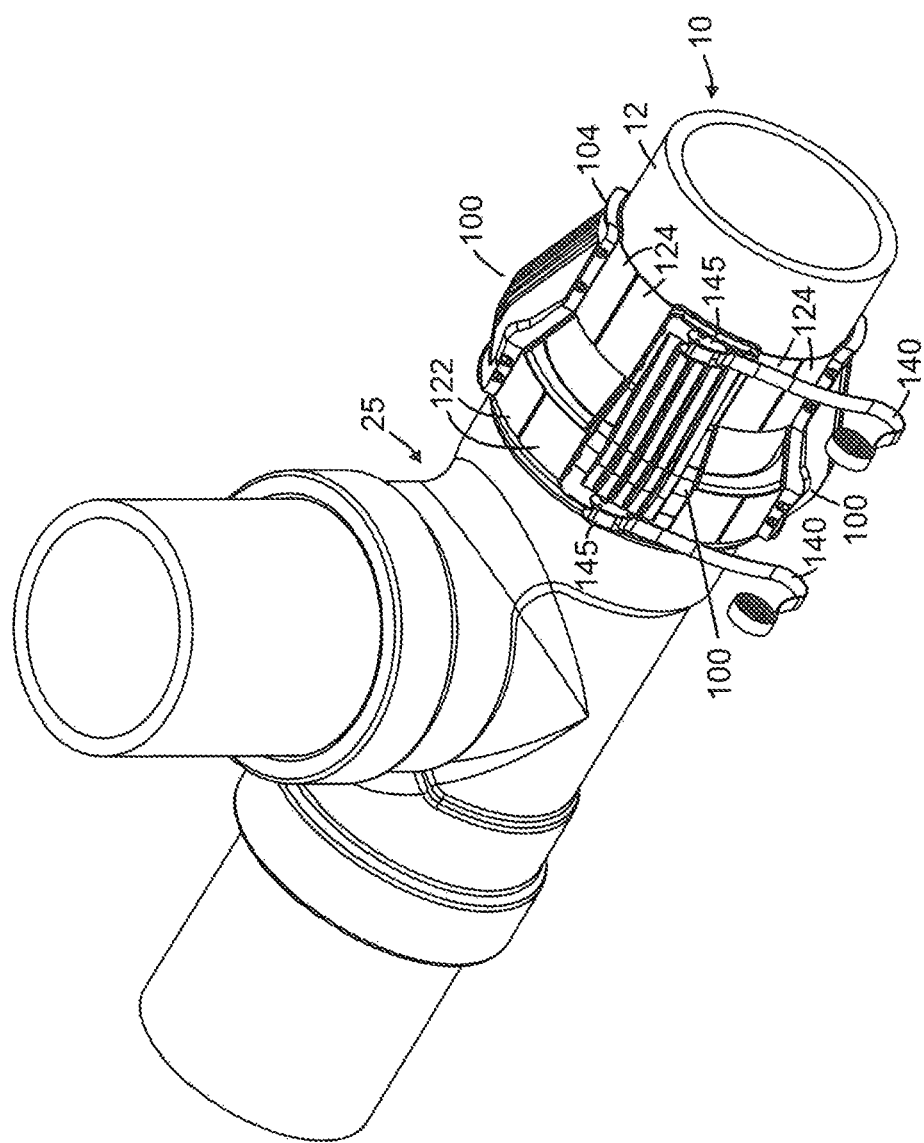

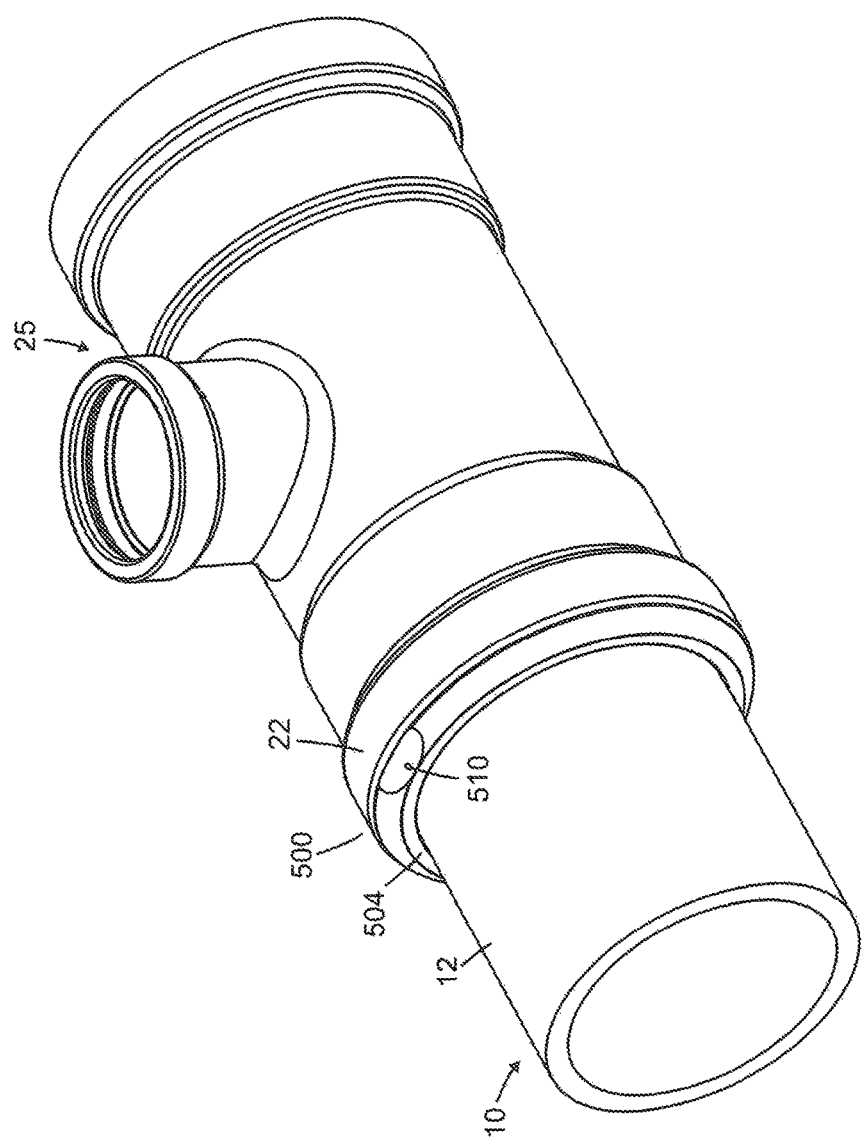

METHOD OF JOINING PIPES AND FITTINGS WITH MECHANICAL RESTRAINT MEMBERS

FIELD

This disclosure relates generally to the connection of pipes and fittings that are used to convey a fluid, and more particularly to a mechanical restraint member to secure components of a piping system to each other and methods for joining pipes and fittings that involve the application of the mechanical restraint member and kits that comprise the mechanical restraint members.

INTRODUCTION

Piping systems are used to convey liquids and/or gasses to, between, or within, residential, commercial, and/or industrial buildings. For example, most municipalities have a piping system for providing potable and/or non-potable water from one or more reservoirs, pumping stations, and/or water towers to one or more buildings (e.g. residential, commercial, or industrial) and/or other locations (e.g. fire hydrants). Other examples of municipal piping systems include sanitary sewers, storm sewers, and the like.

Typically, piping systems are made up of a number of components including straight or curved pipe sections, fittings (e.g. elbow fittings, T-junctions, straight connectors and the like), valves, etc. to provide an interior flow path for the liquid being conveyed. The pipe sections and fittings may be fabricated from concrete, ductile iron, plastics such as polyvinyl chloride (PVC), polyethylene or polypropylene, and/or a combination of these materials. Typically, a piping system (such as a system comprising thermoplastic pipes), is assembled such that the components are joined in a manner that provides a durable connection that prevents or inhibits the components from separating or cracking due to mechanical, thermal, and/or hydraulic stresses applied to the piping system. Separation of any of the components of the piping system or cracking of any element of the piping system may permit fluid to leak out of the piping system and, e.g., thereby damage the surrounding structure and/or pollute the ground water.

Municipal piping systems (e.g. potable water distribution systems) often operate with relatively high internal hydraulic pressures and flow rates. When coupling components of a piping system together (e.g. two lengths of pipe, a length of pipe to a fitting or a valve) the joint must resist both forces imposed by the internal hydraulic pressure of the water (e.g. internal fluid pressure which tends to separate the coupled components) and those forces imposed by a flowing mass of liquid within the piping system when it changes direction. These combined forces tend to both separate the joint and to also force the liquid out of the joint. In addition, the joint must resist external forces that may be applied, such as by movement of the ground in which the piping system is located, e.g., due to settling of the soil and the like.

Joint architectures in general use include insertion fits, wherein one end of one part of a piping system is inserted into an open end of another part of the piping system. For example, in bell and spigot type couplings, an end of a pipe is inserted into a socket or bell of another pipe that receives the pipe end therein. To capture and hold or restrain the pipe end within the recess, a separate fitting may be used to secure the components of the piping system together. Types of fittings in general use today include push-on joint fittings and mechanical joint fittings.

A push-on joint fitting is exemplified by U.S. Pat. No. 3,963,298. As disclosed therein, a push-on joint fitting receives a pipe end and frictionally holds the pipe end within a bell of the push-on fitting. In use, a gasket is placed inside the bell in a gasket seat and the pipe is then inserted into the bell past the gasket. A considerable force is typically required to insert the pipe end past the gasket. Accordingly, a jacking mechanism may be attached to the pipe end and the bell in order to force the tapered end of the pipe past the gasket until the pipe bottoms out in the socket. The assembly of push-on fittings can be complicated and time consuming.

Typically, mechanical joint fittings utilize a flange provided on both components that are to be connected together, e.g., the end of a pipe and a bell of the fitting in which the pipe end is to be inserted. The flanges have axial bolt holes. In use, the pipe end may be inserted into the bell with minimal force until the pipe end bottoms out in the socket. The gasket may then be inserted into the gasket seat of the bell, where it is caulked or pounded into place as necessary. A gland may be brought into position touching the gasket. T-bolts may then be inserted into holes provided in the flanges and then tightened. The bolts are typically tightened in a star pattern. The use of external fittings requires care to ensure that the bolts are tightened to the required degree. A further issue is that many fittings are installed in a trench, making access to the bolts on the bottom of the joint a problem.

Once an installation is complete (e.g. a piping system is buried under a road), accessing the piping system to repair a leak is typically time consuming and expensive.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

This disclosure sets out methods for joining components of a piping system (e.g. pipes, fittings, and the like) utilizing a plurality of mechanical restraint members located directly on the exterior surface of the components that resist axial outward movement of the components. The disclosure also sets out a mechanical restraint member that may be utilized as well as a number of optional securing apparatus that may be used when installing the mechanical restraint members.

In one broad aspect, a plurality of mechanical restraint members are positioned on the outer surface of the components of a joint so as to extend from one component to the other component to thereby inhibit or prevent axial outward movement of the components. Accordingly, for example, once two piping system conduits have been joined together, such as by using an insertion fit, a plurality of restraint members are bonded to the outer surface of the conduits to inhibit or prevent the conduits from moving away from each other wherein the restraint members are located essentially at the outer wall of the conduits.

In accordance with this aspect, the restraint members may be bonded or chemically adhered to the outer surface of the conduits. An advantage of this design is that a mechanical member is not physically secured to an outer wall of a conduit, such as by wedges that are inserted into an external groove of a pipe, or the like. An axially or longitudinally extending member that is bonded or chemically adhered to the outer surface enables the loading to be applied over a larger surface area and thereby reduces point stresses that may otherwise occur. Therefore, the area of contact between each restraint member and the components is greater than in typical designs in common use today. This allows the restraining force to be distributed over a relatively large area, and thereby decreases the high load-per-unit-area on the components of the piping system that may be produced by typical designs in common use today. In particular, the area of contact between typical mechanical joint fittings and the components being restrained is relatively small (e.g. point contact loads where discrete mechanical fasteners such as wedges and the like press into the outer surface of the pipe). The axial restraint force provided by such typical mechanical joint fittings is transmitted through a relatively small area of the component's surface which may result in localized loading at these points of contact that can be quite high, imposing a relatively high load-per-unit-area. This requires that the portion of the wall of the conduit on which these point loads are applied have sufficient structural integrity to absorb the axial stresses so that a fluid tight seal is maintained at the joint. In addition, the point loads may also impose a relatively high inward radial stress on the wall of the component, in addition to the axial stresses resulting from the restraining forces being transferred to the components by the mechanical joint fittings.

Another advantage of this design is that the restraint members are radially located at (or directly adjacent) the position at which the outward axial forces (e.g., the hydrostatic pressure internal of the piping system once in use) are applied. In contrast, typical mechanical joint fittings use flanges or collars through which bolts to secure the components together. These bolts are located radially outwardly of the pipe as they are inserted into flanges that are applied to the components. Therefore, the axial restraint force provided by the bolts is transmitted radially inwardly by the flanges to the components. One problem with this design is that localized angular point loading is applied at the juncture of the flange and the axial wall of the component. In particular, a moment arm is created by the flange, and the wall of the component must be design to withstand the increased stress produced by the moment arm.

Another advantage of this design is that the restraint members do not mechanically penetrate the walls of the components being restrained. In contrast, typical mechanical joint fittings use mechanical attachment means that are inserted into grooves provided in the outer wall of the piping system component, or may otherwise penetrate at least a portion of the outer wall. One problem that this may create is that the effective thickness of the wall of the piping system component is decreased, which leads to the component having a lower strength.

Various types of mechanical restraint members may be used. Generally, a mechanical restraint member comprises a rigid body bonded by a bonding agent to the outer surface of each of the piping system components that are used to form a joint. The bonding agent may be selected based on the composition of the substrate and the components that are to be joined together. It will be appreciated that the material of the restraint members, the number of restraint members used, and/or the type and amount of bonding agent used to secure a joint may vary, depending on the requirements of the joint to be restrained. For example, three to six mechanical restraint members may be spaced apart provided around the outer perimeter of the joint being restrained. Alternatively, more or fewer mechanical restraint members may be applied around a joint.

In one embodiment, a mechanical restraint member suitable for use with a plastic piping system such as a thermoplastic piping system may comprise a plastic or thermoplastic body, such as polyvinylchloride (PVC) or chlorinated PVC (CPVC), bonded to the piping system components using a thermally activated bonding agent, such as a thermoplastic or thermoset resin and/or a two component adhesive which cures upon mixing, and may be an acrylic adhesive such as those sold under the trademark WELD.ON™.

The bonding agent may be any composition that may chemically secure the restraint member to a component of the piping system. The bonding agent may be in the nature of an adhesive (which may be a thermally activated or solvent based adhesive) or the same material or a material that is compatible with, the material from which the components are made. For example, if the components that are to be joined together and/or the mechanical restraint members are made of polyvinylchloride (PVC), then the bonding agent may be PVC or a compatible plastic. Accordingly once the outer wall of the component, the inner surface of the mechanical restraint member, and the bonding agent are heated, the PVC may blend together to form a unitary assembly (the restraint member, the bonding agent and the component) once the PVC cools and solidifies. It will be appreciated that the method used to activate the bonding agent will vary depending upon the nature of the bonding agent.

It will be appreciated that if the components that are to be joined together are made of different materials, then two or more different bonding agents may be used. For example, considered in the axial direction, one end of the mechanical restraint member may be bonded using a bonding agent suitable for the first component to which it will be applied and the other end of the mechanical restraint member may be bonded using a different bonding agent suitable for the second component to which it will be applied.

An advantage over traditional methods of restraining piping system components is that by chemically—as opposed to mechanically—bonding the mechanical restraint members to the piping system components, the risk of deformation, cracking, or other structural damage to the piping system components during installation are significantly reduced (if not eliminated).

Another advantage is that since the area of bonded contact of the mechanical restraint members with the piping system components will generally be much greater than in traditional methods, known structural issues relating to e.g. point loading may be alleviated or eliminated.

Prior to bonding, the mechanical restraint members may be secured in position by, e.g., one or more exterior securement members that extends around the outer surface of the mechanical restraint members, so as to provide sufficient securement such that the mechanical restraint members remain in position during the injection of the bonding agent. In some embodiments, one or more exterior securement members may be left in place after the mechanical restraint members have been bonded to the piping system components.

An advantage of leaving the exterior securement members in place is that they may prevent the components and/or the seal between them from leaking, cracking, or otherwise becoming damaged due to radially outward components of forces imposed by the internal hydraulic pressure of fluid being conveyed and/or forces imposed by a flowing mass of liquid within the piping system when it changes direction.

The mechanical restraint members may be used to join piping system components that may be made of concrete, metal, or plastic materials known in the piping arts. The plastic material may be a thermoplastic material and may be one or more of acrylonitrile butadiene styrene (ABS), PVC, chlorinated PVC (CPVC), ethylene vinyl acetate (EVA), polyethylene (PE), and the like. Preferred materials comprise PVC and/or CPVC.

In accordance with one broad aspect, there is provided a method for joining a first conduit section having an open first end and an inner surface with a second conduit section having an outer surface using a plurality of mechanical restraint members wherein each mechanical restraint member has first and second longitudinally spaced apart ends, the method comprising: a) inserting a first end of the second conduit section in the open first end of the first conduit section and forming a fluid tight seal between the first and second conduit sections; b) affixing the first end of the mechanical restraint members to the outer surface of the first conduit section and affixing the second end of the mechanical restraint members to the outer surface of the second conduit section whereby each mechanical restraint member extends from an outer surface of the first conduit section to an outer surface of the second conduit section; and, c) bonding the mechanical restraint members to the first and second conduit sections.

In some embodiments, the method further comprises applying a first restrainer mounting member around the first ends of the mechanical restraint members.

In some embodiments, the method further comprises applying a second restrainer mounting member around the second ends of the mechanical restraint members.

In some embodiments, the method further comprises providing a bonding agent between the mechanical restraint members and the first conduit section and between the mechanical restraint members and the second conduit section.

In some embodiments, the bonding agent is provided between the mechanical restraint members and the first and second conduit sections after the mechanical restraint members have been affixed to the first and second conduit sections.

In some embodiments, the first and second ends of the mechanical restraint members have an injection opening and an outlet opening and the bonding agent is injected through the injection openings.

In some embodiments, the method further comprises positioning the injection openings to face upwardly when positioned on conduit sections.

In some embodiments, the plurality of mechanical restraint members are secured in a spaced apart relationship by a flexible member and the method further comprises draping the flexible member with the injection openings facing upwardly.

In some embodiments, the first ends of the mechanical restraint members have an injection opening and the first restrainer mounting member is positioned to overly at least some of the injection openings, and the method further comprises subsequently providing a bonding agent between the mechanical restraint members and the first conduit section.

In some embodiments, the first restrainer mounting member is provided with injection openings that are positioned to overlie the injection openings of the first ends of the mechanical restraint members when the first restrainer mounting member is secured in position.

In some embodiments, the method further comprises forming injection openings in the first restrainer mounting member that overlies the injection openings of the first ends of the mechanical restraint members subsequent to applying the first restrainer mounting member around the first ends of the mechanical restraint members.

In some embodiments, the first restrainer mounting member comprises a flexible substrate and the first restrainer mounting member is wrapped more than once around the first ends of the mechanical restraint members so as to overlap itself.

In some embodiments, the first restrainer mounting member comprises a flexible substrate that is self-adhering and the method further comprises wrapping the first restrainer mounting member around the first ends of the mechanical restraint members and then adhering the first restrainer mounting member to itself.

In some embodiments, the first restrainer mounting member comprises a flexible substrate and the method further comprises wrapping the first restrainer mounting member around the first ends of the mechanical restraint members and then using an adhesive member to secure the first restrainer mounting member in position.

In some embodiments, the bonding agent is an activatable bonding agent, the activatable bonding agent is applied to at least one of an inner surface of the mechanical restraint members and the outer surface of the first and second conduit sections prior to the mechanical restraint members being affixed to the first and second conduit sections and step (c) comprises activating the bonding agent whereby the bonding agent is secured to the outer surface of the first and second conduit sections.

In some embodiments, the bonding agent is an activatable bonding agent and step (c) comprises activating the bonding agent whereby the bonding agent is secured to the outer surface of the first and second conduit sections.

In some embodiments, the activateable bonding agent is a thermally activateable bonding agent and the step of activating the bonding agent comprises applying heat to the bonding agent.

In some embodiments, the first and second conduit sections comprise a thermoplastic material that has a melting temperature and the heating step comprises heating the bonding agent to a temperature above a melting point of the bonding agent.

In some embodiments, the first and second conduit sections comprise a thermoplastic material that has a melting temperature and the bonding agent has a melting temperature that is less than the melting temperature of the first conduit section and the second conduit section and the method further comprises heating the bonding agent to a temperature above its melting temperature and less that the melting temperature of the first conduit section and the second conduit section.

In some embodiments, the activateable bonding agent is settable at room temperature and the step of activating the bonding agent comprises exposing the bonding agent to the ambient.

In some embodiments, the step of applying heat to the bonding agent comprises applying heat to the bonding agent from an external source.

In some embodiments, the step of applying heat to the bonding agent comprises inducing an exothermic reaction in the bonding agent.

In some embodiments, the mechanical restraint members are affixed in position by an adhesive.

In some embodiments, the adhesive is a releasable adhesive whereby the mechanical restraint members are repositionable.

In some embodiments, the mechanical restraint members are affixed in position by a flexible substrate having an adhesive provided on each side thereof.

In some embodiments, the step of forming a fluid tight seal comprises inserting a sealing member between the first and second conduit sections.

In some embodiments, the mechanical restraint members comprises a plurality of discrete members and step (b) comprises individually positioning each of the discrete members on an outer portion of each of the first and second conduits.

In some embodiments, the mechanical restraint members are moveably secured together.

In some embodiments, the mechanical restraint members are pivotally attached together.

In some embodiments, the method further comprises using 3-6 mechanical restraint members.

In some embodiments, the step of bonding the mechanical restraint members to the first and second conduit sections comprises bonding the mechanical restraint members to the first and second conduit sections along generally longitudinally extending portions of the outer surface of the first and second conduit sections and bonding the mechanical restraint members to a portion of the outer surface of at least one of the first and second conduit sections that extends at an angle to the generally longitudinally extending portions.

In some embodiments, the mechanical restraint members are bonded to the portion of the outer surface of the at least one of the first and second conduit sections that extend generally transverse to the generally longitudinally extending portions.

In accordance with another broad aspect, there is provided a kit for joining a first conduit section having an open first end and an inner surface with a second conduit section having an outer surface, the kit comprising: a) a plurality of rigid mechanical restraint members, each mechanical restraint member comprising a longitudinally extending member with first and second longitudinally spaced apart ends, an outer surface and an inner surface, each end having a cavity provided on the inner surface and defined by a perimeter wall, each cavity having an injection opening and an outlet opening; b) an affixing member to maintain the second end of at least one of the plurality of mechanical restraint members in a position on the outer surface of the second conduit section during a bonding operation; and, c) a bonding agent.

In some embodiments, the kit further comprises a flexible substrate provided on the outer surface of a plurality of laterally spaced apart mechanical restraint members.

In some embodiments, the kit further comprises an elongate flexible substrate securable to the outer surface of a plurality of mechanical restraint members and lockingly securable to form an annual band.

In some embodiments, the kit further comprises an adhesive provided on an inner surface of the flexible substrate.

In some embodiments, the adhesive is releasable.

In some embodiments, the flexible substrate is provided with an injection opening that is aligned with the injection opening of the mechanical restraint member.

In some embodiments, the kit further comprises a removable cover layer provided on the exposed opposed surface of the flexible substrate.

In some embodiments, the affixing member comprises a releasable adhesive provided on the perimeter wall.

In some embodiments, the kit further comprises a removable cover layer provided on the releasable adhesive.

In some embodiments, the kit further comprises a flexible member and a locking member whereby the flexible member is securable so as to form a generally annular band.

In some embodiments, the locking member is adjustable whereby a diameter of the annular band is variable.

In some embodiments, the kit further comprises a flexible member that is self-adhering.

In some embodiments, each cavity has a flow channel formed by at least one inner wall and the injection opening is provided at one end of the flow channel and the outlet opening is provided on another end of the flow channel.

In some embodiments, each cavity has longitudinally extending side walls and the injection opening is provided on one of the longitudinally extending side walls.

In some embodiments, the outlet opening is provided on the same side wall as the injection opening.

In some embodiments, the injection opening is provided on a laterally inner facing longitudinally extending side wall of each cavity.

In some embodiments, the inner wall of the cavity comprises a concave channel provided therein.

In accordance with another broad aspect, there is provided a mechanical restraint member comprising a longitudinally extending member with first and second longitudinally spaced apart ends, an outer surface and an inner surface, each end having a cavity provided on the inner surface and defined by a perimeter wall, each cavity having a flow channel formed by at least one inner wall and an injection opening is provided at one end of the flow channel and an outlet opening is provided on another end of the flow channel.

In some embodiments, each cavity has longitudinally extending side walls and the injection opening is provided on one of the longitudinally extending side walls.

In some embodiments, the inner wall of the cavity comprises a concave channel provided therein.

In some embodiments, the outlet opening is provided on the same side wall as the injection opening.

In some embodiments, an inner surface of the perimeter wall at the first end of the mechanical restraint member is substantially planar, an inner surface of the perimeter wall at the second end of the mechanical restraint member is substantially planar, and wherein the substantially planar surfaces are offset from each other in a plane transverse to a plane of the inner surface of the perimeter wall at the first end.

In some embodiments, the mechanical restraint member has a longitudinal axis, and wherein each cavity has transversely extending sidewalls that has an arcuate profile when viewed along the longitudinal axis.

In some embodiments, the transversely extending sidewalls of the cavity at the first end have a different arcuate profile than the transversely extending sidewalls of the cavity at the second end.

In some embodiments, a compressible material is provided on an exposed surface of the perimeter wall of each cavity.

In accordance with another broad aspect, there is provided a method for joining a first conduit section having a longitudinally extending open first end and an inner surface with a second conduit section having a longitudinally extending end and an outer surface, the method comprising: a) inserting a first end of the second conduit section in the open first end of the first conduit section and forming a fluid tight seal between the first and second conduit sections; and, b)

bonding at least a portion of the inner surface of the first conduit section to at least a portion of the outer surface of the second conduit section.

In some embodiments, the portion of the inner surface of the first conduit section is bonded to the portion of the outer surface of the second conduit section at a plurality of discrete locations around a circumference of the second conduit section.

In some embodiments, the portion of the inner surface of the first conduit section is bonded to the portion of the outer surface of the second conduit section in a continuous band around a circumference of the second conduit section.

In some embodiments, the method further comprises inserting a spacer between the inner surface of the first conduit section and the outer surface of the second conduit section.

In some embodiments, the spacer comprises an annular member seated on the outer surface of the second conduit section and a plurality of circumferentially spaced apart longitudinally extending spacer sections.

In some embodiments, the step of forming a fluid tight seal comprises inserting a sealing member between the first and second conduit sections.

In some embodiments, the method further comprises securing a first end of a mechanical restraint member to an outer surface of the first conduit section and securing a second end of the mechanical restraint members to an outer surface of the second conduit section whereby the mechanical restraint member extends from an outer surface of the first conduit section to an outer surface of the second conduit section.

In some embodiments, the method further comprises using the mechanical restraint member of any aspect disclosed herein.

In some embodiments, a plurality of discrete mechanical restraint members are secured to the first and second conduit sections.

In some embodiments, step (b) comprises bonding the mechanical restraint member to the first and second conduit sections along generally longitudinally extending portions of the outer surface of the first and second conduit sections and bonding the mechanical restraint member to a portion of the outer surface of at least one of the first and second conduit sections that extends at an angle to the generally longitudinally extending portions.

In some embodiments, the mechanical restraint member is bonded to the portion of the outer surface of the at least one of the first and second conduit sections that extend generally transverse to the generally longitudinally extending portions.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below. The apparatus and methods described herein may be used to connect pipes and/or fittings of various materials (e.g. metallic pipes, thermoplastic pipes) to create piping systems for transporting various liquids or gasses. It will be appreciated that the piping system that uses the restraint members may be made from different materials (e.g., the pipes may be made of PVC and/or CPVC and the fittings may be made of metal). Alternatively, the piping system components (or at least their inner surfaces through which fluid is conveyed) may be made of the same material.

Furthermore, the apparatus and methods may be applied to different sizes of piping, and/or piping systems made of the same or different materials, and therefore may be applicable to piping systems for domestic or commercial uses, such as conveying potable water, non-potable or waste water, or other liquids and/or gasses.

BRIEF DESCRIPTION OF THE DRAWINGS

For a better understanding of the described embodiments and to show more clearly how they may be carried into effect, reference will now be made, by way of example, to the accompanying drawings in which:

FIG. 1B is a perspective view of a pipe end positioned for installation within a straight conduit as is known in the prior art;

FIG. 1C is a perspective view of a pipe end positioned for installation within an elbow joint as is known in the prior art;

FIG. 2B is a cross-section view of a pipe end positioned for installation within a fitting having a gasket as is known in the prior art;

FIG. 3A is a perspective cross-section view of the pipe end and T-fitting of FIG. 1, with the pipe end inserted into the T-fitting;

FIG. 4 is a perspective view of the pipe end and T-fitting of FIG. 3 secured using a traditional bolt-on collar;

FIG. 7 is a partially exploded view of FIG. 6;

FIG. 8A is a perspective view of a mechanical restraint member showing an inner cavity at each end in accordance with at least one embodiment of this disclosure;

FIG. 8C is a perspective view of a mechanical restraint member in accordance with another embodiment of this disclosure;

FIG. 9 is a perspective cross-section view of FIG. 6;

FIG. 11 is a cross section view of a pipe end and a fitting secured using the mechanical restraint member of FIG. 8C;

FIG. 12A is a cross-section view of a pipe end and a fitting secured in accordance with another embodiment, with a transition collar positioned at the end face of the fitting;

FIG. 13 is a perspective view of a pipe end and T-fitting in accordance with another embodiment, with the pipe end inserted into the T-fitting, and with a positioning template positioned proximate the pipe end;

FIG. 14 is a perspective view of the pipe end and T-fitting of FIG. 13, with the template applied around the pipe end;

FIG. 15 is a perspective view of the pipe end and T-fitting of FIG. 14, with a plurality of mechanical restraint members affixed across the joint;

FIG. 16 is a perspective view of the pipe end and T-fitting of FIG. 13, with a 'belt' of mechanical restraint members positioned around the joint in accordance with another embodiment;

FIG. 17 is a perspective view of the pipe end and T-fitting of FIG. 16, with the mechanical restraint members positioned against the outer surfaces of the pipe end and T-fitting using a releasable adhesive with the tether straps in an unsecured configuration;

FIG. 44 is a perspective view of a pipe end and fitting secured using the mechanical restraint member of FIG. 42.

Figure 1A:
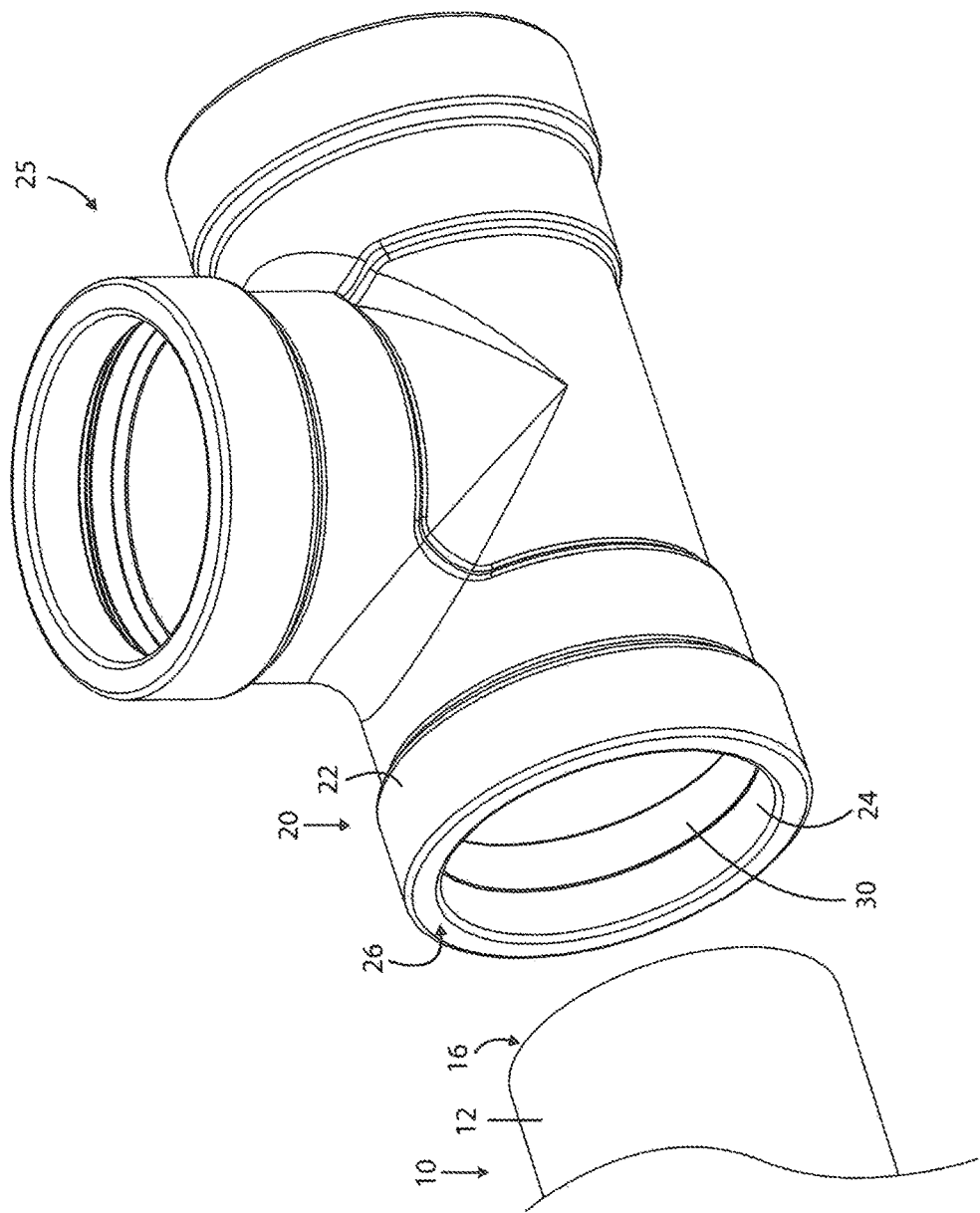
FIG. 1A is a perspective view of a pipe end positioned for installation within a T-fitting as is known in the prior art.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The apparatuses, methods and compositions may be used with piping systems made of various materials. The piping system components, e.g. the pipes and/or fittings to be connected, may be made of concrete, fiberglass, a metal such as cast iron, steel, copper, stainless steel, titanium, zirconium and the like, and/or a plastic material (including a thermoplastic material), such as polypropylene, polystyrene, nylon, polycarbonate, acrylonitrile butadiene styrene (ABS), PVC, CPVC, ethylene vinyl acetate (EVA), polyethylene (PE), high density polyethylene, ultrahigh molecular weight polyethylene or the like. In one particular embodiment, the piping system components are made of plastic. In one particular embodiment, the plastic is a thermoplastic material.

The drawings exemplify the use of restraint members to connect a section of pipe to a T-junction. It will be appreciated that the same restraint members may be used to connect any parts of a piping system together. For example, the restraint members may be used to connect two sections of pipe to each other, to connect a pipe with a fitting such as a valve, tees, couplers, elbows and the like, or to connect one fitting with another fitting.

The drawings exemplify the use of the restraint members with piping system components that are engaged using an insertion fit. It will be appreciated that other engagement systems, such as a butt joint, may be used.

Typical Mechanical Joint Fitting

FIGS. 1A to 3B illustrate an insertion fit, i.e., one end of one part of a piping system (e.g. pipe 10) is inserted into an open end of another part of the piping system (e.g. fitting 25). As exemplified, end 16 of the pipe 10 is inserted into opening 20 of fitting 25, which may be a T-junction as exemplified in FIG. 1A, a straight conduit as exemplified in FIG. 1B, an elbow joint as exemplified in FIG. 1 C, or any other fitting.

Preferably, pipe end 16 and opening 20 are dimensioned so that there is sufficient clearance between the outer surface 12 of pipe end 10 and the inner surface 24 of opening 20 to allow the pipe end to be inserted without requiring the application of undue axial force to pipe 10 and/or fitting 25. Typically clearances are provided in the American Society for Testing and Materials (ASTM) standards.

Figure 2A:
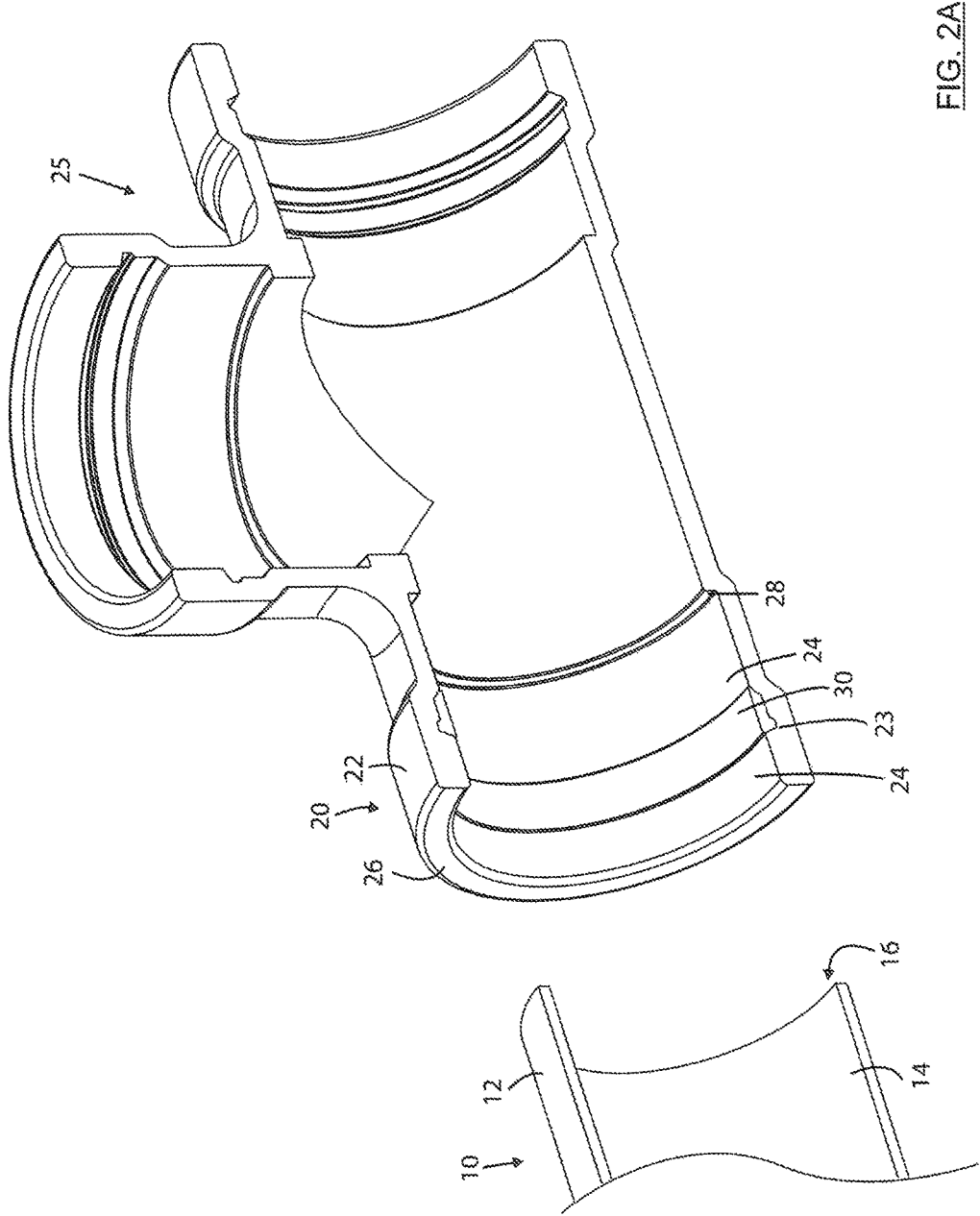
FIG. 2A is a perspective cross-section view of FIG. 1.
Figure 3B:
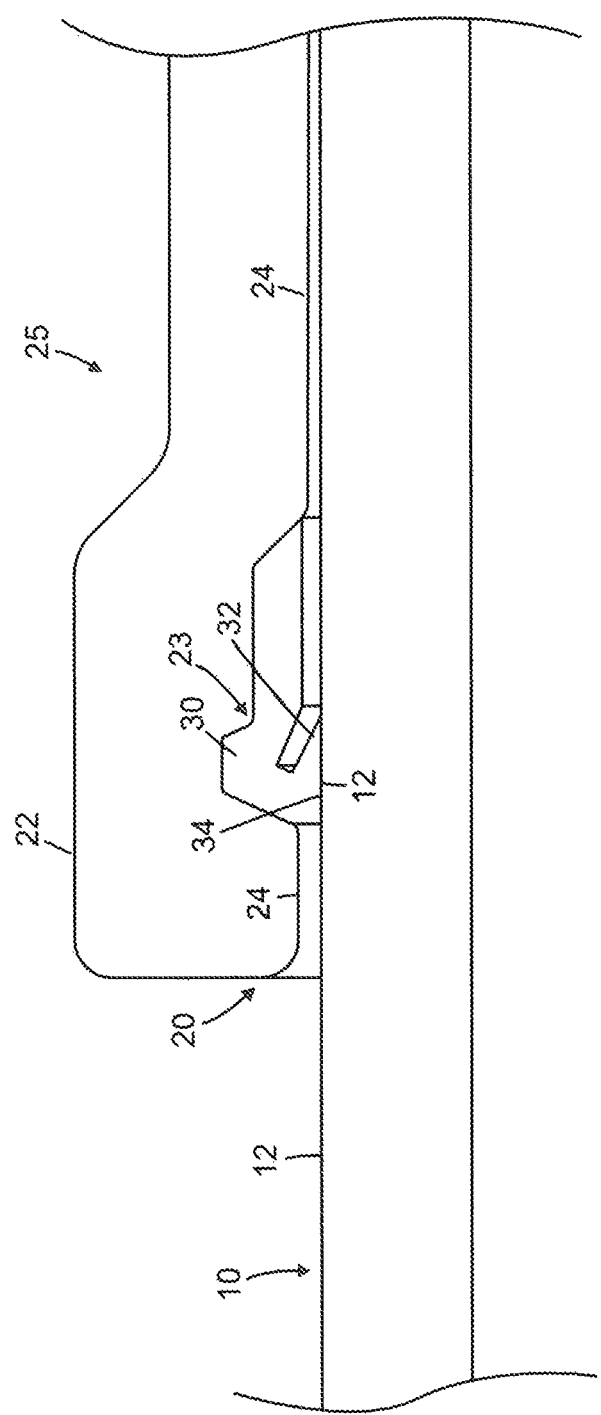
FIG. 3B is a cross-section view of the pipe end and fitting of FIG. 2A, with the pipe end inserted into the fitting.

One or more annular gaskets 30 (e.g. 0-rings) may be provided between outer surface 12 of pipe 10 and inner surface 24 of opening 20 to ensure a fluid-tight seal is provided. As shown in FIGS. 2A to 3B, an annular groove 23 may be provided on inner surface 24 of opening 20 to receive gasket 30 and to restrain the axial movement of gasket 30 during insertion of pipe 10. In FIGS. 2A and 3A, gasket 30 has a substantially flat inner surface 34 for contacting and sealing against the outer surface 12 of the pipe end 10. FIGS. 2B and 3B illustrate another embodiment of a gasket 30, in which a pliable flange 32 initially extends inwards (e.g. as shown in FIG. 2B), but is displaced by the insertion of pipe end 10 (as shown in FIG. 3B) so that surface 34 of flange 32 contacts and seals against the outer surface 12 of the pipe end 10. It will be appreciated that other alternative configurations for providing a gasket between pipe 10 and fitting 25 may be used. For example, a groove or other surface feature may be provided on the outer surface 12 of pipe 10, and gasket 30 may be positioned around pipe 10 prior to its insertion into opening 20.

Fitting 25 may be configured such that an end 16 of a pipe 10 may be inserted only up to a predetermined distance into fitting 25. This may assist in aligning one or more features (e.g. grooves, gaskets) of the fitting and/or the pipe end with each other. Therefore, a stop member may be provided inside fitting 25. For example, as exemplified in FIG. 2, in some embodiments fitting 25 may comprise an interior ridge 28 that provides an abutment surface against which a pipe end inserted into opening 20 will abut when inserted a predetermined distance, to assist in coupling fitting 25 to a pipe end, as shown in FIG. 3. It will be appreciated that interior ridge 28 may have a height that is similar to or the same as the thickness of the pipe 10 inserted into opening 20. Accordingly, the cross sectional area of flow through the pipe and the fitting is generally the same.

If a liquid at a sufficiently high internal hydraulic pressures and/or sufficiently high flow rates is conveyed through pipe 10 and fitting 25, the joint must resist both forces imposed by the internal hydraulic pressure of the liquid (e.g. internal fluid pressure which tends to separate the coupled components) and those forces imposed by a flowing mass of liquid within the piping system when it changes direction. These combined forces tend to both separate the joint and to also force the liquid out of the joint. Thus, the components of the piping system (e.g. pipe 10 and fitting 25) should be restrained relative to each other to prevent their separation, and to maintain the integrity of the joint.

Figure 5:
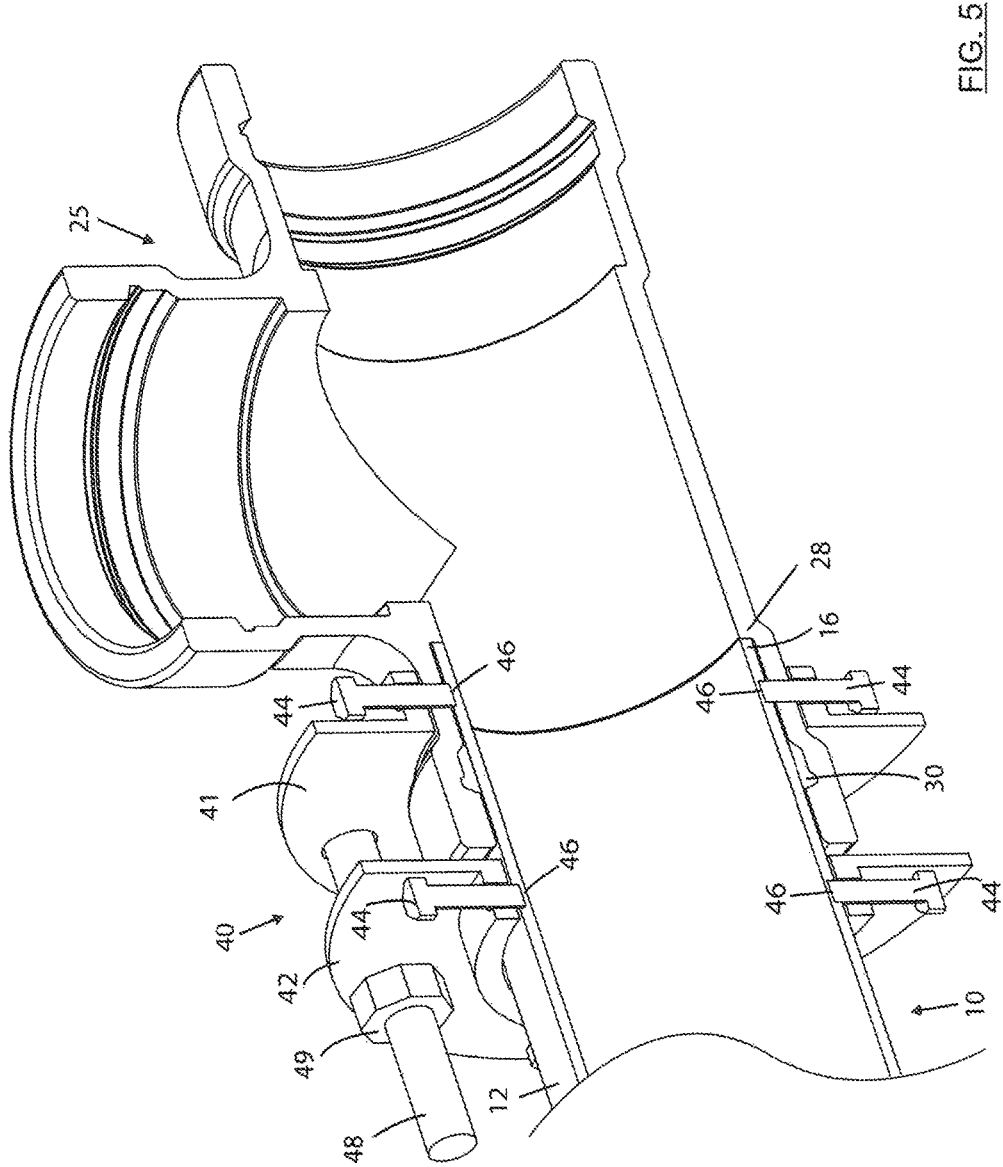
FIG. 5 is a cross-section view of FIG. 4.

FIGS. 4 and 5 exemplify a mechanical joint fitting apparatus 40 for securing two components of a piping system, according to a known method. Generally, a ring-shaped member 41, 42 is secured to each of the components (in this case fitting 25 and pipe 10, respectively), and then the ring-shaped-members are secured to each other to prevent the piping system components from separating.

In the illustrated example, ring-shaped member 41 is formed by securing two semi-circular portions 41a, 41b to each other about fitting 25 using one or more fastener 43, while ring-shaped member 42 is a unitary ring that is slid over pipe 10. The ring-shaped members 41, 42 are secured to fitting 25 and pipe 10, respectively, using a plurality of fasteners 44. Grooves or other recesses may be present on the outer surfaces 22, 12 of the fitting 25 and pipe 10, respectively at the points of contact 46 between the fasteners 44 and the piping system components. It will be appreciated that ring-shaped members 41, 42 may be flanges that are integrally formed with fitting 25 and pipe 10. Finally, bolts 48 and nuts 49 are used to restrain the relative position of the ring-shaped members 41, 42 to each other, and thus secure the relative position of pipe 10 and fitting 25.

While such an apparatus may be effective in securing the pipe and fitting (i.e. restraining the components from being separated), such an apparatus (and/or its method of installation) may have one or more disadvantages as discussed previously.

Reference is now made to FIGS. 6 to 37, which exemplify apparatus and methods for connecting pipes using a plurality of mechanical restraint members 100. In general, the methods include connecting the piping system components using, e.g., an insertion fit (optionally with one or more gaskets positioned between the components to provide a water-tight seal), positioning (e.g. affixing) the mechanical restraint members on the outer surface of the piping system components across the joint such that each mechanical restraint member extends from an outer surface of the first conduit component to an outer surface of the second component, and bonding the mechanical restraint members to the first and second components. It will be appreciated that the methods may be used with any mechanical interface of two members of a piping system.

Mechanical Restraint Members

In accordance with one aspect, which may be used by itself or with any other aspect of this disclosure, a mechanical restraint member is provided that may be used to inhibit axial outward travel of two components of a fluid joint. It will be appreciated that the mechanical restraint member does not provide a fluid seal at the joint but inhibits movement that may result in a seal at the joint being broken.

As shown in FIGS. 6, 7, 8A, 8B, and 8C, each mechanical restraint member 100 has a first end 102, a central portion 103, a second end 104, and longitudinal sides 106, 108 extending between the ends 102, 104. To accommodate the bonding agent, the inner surface of each mechanical restraint member 100 may have one or more surface features, such as a raised wall or lip 114 extending around all or part of the inner surface of mechanical restraint member 100, and/or one or more interior surface features, such as baffle walls 116. The purpose of these surfaces is to define a cavity (i.e., a gap or interstitial space 111) between an interior surface 118 of mechanical restraint member 100 and the outer surface of a piping component to which it is applied. Such a cavity 111 allows a bonding agent to be positioned between the mechanical restraint member 100 and the piping system component to which it is to be bonded. The mechanical restraint member 100 is preferably dimensioned so that the cavity is relatively shallow (e.g. the cavity may have a depth between 0.001 and 0.375 inches, preferably between 0.01 and 0.125 inches, and most preferably between 0.02 and 0.08 inches. Optionally one or more baffle walls may be provided so as to define a flow path for the bonding agent from one or more inlet ports to one or more outlet ports. One advantage of providing baffles walls is that the tendency for air to be trapped in a corner of the cavity may be reduced. Also, if one or more outlet ports is provided, then the appearance of the bonding agent exiting the outlet port may indicate that the bonding agent has flowed through the entire flow path and the design amount of bonding agent is present in the cavity.

It will be appreciated that a single cavity may be provided or a plurality of cavities may be provided. Further, the cavity or cavities may cover all of the inner surface 118 or parts thereof. As exemplified in FIGS. 8A and 8B, a single cavity 111 is provided at each longitudinal end 102, 104 of the mechanical restraint member. As shown, each cavity is defined by a perimeter wall, which may be of any shape. As exemplified, each cavity is generally rectangular and has first and second opposed longitudinally extending end walls 101a, 101b, 105a, 105b and first and second laterally opposed side walls 101c, 101d, 105c, 105d. Mechanical restraint member 100 is dimensioned such that, when positioned across the joint of two components of a piping system, in this case pipe 10 and fitting 25, first end 102 is substantially flush with the outer surface of one of the components (in this case outer surface 22 of fitting 25) such that this outer surface closes off, or essentially closes off, cavity 111, and second end 104 is substantially flush with the outer surface of the other one of the components (in this case outer surface 12 of pipe 10) such that this outer surface closes off, or essentially closes off, cavity 111.

It will also be appreciated that a plurality of cavities may be provided so that a bonding agent may be positioned between the mechanical restraint member 100 and a plurality of outer surfaces of the piping system components that are at an angle to each other (e.g. to two or more surfaces that are generally transverse, or perpendicular, to each other). As exemplified in FIG. 8C, a cavity 111a is provided on the first end 102 and the central portion 103 of the mechanical restraint member 100, being defined by first and second opposed longitudinally extending end walls 105a, 105b, first and second laterally opposed side walls 105c, 105d, baffle wall 116a, and two generally perpendicular surfaces 118a and 118b. A cavity 111 at the second end 104 of the mechanical restraint member is generally rectangular and has first and second opposed longitudinally extending end walls 105a, 105b and first and second laterally opposed side walls 105c, 105d. As exemplified in FIG. 11, when such a mechanical restraint member 100 is positioned across the joint of two components of a piping system, in this case pipe 10 and fitting 25, first end 102 is substantially flush with the outer surface of one of the components (in this case outer surface 22 of fitting 25), while central portion 103 is substantially flush with an outer surface of the component that is at an angle to outer surface 22 (in this case end face 26 of fitting 25), such that these outer surfaces close off, or essentially close off, cavity 111a. Second end 104 is substantially flush with the outer surface of the other one of the components (in this case outer surface 12 of pipe 10) such that this outer surface closes off, or essentially closes off, cavity 111. While in the illustrated embodiment the outer surfaces 22, 26 of fitting 25 are generally transverse to each other, it will be appreciated that mechanical restraint member 100 may be dimensioned to sit flush with outer surfaces of any angle.

Returning to FIGS. 8A-8C, in some embodiments the outer surface of the perimeter wall defining cavity 111 at first end 102 may be shaped to seat flush against the outer surface of the component on which it is positioned. Accordingly, if the outer surface of the component on which it is positioned is substantially planar, then the outer surface of the perimeter wall defining cavity 111 may be substantially planar. Further, if the outer surface of the component on which it is positioned is arcuate, then the outer surface of the perimeter wall defining cavity 111 may have the same or generally the same curvature.

It will also be appreciated that, in some embodiments, the outer surface of one component of the joint may be located radially outward of the outer surface of the other component of the joint. For example, the outer surface of the perimeter wall defining cavity 111 at first end 102 may be substantially planar, and the outer surface of the perimeter wall defining cavity 111 at second end 104 may be substantially planar, with these substantially planar surfaces offset from each other in a direction transverse to the plane of the outer surface of the perimeter wall (i.e. not coplanar) so that each end 102, 104 of mechanical restraint member 100 may sit substantially flush against a piping component having a different outer diameter (see e.g. FIG. 6, where first end 102 sits substantially flush against outer surface 22 of fitting 25, and where second end 104 sits substantially flush against outer surface 12 of pipe 10).

Alternatively, these latter two embodiments may be combined such that first and second opposed longitudinally extending end walls 101a, 101b at first end 102 may be arcuate, first and second opposed longitudinally extending end walls 105a, 105b at second end 104 may be arcuate, and one of the sets of end walls is located radially outwardly of the other so that each end 102, 104 of mechanical restraint member 100 may sit substantially flush against a piping component having a curved outer surface. It will be appreciated that a set of end walls 101a, 101b or 105a, 105b may have the same curvature or they may have different curvatures, e.g. to accommodate being joined to piping components having dissimilar outer diameters (e.g. outer surface 22 of fitting 25, and outer surface 12 of pipe 10).

It will also be appreciated that, in some embodiments, the outer surface of one component may have a varying outer diameter in a location where the cavity 111 of mechanical restraint member 100 is to be positioned. For example, a fitting (or other component) may have a socket or bell where both the inner and outer surfaces decrease from larger diameters (at the open end of the fitting) to smaller diameters, e.g. as shown in FIGS. 2A-3B. As exemplified in FIG. 8B side walls 101c, 101d may be curved and end walls 101a, 101b may be angled or otherwise shaped so that cavity 111 at first end 102 will seat flush against the outer surface of a such a component.

The surfaces of the mechanical restraint member that cooperate with the outer surfaces of the piping components to define one or more cavities therebetween (e.g. raised wall or lip 114, baffle walls 116) may be configured to accommodate a predetermined dimensional tolerance range between these cooperating (or mating) surfaces of the mechanical restraint member and of the piping components, e.g. to accommodate deflection, distortion, and/or surface damage of one or both of the mechanical restraint member and the piping component. An advantage of such a design is that it will help ensure that the walls 114, 116, will act as mechanical barrier to restrain the bonding agent within the cavity 111 and/or within a flow path or channel within cavity 111 (as will be discussed further below).

For example, the outer surface of one or both of walls 114, 116 may be made thin enough to allow for a degree of deflection and/or deformation of the wall when the mechanical restraint member is affixed to the piping component. Alternatively, or additionally, a thin ridge of material may extend outwardly from the outer surface of one or both of walls 114, 116 (e.g similar to the edge of a windshield wiper blade) to form or promote a seal against the outer surface of the piping system component.

Alternatively, or additionally, one or both of walls 114, 116 may be made from a flexible gasket material that can deform against the contours of the outer surface of the piping system component in response to an inward compressive force applied when affixing the mechanical restraint member to the piping system components.

It will be appreciated that mechanical restraint members of different size and/or shapes may be provided depending on the dimensions of the piping system components being joined together. In this way, once the mechanical restraint members 100 are bonded to the piping system components, the mechanical restraint members prevent the components from separating from each other.

Each mechanical restraint member 100 may be made from any suitable material that has sufficient tensile and/or yield strength to restrain the piping system components from separating due the anticipated outward axial forces imposed during operation of the piping system. For example, the tensile strength of a plurality of mechanical restraint members 100 to be bonded to a joint should be at least equal to the expected load (e.g. the total expected static and dynamic pressure in the piping system during operation of the piping system, multiplied by the internal cross sectional pipe area). The tensile strength of the plurality of mechanical restraint members 100 may be between 1 to 5 times, preferably between 1.5 to 5 times, and more preferably between 1 to 1.5 times or between 3 to 5 times the expected load, to provide an acceptable safety margin depending on the application. Optionally, the outer surface of each mechanical restraint member 100 may have one or more structural elements, such as ribs 120, to strengthen and/or stiffen mechanical restraint member 100.

It will be appreciated that each mechanical restraint member 100 may be made of one or more materials. Examples of suitable materials include metals (e.g., steel, stainless steel, aluminum, brass, copper, and the like), fiberglass (e.g. E-glass, S-glass, E-CR-glass), carbon fiber, aramid fiber (e.g. Kevlar™, Twaron), ultra-high-molecular-weight polyethylene (UHMWPE) (e.g. Spectra®, Dyneema®), polycarbonate, polypropylene, polyethylene, PVC, CPVC, and the like.

Preferably, mechanical restraint members are made from the same (or a similar) material as the piping components to which they are to be bonded. Joining piping system components using mechanical restraint members made of the same (or similar) material may have one or more advantages. For example, where the piping components and the mechanical restraint members are made of similar material, they may have a similar chemical compatibility with the environment into which the joined pipe is ultimately positioned (e.g. buried in soil). Also, piping components and mechanical restraint members made of similar materials may have a similar response (e.g. expansion, contraction) to changes in temperature of the environment and/or of the fluid flowing through the joined pipe.

The mechanical restraint members may be secured in position by a bonding agent positioned between the mechanical restraint member 100 and the piping component after the mechanical restraint member 100 has been positioned on and/or affixed to the piping component. For example, after a mechanical restraint member 100 has been affixed to the outer surface of the piping system component, a bonding agent may be injected to bond the mechanical restraint member 100 to the piping system component.

In order to enable a bonding agent to be injected into cavities 111, one or more injection openings or passages 110 may be provided. As exemplified in FIGS. 6-10, the cavity 111 at each end 102, 104 of mechanical restraint member 100 is provided with an injection passage 110 that extends through the body of the mechanical restraint member 100. Passages 110 may be pre-formed in mechanical restraint member 100, such as during the manufacturing process. Alternatively, mechanical restraint member 100 may be manufactured without passages 110 and the passages may be formed (e.g. drilled) prior to or as part of the connection process.

Bonding agent may be injected in a fluid state. Preferably, the bonding agent is injected at a temperature less than the melt temperature of the piping component to which the mechanical restraint member is being bonded, more preferably less than 90% of the melt temperature, and more preferably less than about 75% of the melt temperature. Most preferably, the bonding agent is injected at a temperature less than the heat deflection temperature (or heat distortion temperature)—e.g. as determined by the test procedure outlined in ASTM D648 and/or as defined in the ISO 75 standard—of the piping component to which the mechanical restraint member is being bonded.

When injected at such temperatures (e.g. via injection nozzle 50), the pipe joining material may remain fluid until the interstitial space or gap between the pipe component and the mechanical restraint member is filled.

Figure 8B:
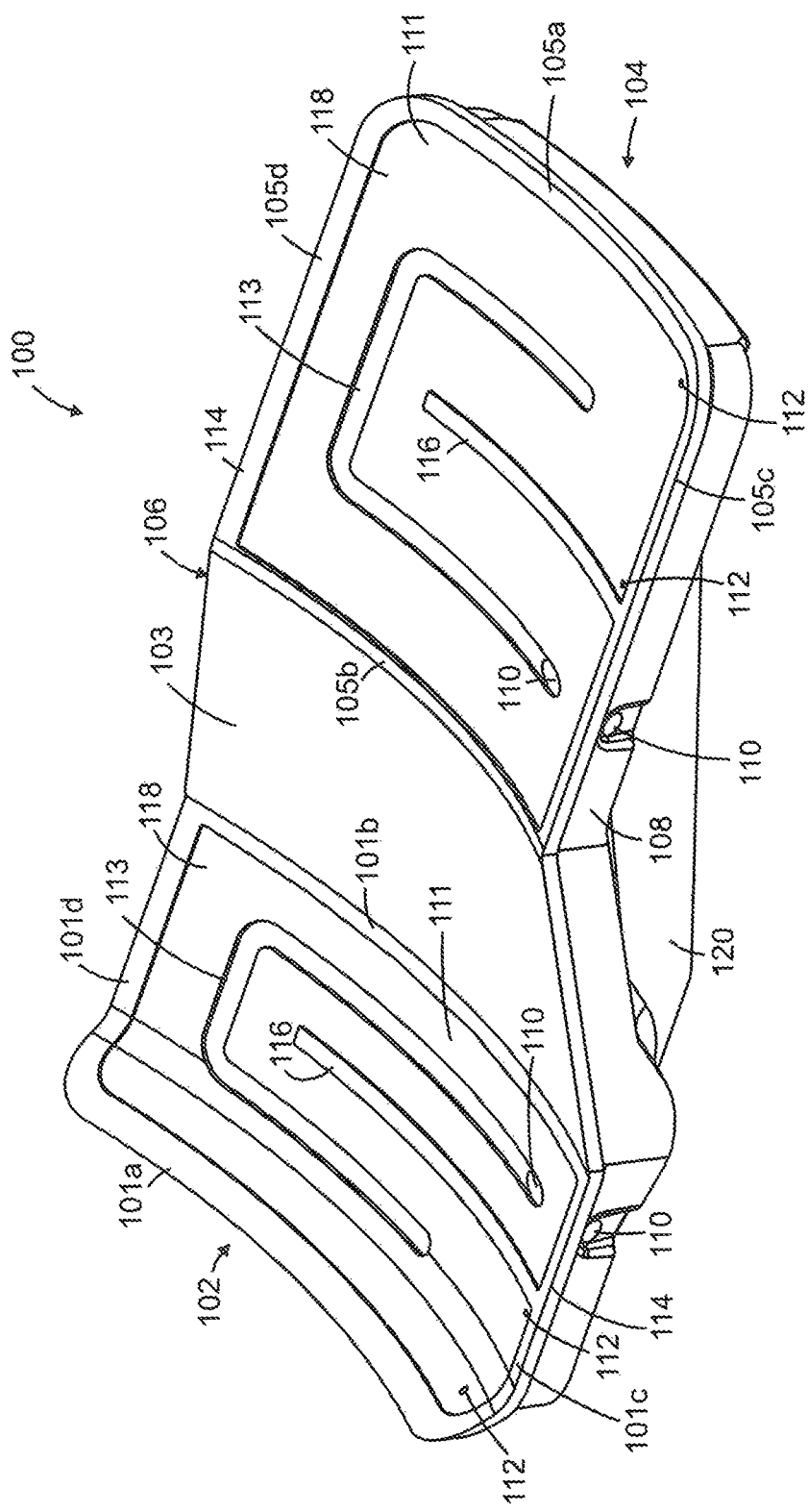
FIG. 8B is a perspective view of a mechanical restraint member showing an inner cavity at each end in accordance with another embodiment of this disclosure.

Optionally, one or more vent passages or outlet ports 112 may also be provided through the body of mechanical restraint member 100 to allow air to evacuate the gap between the mechanical restraint member 100 and the piping system component as bonding agent is injected. FIG. 8A exemplifies a mechanical restraint member 100 having one vent passage 112 for each cavity 111. FIG. 8B exemplifies a mechanical restraint member 100 having two vent passages 112 for each cavity 111. As with injection passages 110, vent passages 112 may be pre-formed in mechanical restraint member 100 or formed prior to or as part of the connection process. As exemplified, each vent passage 112 is preferably spaced apart from its corresponding injection passage 110.

Alternatively, or additionally, one or more vent passages or outlet ports 112 may be provided through the surfaces of the mechanical restraint member that cooperate with the outer surfaces of the piping components to define one or more cavities therebetween (e.g. raised wall or lip 114, baffle walls 116) to allow air to evacuate the gap between the mechanical restraint member 100 and the piping system component as bonding agent is injected. FIG. 8C exemplifies a mechanical restraint member 100 having a vent passage 112 through sidewall 101*c* for venting the cavity 111 at the first end, and a vent passage 112 through sidewall 105*c* for venting the cavity 111 at the second end.

Optionally, a flow path or channel may be provided in one or more of cavities 111. For example, one or more baffle walls 116 may be provided to define a flow path from the injection passage or passages 110 provided at an inlet end of the flow channel and the vent passage or passages 112 at the exit end of the flow channel.

In some embodiments, as exemplified in FIGS. 8B and 8C, a recess or indentation 113 may be provided in the interior surface 118 of the mechanical restraint member 100 within the flow path. Such a recess 113 preferably extends from the injection passage or passages 110 towards (although not necessarily to) the vent passage or passages 112 at the exit end of the flow channel. Recess 113 provides cavity 111 with a greater thickness (and thus a greater cross-sectional area) along the flow path, which may allow some bonding agent to flow faster, thus leading to a region of lower pressure, which may facilitate the injection of a bonding agent into cavity 111, particularly where the gap between interior surface 118 of mechanical restraint member 100 and the outer surface of the piping component is relatively small. It will be appreciated that indentation 113 may be a recessed groove (e.g. as exemplified in FIG. 8B), a concave indentation (e.g. as exemplified in FIG. 8C), or any other suitable profile.

As discussed above, baffle walls 116 may comprise, or be provided with, a flexible gasket material to prevent bonding agent from flowing between baffle walls 116 and the outer surface of the piping system component, thus encouraging bonding agent to follow the complete flow path or channel within each cavity 111. Accordingly, bonding agent exiting vent passage 112 may provide an indication that gap 111 has been substantially filled with bonding agent.

In some embodiments (not shown), the mechanical restraint member 100 is configured to further inhibit bonding agent from exiting vent passage 112 until the gap and/or interstitial space 111 is filled (or substantially filled) with bonding agent. For example, vent passage 112 may be filled with a blocking material that will flow when heated (e.g., a wax). Thus, where the bonding agent is introduced at an elevated temperature, and/or undergoes an exothermic reaction during bonding, bonding agent may be injected until the cavity 111 is filled (or substantially filled) with bonding agent at which time the heat of the bonding agent has heated the blocking material to a sufficient extent that the blocking material can flow and permit bonding agent to escape via the vent passage. Accordingly, bonding agent exiting vent passage 112 may provide an indication that gap 111 has been substantially filled with bonding agent.

Figure 10:
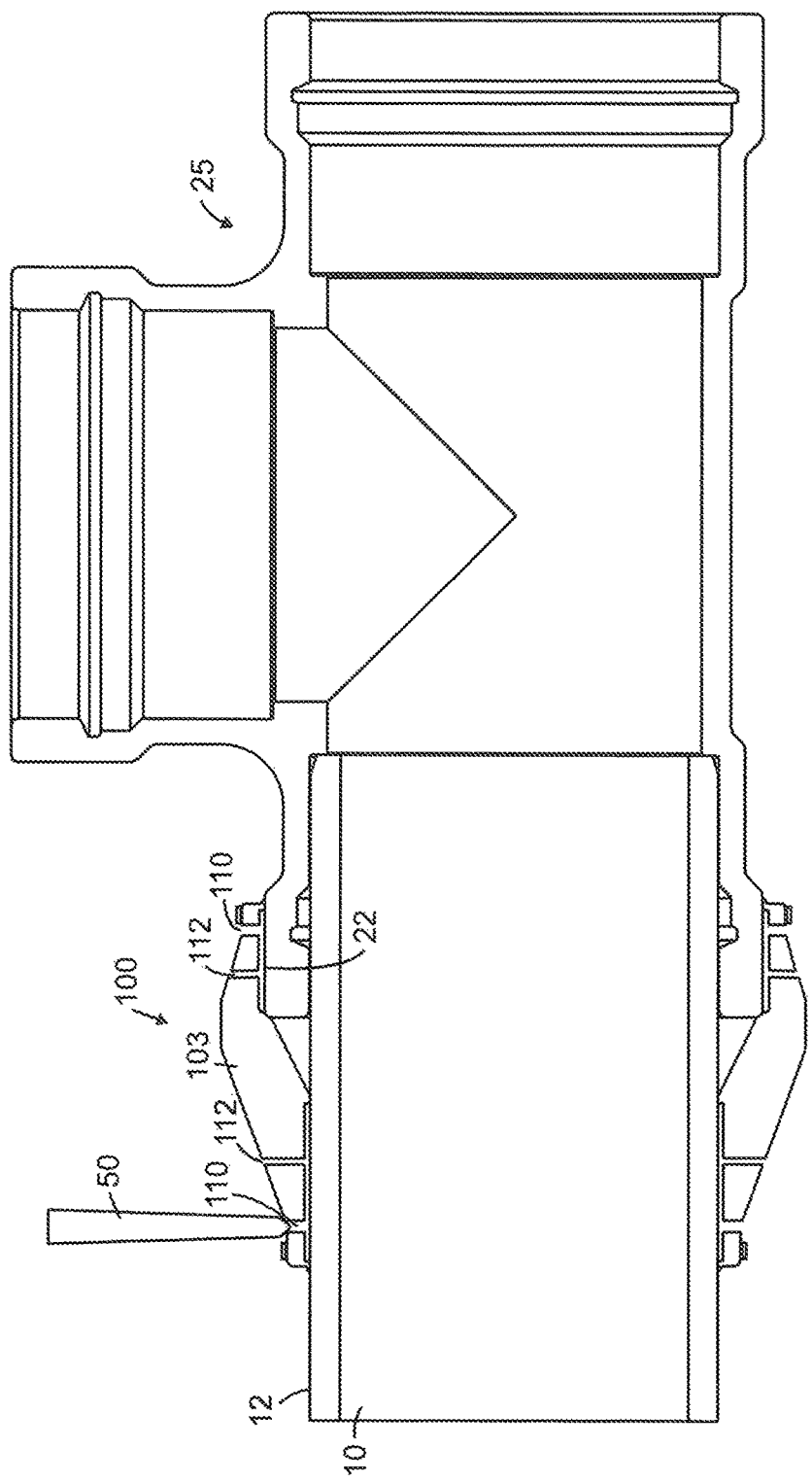
FIG. 10 is a cross-section view of FIG. 6, where a bonding agent is being injected between a mechanical restraint member and the pipe end.

As illustrated in FIGS. 7, 9, and 10, injection passages 110 and vent passages 112 may be provided on a radially outwardly facing face (and optionally centrally along mechanical restraint member 100, e.g., approximately equidistant from longitudinal sides 106, 108). Alternatively, as shown in at least FIG. 8, injection passages 110 vent passages 112 may be provided in the longitudinally extending side walls, and optionally, on the same longitudinal side wall of mechanical restraint member 100 (in this case along longitudinal side 106). Such an arrangement may facilitate access to the injection passages 110 when the mechanical restraint member 100 is affixed to the piping system components, as will be discussed subsequently.

Figure 6:
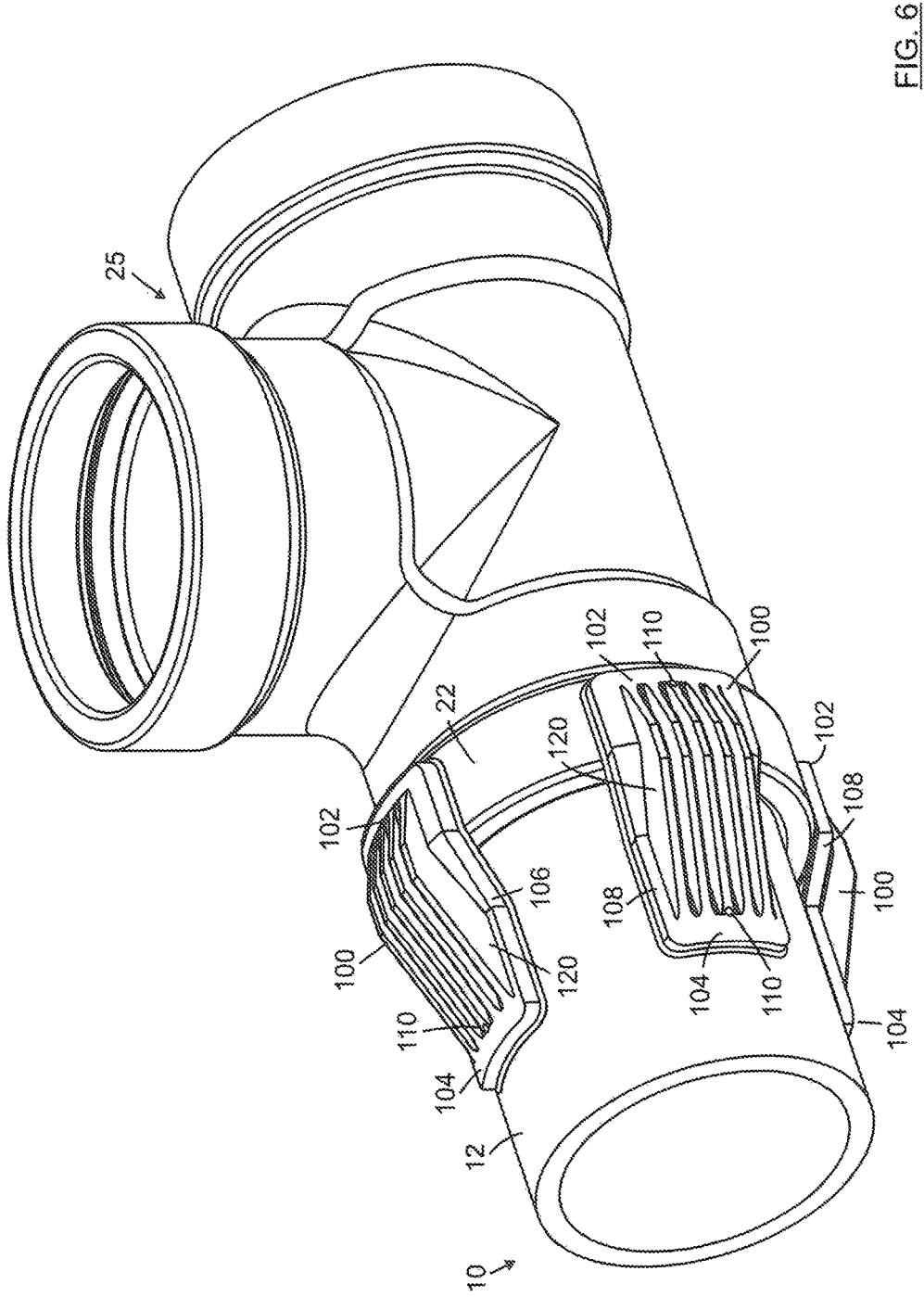
FIG. 6 is a perspective view of the pipe end and T-fitting of FIG. 3 secured with a plurality of mechanical restraint members in accordance with one embodiment of this disclosure.

In FIG. 6, four mechanical restraint members 100 are bonded circumferentially around the joint. It will be appreciated that more or fewer mechanical restraint members may be used. For example, in some embodiments, 2 (see e.g. FIG. 32) or 3 mechanical restraint members may be circumferentially spaced apart about the joint. Alternatively, 5, 6, or more mechanical restraint members may be used. The number which are used will depend, inter alia, on the diameter of the pipe, the lateral width of the mechanical restraint member, the axially outward force to be resisted and the like.

It will be appreciated that the one or more gaskets 30 positioned between outer surface 12 of pipe 10 and inner surface 24 of opening 20 provide the water-tight seal, while mechanical restraint members 100 act to restrain the pipe system components from separating, and do not necessarily provide any sealing capabilities.

Since the mechanical restraint members 100 are chemically bonded to the piping system components, this significantly reduces (if not eliminates) the risk of plastic deformation, cracking, or other structural damage to the piping system components during installation, as compared to, e.g. the apparatus illustrated in FIGS. 4 and 5.

Also, since the area of bonded contact of the mechanical restraint members 100 with the piping system components will generally be much greater than in prior art systems—c.f. the points of contact 46 in FIG. 4 with the area of contact in FIG. 7 between inner surfaces 118 of mechanical restraint member 100 and the outer surface 12 of pipe 10—structural issues relating to e.g. point loading may be substantially reduced or eliminated.

Figure 12B:
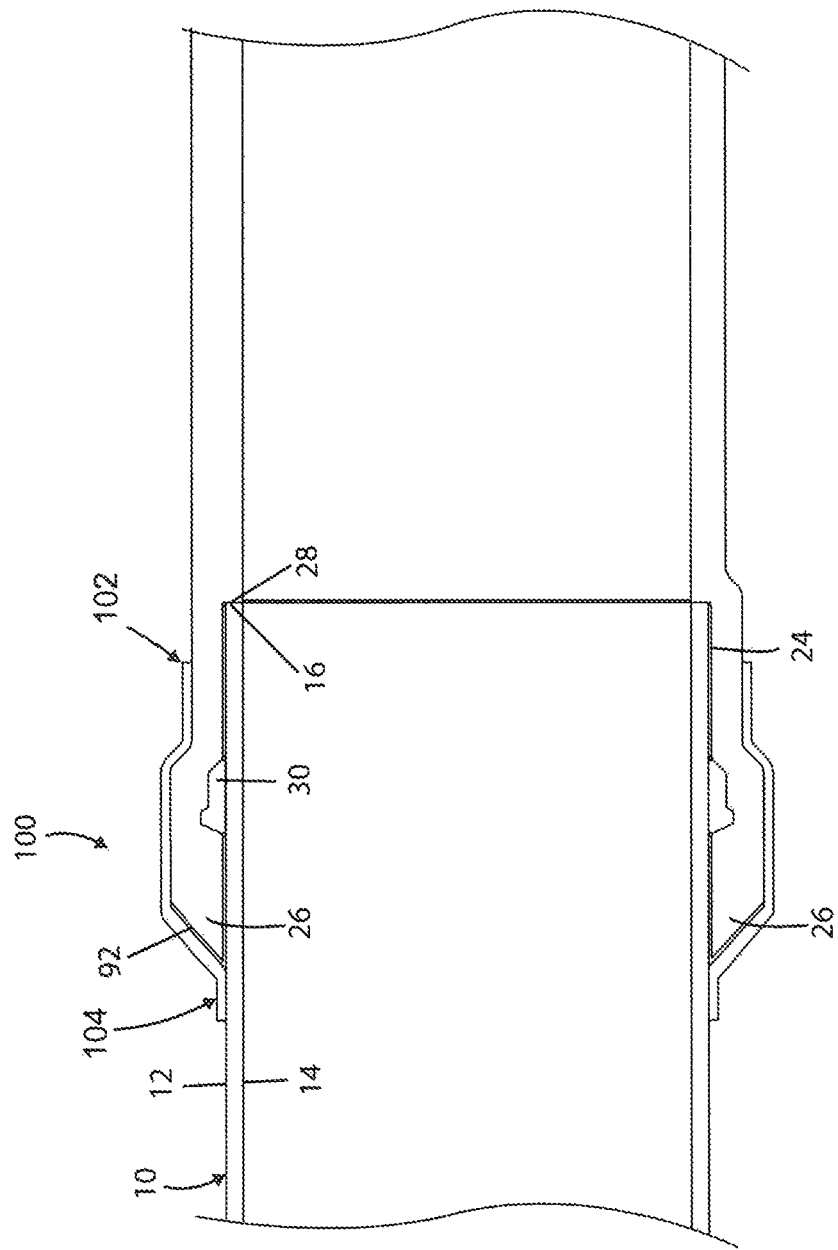
FIG. 12B is a cross-section view of a pipe end and a fitting secured in accordance with one embodiment, where the end face of the fitting is beveled.

Optionally, a transition surface may be provided between the outer surfaces 12, 22, of the components 10, 25 being secured using mechanical restraint member 100. For example, FIG. 12A shows an example of a transition ring 90 positioned about pipe 10 and against end face 26 of opening 20. Transition ring 90 has an outer transition surface 92 that extends between outer surface 12 of pipe 10 and outer surface 22 of opening 20. This outer transition surface 92 provides a less abrupt transition between the piping system components, which may facilitate affixing and bonding mechanical restraint member 100 to surfaces 12, 22. For example, outer transition surface 92 may provide a continuous angled or curved surface from outer surface 12 of pipe 10 to outer surface 22 of fitting 25. Alternatively, it may provide one or more step changes that is more gradual than the single step change from outer surface 12 of pipe 10 to outer surface 22 of fitting 25. An advantage of this design is that the juncture of end face 26 and outer surface 22 will not provide a sharp corner or transition that may wear against or otherwise damage mechanical restraint member 100 over time. It will be appreciated that outer surface 92 may have a variety or profiles and need not extend all the way to the radial outer position of outer surface 12 of pipe 10 and/or all the way to the radial outer position of outer surface 22 of fitting 25. Alternatively or additionally, as exemplified in FIG. 12B, all (or at least a portion of) the end face 26 of opening 20 may be beveled to provide all or a portion of a transition surface 92 between outer surface 12 of pipe 10 and outer surface 22 of opening 20 and accordingly a separate transition ring may not be provided.

Repositionable Securement

In accordance with an aspect of methods to install the mechanical restraint members, the mechanical restraint members may be affixed to the joint so as to maintain the mechanical restraint members in position while the bonding agent is curing or at least curing to a sufficient strength to secure the mechanical restraint members in position. It will be appreciated that the mechanical restraint members may be temporarily affixed in position so as to be repositionable prior to the bonding agent curing.

Each mechanical restraint member 100 may be temporarily secured or affixed in position about the joint using any suitable means. The temporary adhesive may be a releasable adhesive. An advantage of a releasable adhesive is that mechanical restraint member 100 may be removed and repositioned, if needed.

For example, as illustrated in FIG. 7, each mechanical restraint member 100 may be affixed by applying a releasable adhesive, such as a two sided adhesive tape 130, to one or both of all or a portion of perimeter wall 114 of mechanical restraint member 100 (or of the cavities 111) or and the outer surface 12 or 22 of the piping system components. Alternatively, the tape may be permanently affixed on one side (e.g., to the mechanical restraint member) and the other exposed side may be provided with a releasable adhesive and, optionally, a cover layer. Adhesive tape 130 may also be provided on the baffles walls if they are provided. The adhesive enables each mechanical restraint member 100 to be placed on the outer surfaces 12, 22 of the piping system components and to then remain in position. However, if needed, the mechanical restraint member may be removed and repositioned prior to the bonding agent being applied or prior to the bonding agent curing.

In some embodiments, tape 130 may act as a flexible gasket material that can deform against the contours of the outer surface of the piping system component to form or promote a seal against the outer surface of the piping system component to restrain an injected bonding agent within the cavity 111 and/or within a flow path or channel within cavity 111 (as will be discussed further below). For example, tape 130 may comprise a foam tape or a tape capable of being compressed having a sufficient thickness (e.g. in the radial direction when applied to a joint) to accommodate a predetermined dimensional tolerance range between these cooperating (or mating) surfaces of the mechanical restraint member and of the piping components.

In some embodiments, one or more vent passages 112 may be formed in tape 130 (e.g. instead of, or in addition to, vent passages formed in raised walls 114) to allow air to evacuate the gap between the mechanical restraint member 100 and the piping system component as bonding agent is injected.

It will be appreciated that, instead of a releasable adhesive, a weaker adhesive may be provided.

Examples of a temporary adhesive include a low-tack pressure-sensitive adhesive, such as an elastomer (e.g. acrylic, butyl rubber, EVA, natural rubber, nitrile, silicone rubber, styrene block copolymer (SBC), or vinyl ether and the like) compounded with a suitable tackifier.

Alternative methods for positioning and/or affixing mechanical restraint member 100 across a joint will be discussed further below with reference to FIGS. 13-44.

Bonding Agent

In accordance with an aspect of methods to install the mechanical restraint members, the mechanical restraint members may be secured to the joint by a bonding agent. The bonding agent may be provided in the cavity or cavities 111 before and/or after the mechanical restraint members are affixed to the joint. The bonding agent may comprise a chemical or thermal bonding agent that is compatible with the mechanical restraint member 100 and with the piping system component to which it is to be bonded.

Examples of suitable bonding agents include a thermoplastic or a thermoset material, such as polyurethanes (PUR), or reactive urethanes, polyesters, polyacrylates, methyl acrylates (solvented or unsolvented), latex-based, or gelatin-based adhesives.

The bonding agent may be selected based on the composition of the pipe system component and the mechanical restraint member 100 that are to be bonded. In some embodiments, the bonding agent is made of a similar material to that of the pipe component and the mechanical restraint member. Accordingly, once cured, the interstitial gap or clearance between the pipe component and the mechanical restraint member (e.g., the cavity) may have a similar composition to that of the pipe component and the mechanical restraint member. Also, it may be considered easier to bond members and components using a bonding agent that is made of a similar material. For example, if the pipe component and the mechanical restraint member are made of PVC or CPVC, then the bonding agent may comprise PVC and/or CPVC.

In some embodiments, the bonding agent may be a chemically activated bonding agent (e.g. a multi-component adhesive that forms an adhesive when the components are combined), such as polyester resin / polyurethane resin, polyols/polyurethane resin, and acrylic polymers / polyurethane resin combinations, and the like. A preferred bonding agent is a two-component reactive acrylic adhesive. Testing using the 811™ 2-part high strength reactive adhesive available from Weld-On Adhesives, Inc., of Compton, Calif., U.S.A showed acceptable performance.

A bonding agent may alternatively be a thermally activated bonding agent. Such bonding agents may be a plastic (e.g. a thermoplastic or a thermoset material). Accordingly, the bonding agent may be a plastic that will melt, at least partially, and adhere to the mechanical restraint member 100 and/or the conduit to which it is being joined. Accordingly, a thermally activated bonding agent may have the same composition as the conduit and/or the mechanical restraint member 100. Alternatively, it may be an adhesive that is activated when heated so as to adhere to the conduit. The bonding agent may comprise a thermal plastic urethane.

It will be appreciated that the bonding agent may be solid at room temperature. Accordingly, the bonding agent may be provided in cavity 111 when the mechanical restraint member is attached to the joint.

It will be appreciated that some bonding agents may be activated or catalyzed at least partly by modes other than thermal or chemical activation (e.g. at room temperature). For example, the bonding agent may be a light curing adhesive, such as a UV curing adhesive, or a moisture curing adhesive, which may begin to cure in the presence of moist air. Accordingly, such a bonding agent may be applied to mechanical restraint member 100 in a controlled environment, such as a dry air environment, and packaged in a moisture and/or light impermeable container, such as a sealed foil bag. Mechanical restraint member 100 may be transported and stored in such packaging, and only removed shortly or immediately before use. For example, the bonding agent may be activated by exposure to the ambient. For example, the bonding agent may be a solvent based adhesive which bonds to the conduit when the solvent evaporates. In such a case, the bonding agent may be maintained in an air tight container until use.

Where the bonding agent is injected into the cavity or cavities 111, the cavities are preferably filled with bonding agent. Where a non-injectable bonding agent is used, the bonding agent may be provided as a thin layer of material. For example, whether the cavity is prefilled or the bonding agent is injected, the bonding agent may have a thickness of from 0.001 to 0.375 inches, more preferably from 0.01 and 0.125 inches, and most preferably from 0.02 and 0.08 inches. An advantage of this design is that a relatively small amount of heat may be required to melt or activate the bonding agent and accordingly only the outer portion of the wall of the conduit may be melted.

In some embodiments, a bonding agent may have a melting or activation temperature that is proximate that, and optionally greater than, the melting temperature of the conduit to which it is applied. For example, the bonding agent may have a melting or activation temperature that is approximately equal to, or from 100% to 120%, from 100% to 110%, from 100% to 105%, or from 100% to 102% of the melting temperature of the conduit to which it is to be attached (wherein the percentage is a percentage of the melting temperature of the conduit). Where the melting or activation temperature of the bonding agent is greater than the melting temperature of the conduit to which it is applied, the thickness of the bonding agent is preferably less than the thickness of the wall of the component to which the bonding agent is applied, so that the bonding agent does not have enough thermal energy to significantly melt or deform the piping component. For example, where the melting or activation temperature of the bonding agent is about 20% greater than the melting temperature of the conduit to which it is applied, the thickness (and thus the relative volume) of the bonding agent should be less than about 20% of the wall thickness of the component to which the bonding agent is to be applied. A similar ratio may be used for other differences in the melting temperature. An advantage of this design is that only the outermost portion of the conduit will undergo slight melting and this will limit the extent to which the pipe may be degraded by heating. For example, the conduit may have a wall thickness of, e.g., 0.5-1.5 inches and only the outmost 25%, or 20%, or 15%, or 10%, or 2-5% of the wall may be heated above its melting point during bonding of the mechanical restraint member 100 to the conduit.

Alternatively, the bonding agent may have a melting or activation temperature that is below the melting temperature of the conduit to which the mechanical restraint member 100 is to be attached, from 99% to 95%, from 95% to 90%, from 90% to 80%, or from 80% to 70% of the melting temperature of the conduit to which it is to be attached. An advantage of this design is that the outer surface of the conduit may not undergo melting during the bonding process. It will be appreciated that, in other cases, the melting or activation temperature may be substantially below the melting temperature of the conduit to which it is to be attached.

As discussed previously, the bonding agent may be provided only on first and second end portions of the inner surface of mechanical restraint member 100 (i.e., in cavities 111). Alternatively, in some embodiments the bonding agent may be provided on all portions of the inner surface of mechanical restraint member 100.

Methods of Securing Two Pipe Members with Mechanical Restraint Members

FIGS. 13 to 44 exemplify methods and apparatus for securing piping system components using a mechanical restraint member. In general, the methods include connecting the piping system components using, e.g., an insertion fit, affixing a plurality of mechanical restraint members across the joint, and bonding the mechanical restraint members to the piping system components. It will be appreciated that the features of mechanical restraint member 100 and methods of applying a plurality of mechanical restraint members 100 to secure two component of a piping system may be used in any particular combination or sub-combination.

FIGS. 13 to 15 exemplify one embodiment of a method of applying a plurality of mechanical restraint members to secure two components of a piping system utilizing a positioning template 200. First, as illustrated in FIG. 13, the components are joined to create a seal using any technique known in the art. For example, an insertion fit may be used, in this case by inserting pipe end 16 into opening 20 of fitting 25. One or more gaskets 30 may be provided to provide a fluid-tight seal between the components, as discussed above.

Once the components of the piping system are positioned as desired with any desired sealing system, a positioning template 200 is wrapped around all or a portion of at least one of the two components being joined (in this case around the outer surface 12 of pipe 10). Positioning template 200 is preferably a sheet of flexible material, such as paperboard, plastic film, and the like, which has a plurality of cut-outs 210. Cut-outs 210 are dimensioned so that when template 200 is wrapped around the outer surface 12 of pipe 10, portions of outer surface 12—corresponding to preferred locations for affixing mechanical restraint members 100—are not covered by template 200. These cut-outs thus assist a user in positioning each of the plurality of mechanical restraint members 100 with a desired axial spacing and/or longitudinal alignment about pipe 10.

Next, with the aid of template 200, as shown in FIG. 15 a plurality of mechanical restraint members 100 are affixed across the joint, so that the perimeter wall of the cavity or cavities are in contact with the joint. For example, all or a portion of the inner surface of mechanical restraint member 100 (e.g. raised wall or lip 114) at a first end 102 is in contact with an outer surface 22 of one component (in this case fitting 25), and so that all or a portion of the of mechanical restraint member 100 (e.g. raised wall or lip 114) at a second end 104 is in contact with an outer surface 12 of the other component (in this case pipe 10). In this example, each mechanical restraint member 100 is affixed to the piping system components with a tape 130.

As exemplified in FIG. 15, injection ports 110 may be provided on the upward facing longitudinal face of the mechanical restraint members. Accordingly, two different designs of mechanical restraint members may be provided. As shown, mechanical restraint members 100a have their injection ports 110 provided on one of the longitudinal sides 106, while mechanical restraint members 100b have their injection ports 110 provided on the opposite longitudinal side 108. Optionally, venting ports 112 may be provided on the same side at the injection opening 110. Such an arrangement may facilitate access to the injection ports, particularly where the piping components are positioned in an environment with adjacent obstructions (e.g. if the piping components are in a ditch, with limited spacing between the piping components and the lower and/or side walls of the ditch). In such a case, the cavity or cavities 111 may be filed by a worker reaching down to inject the bonding agent into cavity or cavities 111.

Once the mechanical restraint members 100 are affixed across the joint, a bonding agent is injected through injection openings 110, thereby bonding the mechanical restraint members 100 to the piping system components.

It will be appreciated that template 200 may be removed after the mechanical restraint members have been affixed across the joint, or after the mechanical restraint members have been bonded to the piping system components. Alternatively, template 200 may be left in place.

Figure 18:
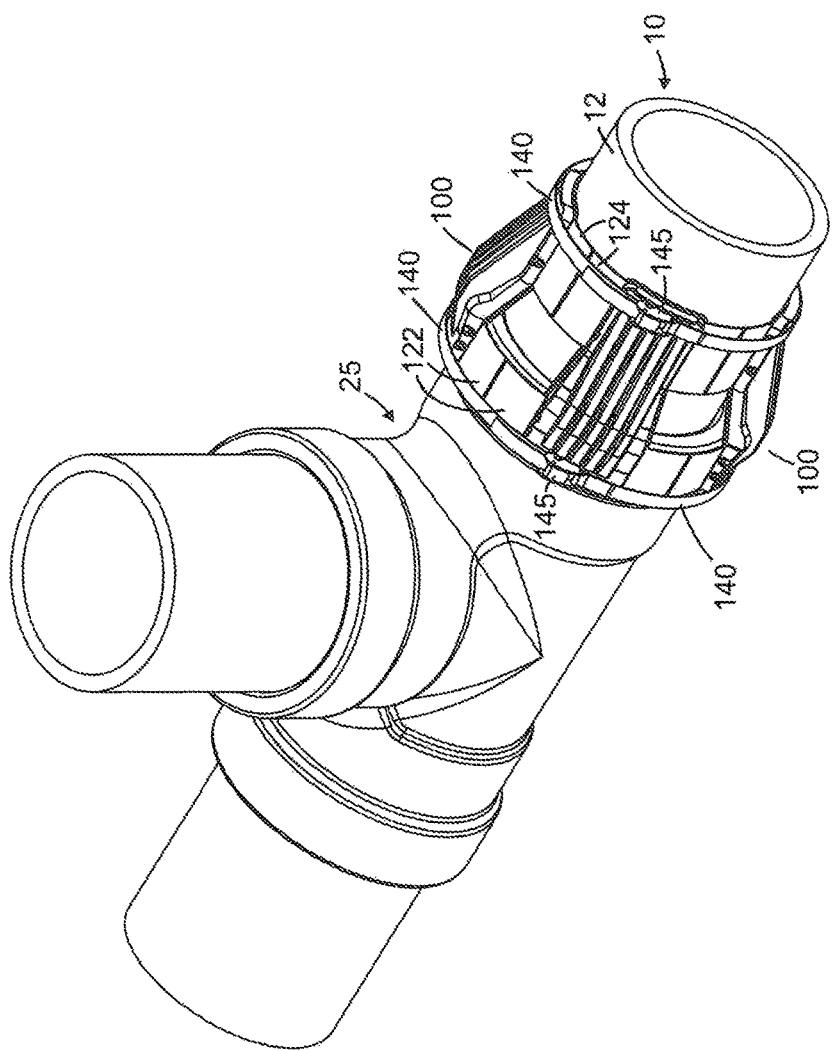
FIG. 18 is a perspective view of the pipe end and T-fitting of FIG. 17, with the tether straps secured around the outside of the mechanical restraint members.

FIGS. 16 to 18 exemplify another embodiment of a method of applying a plurality of mechanical restraint members to secure two components of a piping system. In the illustrated embodiment, a plurality of mechanical restraint members are provided on a flexible substrate and are spaced apart thereon. A tether strap 140 is used to secured the mechanical restraint members in position during the injection of the bonding agent. An advantage of the tether straps is that, during the injection process, the amount of pressure that is applied to the bonding agent to cause it to flow into the cavity may be sufficient to overcome the adhesive force of the temporary adhesive. This could result in the mechanical restraint members moving radially away from part or all of the joint. The tether straps provide a restraining force to secure the mechanical restraint members into position during the injection process. Accordingly, sufficient pressure may be applied to the bonding agent to cause it to flow, e.g., through the flow passage to the venting openings 112 without concern that mechanical restraint members 100 may become dislodged.

The flexible substrate may be sized to extend around a joint of a particular diameter. One or more flexible substrates may be used. As exemplified, a flexible substrate may be provided for each end 102, 104. Referring to FIG. 16, mechanical restraint members 100 each have a first pair of flanges 122 extending from longitudinal sides 106, 108 proximate the first end 102 of mechanical restraint member 100, and a second pair of flanges 124 extending from longitudinal sides 106, 108 proximate the second end 104 of mechanical restraint member 100. Flanges 122, 124 may be formed as an integral part of mechanical restraint members 100, such as during the manufacturing process. Alternatively, flanges 122, 124 may be coupled (e.g. bonded, welded, mechanically affixed such as by male and female engagement members) to mechanical restraint member 100 prior to or as part of the connection process. Alternatively, each mechanical restraint member 100 may be provided with individual flanges 122, 124 and the flanges may be connected together to create an assembly having a suitable length to extend around a joint. Mechanical restraint member 100 may be otherwise similar to the mechanical restraint member 100 of FIGS. 13-15.

As shown in FIG. 16, the flanges of adjacent mechanical restraint members 100 are pivotally and/or flexibly attached each other, forming a linked 'belt' or connecting band of mechanical restraint members 100. Such a 'belt' of mechanical restraint members 100 can then be draped over and/or wrapped around the joint, as shown in FIG. 17, with the joined flanges providing a desired spacing and/or alignment of the mechanical restraint members 100. The flanges of adjacent mechanical restraint members 100 may be attached by any suitable means, such as by an adhesive, welding, one or more hinges, engagement members, etc.

In accordance with the method as illustrated in FIG. 16, once the components are positioned as desired with any desired sealing system, the 'belt' of mechanical restraint members 100 may be draped and/or wrapped about the joint to contact the joint as discussed with respect to FIGS. 13-15. In this embodiment, the belt is draped over the top of the joint. It will be appreciated that the centre of the belt need not be at the top of the joint but may be at any other desired position. For example, if the joint is overhead, the centre of the belt may be at the bottom of the joint.

Once the mechanical restraint members are in a desired position, tether straps 140 are wrapped around the mechanical restraint members 100 and tightened and/or secured using tether locks 145, as shown in FIG. 18, thereby affixing the mechanical restraint members to the piping components to be joined. Tether straps may be any elongate flexable material that may be used to secure the assembly in position for application of the bonding agent. For example, it may be a plastic, cloth, or metal strip. The strap may be secured together to form an annular band around the joint using any locking technique known in the joint arts. For example, the strap may be tied in a knot, or a locking member may be used (e.g., male and female engagement members, hook and loop fasteners, a clamp of the like).

Once the mechanical restraint members 100 are affixed around the joint, a bonding agent is injected through injection openings 110, thereby bonding the mechanical restraint members 100 to the piping system components.

It will be appreciated that tether straps 140 may be removed after the mechanical restraint members have been bonded to the piping system components. Alternatively, tether straps 140 may be left in place.

An advantage of leaving tether straps 140 in place is that they may act to resist radial outward forces and/or movement of the components. For example, tether straps 140 may prevent one or both of the joined piping system components from bulging or otherwise radially deforming, which may prevent the components and/or the seal between them from leaking, cracking, or otherwise becoming damaged due to radial components of forces imposed by the internal hydraulic pressure of fluid being conveyed through the joined piping components (e.g. internal fluid pressure which tends to separate the coupled components) and/or those forces imposed by a flowing mass of liquid within the piping system when it changes direction.

Figure 19:
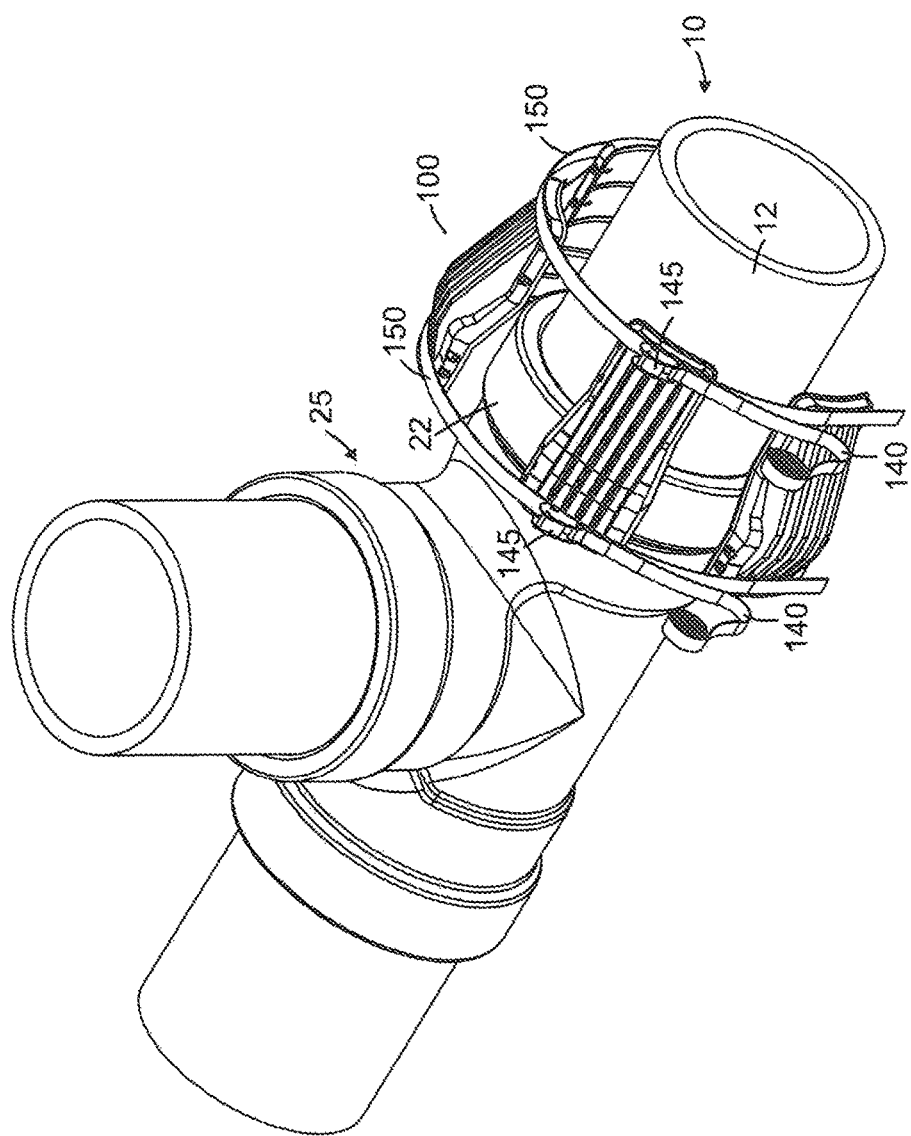
FIG. 19 is a perspective view of the pipe end and T-fitting of FIG. 13, with a 'belt' of mechanical restraint members draped over the joint in accordance with another embodiment.
Figure 20:
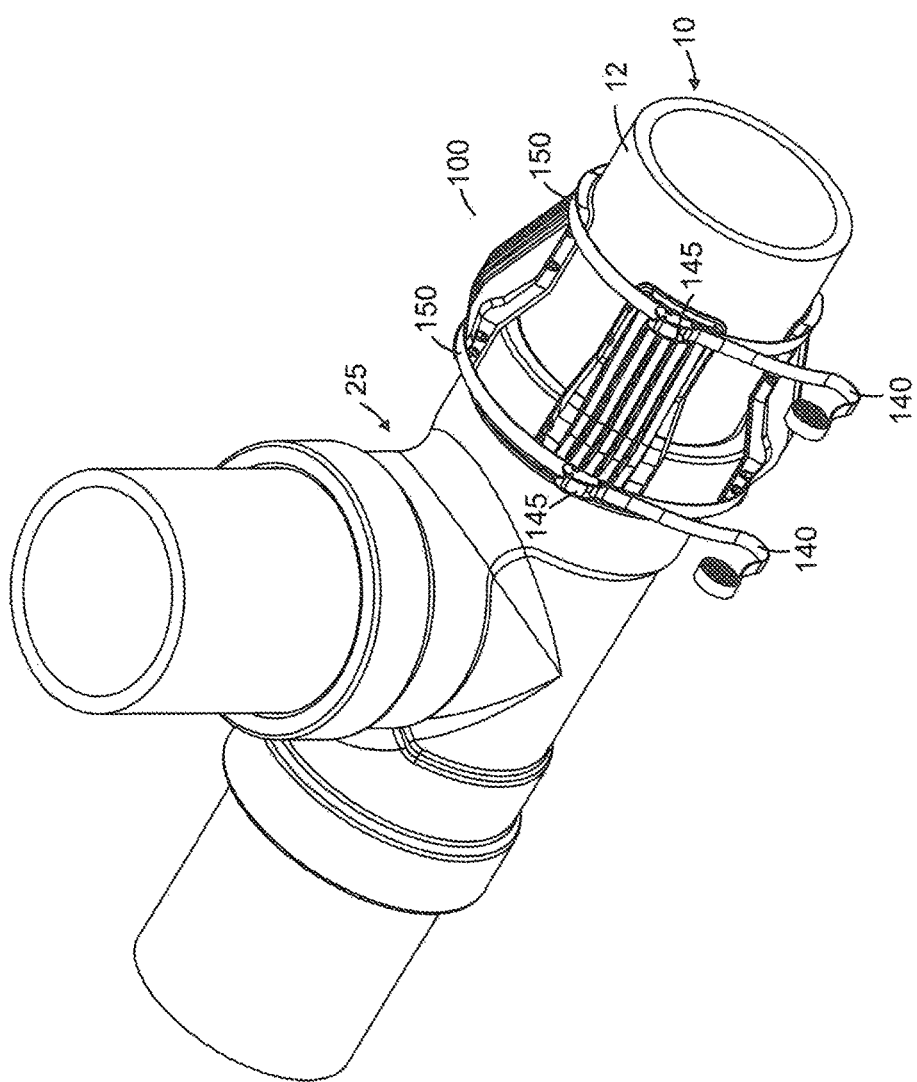
FIG. 20 is a perspective view of the pipe end and T-fitting of FIG. 19, with the mechanical restraint members positioned against the outer surfaces of the pipe end and T-fitting using a releasable adhesive with the tether straps in an unsecured configuration.

FIGS. 19 and 20 exemplify another embodiment of a method of applying a plurality of mechanical restraint members to secure two components of a piping system. In the illustrated embodiment, mechanical restraint members 100 are connected to each other via assembly straps 150, forming a linked 'belt' of mechanical restraint members 100. Accordingly, instead of using flanges 122, 124 with a tether strap 140, the mechanical restraint members may be secured in a spaced apart relationship along assembly straps 150 and tether straps 140 may then be used to tighten the assembly straps 150.

Figure 24:
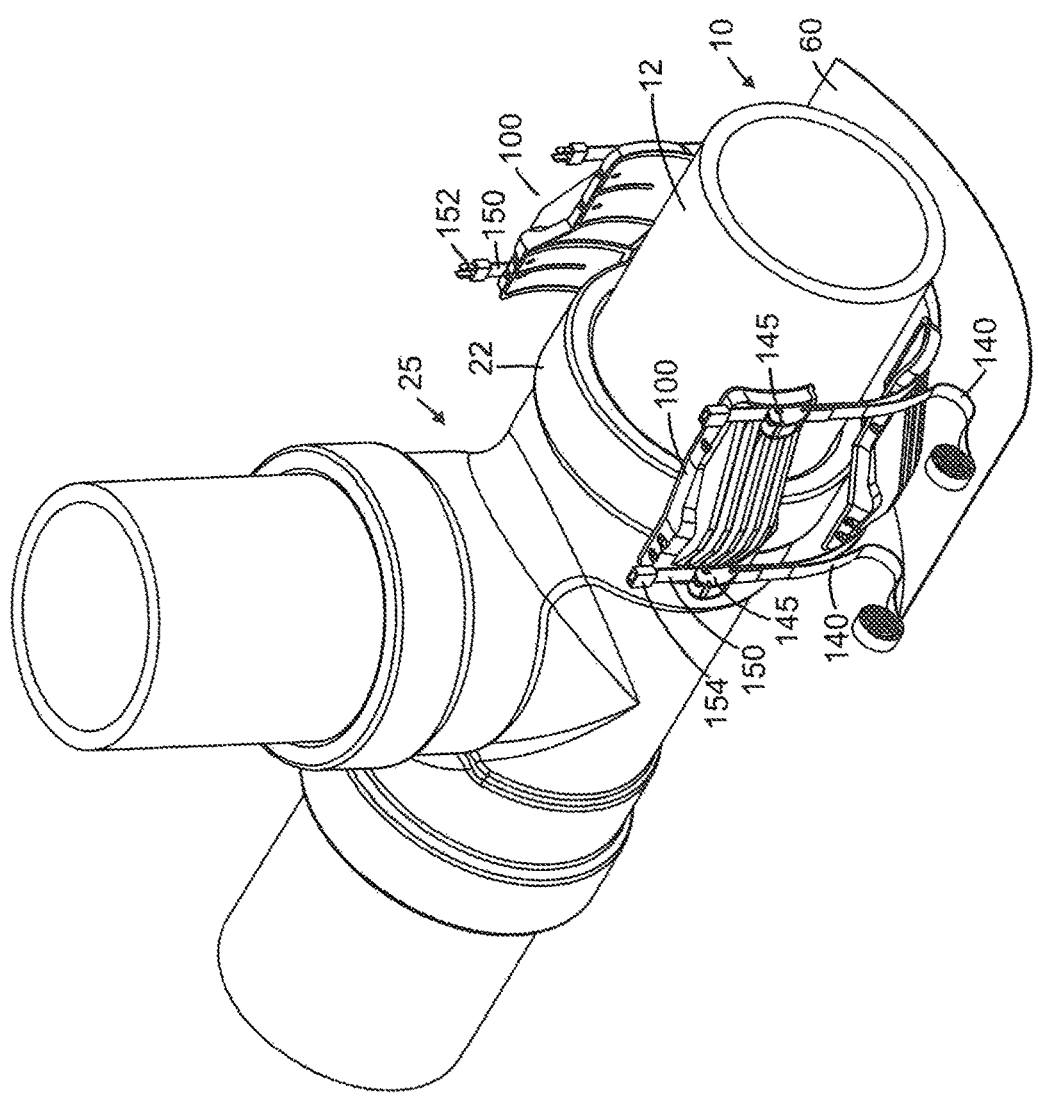
FIG. 24 is a perspective view of the pipe end and T-fitting of FIG. 13, with a 'belt' of mechanical restraint members positioned around the joint in accordance with another embodiment.

Accordingly, once the components of the piping system are joined and the mechanical restraint members are affixed in a desired position, assembly straps 150 are wrapped around the mechanical restraint members 100 and joined together by any technique known in the joining arts. An example of such a method is shown in FIG. 24 wherein one end of each assembly strap 150 is provided with a male engagement member 152, and the other end of each assembly strap 150 is provided with a female engagement member 154. Accordingly, male engagement member 152 may be inserted into female engagement member 154 and then tether strap 140 may be tightened and/or secured using tether locks 145, as shown in FIG. 20, thereby affixing the mechanical restraint members to the piping components for the injection of the bonding agent.

It will be appreciated that tether straps 140 and/or assembly straps 150 may be removed after the mechanical restraint members have been bonded to the piping system components. Alternatively, tether straps 140 and/or assembly straps 150 may be left in place. As noted previously, an advantage of leaving tether straps 140 in place is that they may act to resist radial outward forces and/or movement of the components.

Figure 21:
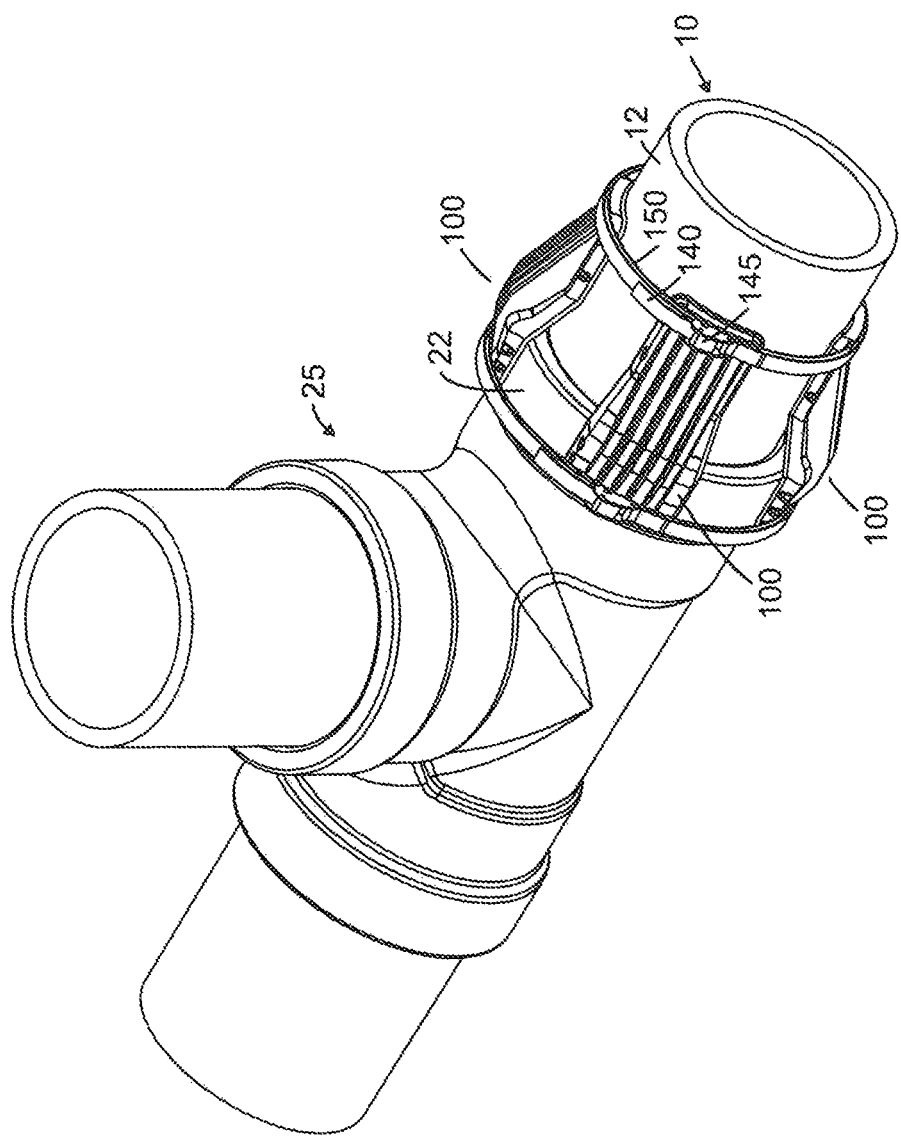
FIG. 21 is a perspective view of the pipe end and T-fitting of FIG. 20, with the tether straps secured around the outside of the mechanical restraint members.

FIG. 21 exemplifies another embodiment wherein tether straps are used by themselves to secure the mechanical restraint members in position for the injection of the bonding agent. Accordingly, once the mechanical restraint members are affixed to the joint using, e.g., a releasable adhesive, tether straps 140 are used to secured the mechanical restraint members in position. Accordingly, one end of the tether strap may be secured to the other end by any technique known in the joining arts, such as by threading one end through a clamp provided on the other end.

Figure 22:
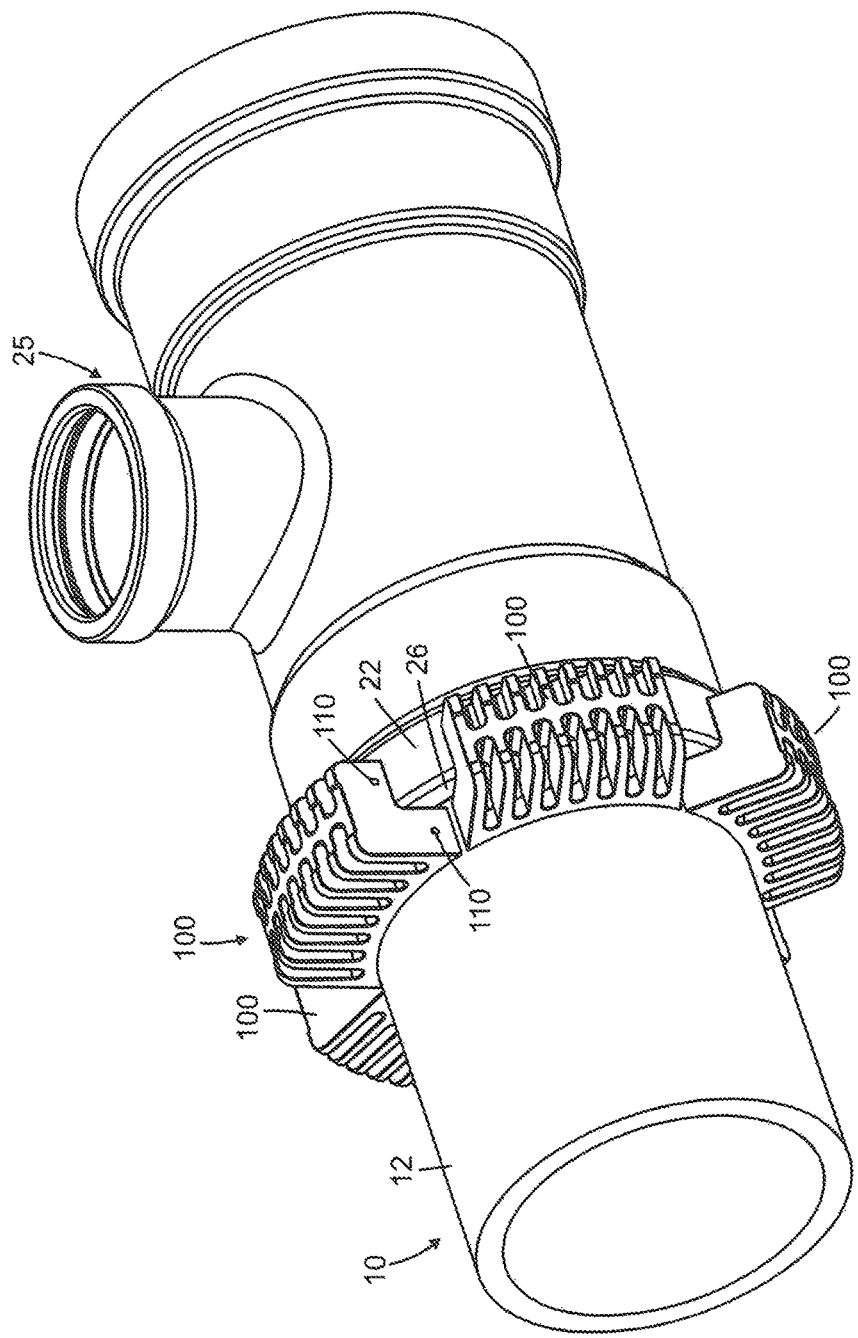
FIG. 22 is a perspective view of a pipe end and T-fitting with a plurality of the mechanical restraint members of FIG. 8C positioned across the joint.
Figure 23:
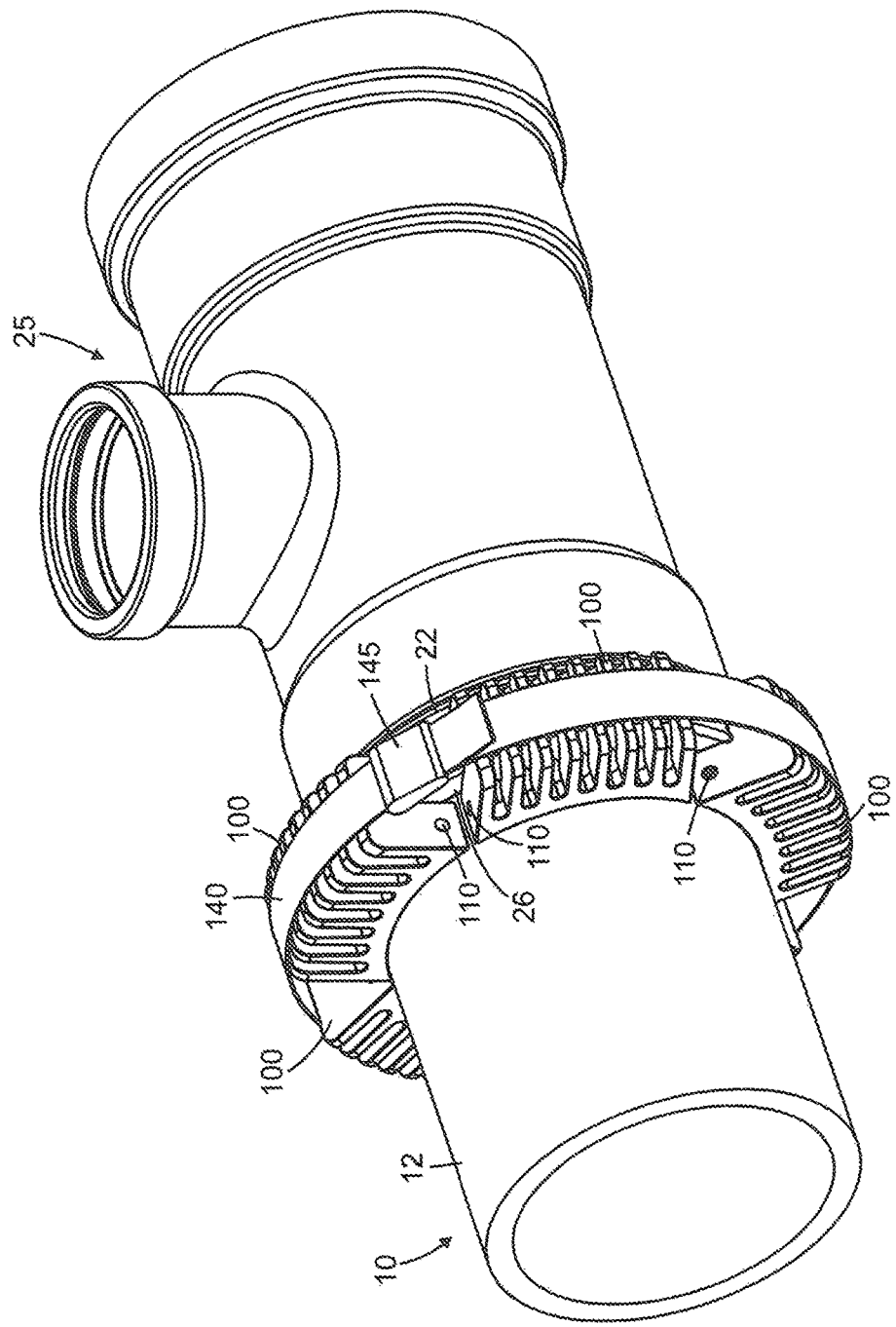
FIG. 23 is a perspective view of the pipe end and T-fitting of FIG. 22, with a tether strap secured around the outside of the mechanical restraint members.

FIGS. 22 and 23 exemplify another embodiment wherein tether straps are used by themselves to secure the mechanical restraint members in position for the injection of the bonding agent. Accordingly, once the mechanical restraint members are affixed to the joint using, e.g., a releasable adhesive, as shown in FIG. 22, tether straps 140 are used to secured the mechanical restraint members in position. Accordingly, one end of the tether strap may be secured to the other end by any technique known in the joining arts, such as by threading one end through a clamp provided on the other end.

Figure 25:
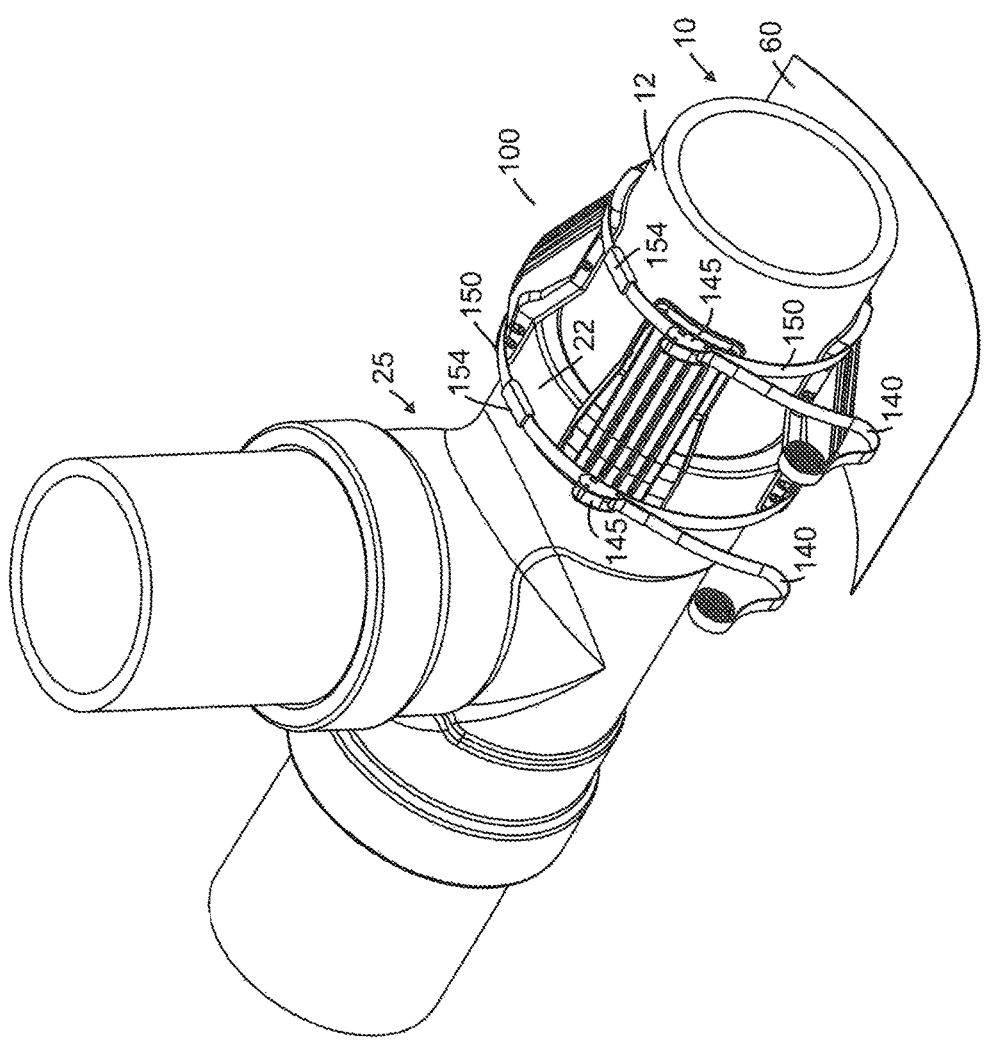
FIG. 25 is a perspective view of the pipe end and T-fitting of FIG. 24, with the mechanical restraint members positioned against the outer surfaces of the pipe end and T-fitting.
Figure 26:
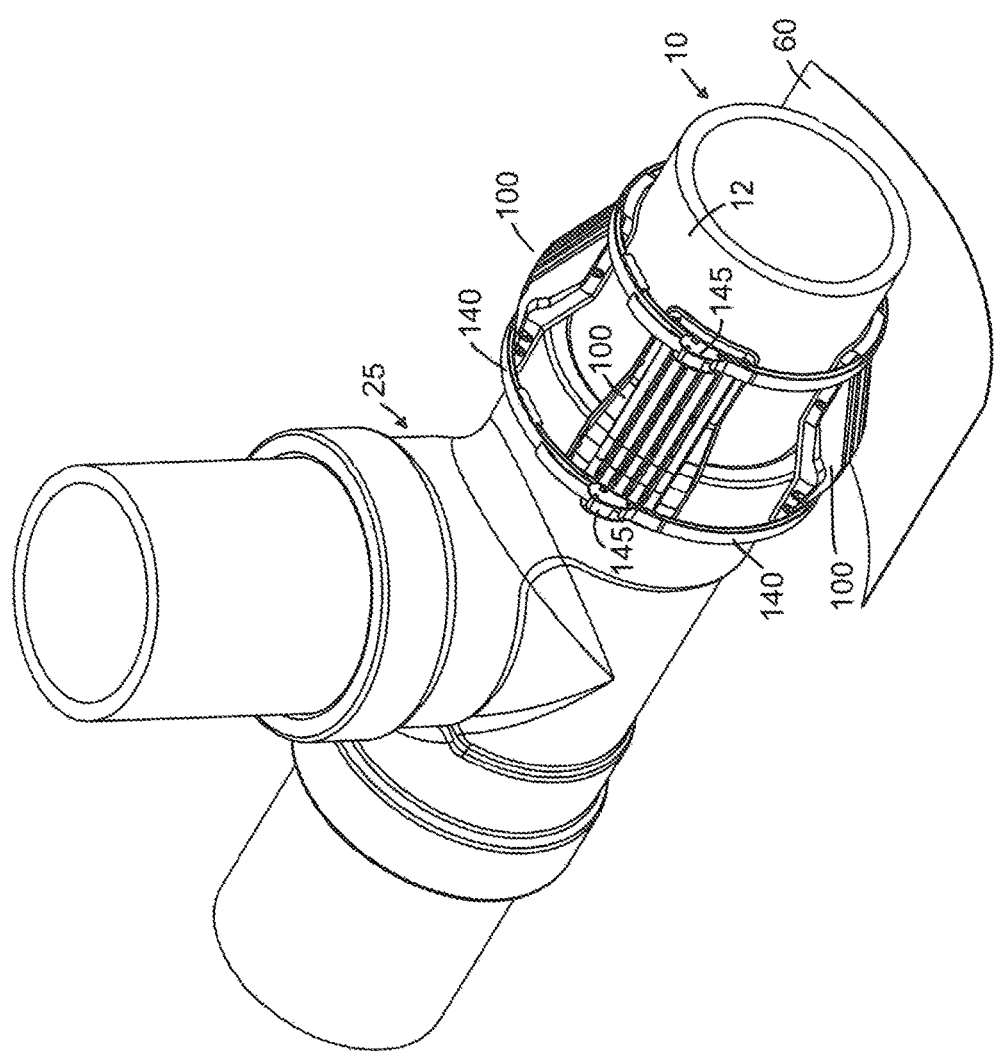
FIG. 26 is a perspective view of the pipe end and T-fitting of FIG. 25, with the tether straps secured around the outside of the mechanical restraint members.

FIGS. 24 to 26 exemplify another embodiment of a method of applying a plurality of mechanical restraint members to secure two components of a piping system. Similar to the method described above with reference to FIGS. 19 and 20, mechanical restraint members 100 are connected to each other via an assembly strap 150, forming a linked 'belt' of mechanical restraint members 100.

For example, as shown in FIG. 24, the 'belt' of mechanical restraint members 100 with locking tabs may be positioned underneath the joint, and the locking strap members brought together and joined above the joint, as shown in FIG. 25, forming continuous bands of assembly straps 150. The position of the mechanical restraint members 100 may then be adjusted (if necessary) so that all or a portion of the inner surface of mechanical restraint members 100 (e.g. raised wall or lip 114) at a first end 102 is in contact with an outer surface 22 of one component (in this case fitting 25), and so that all or a portion of the of mechanical restraint members 100 (e.g. raised wall or lip 114) at a second end 104 is in contact with an outer surface 12 of the other component (in this case pipe 10). Having continuous bands of assembly straps 150 may facilitate positioning the mechanical restraint members 100, particularly in embodiments where a temporary adhesive is not provided on the mechanical restraint members.

Once the mechanical restraint members are in a desired position, tether straps 140 are wrapped around the mechanical restraint members 100 and tightened and/or secured using tether locks 145, as shown in FIG. 26, thereby affixing the mechanical restraint members to the piping components to be joined. Preferably, male and female assembly strap locking members 152, 154 are coupleable in a manner that allows for some linear adjustment when connected to each other, so that when the tether straps 140 are tightened and/or secured using tether locks 145, the effective length of the coupled assembly straps 150 may decrease, to prevent wrinkling and/or pinching of assembly straps 150.

Once the mechanical restraint members 100 are affixed across the joint, a bonding agent is injected through injection openings 110, thereby bonding the mechanical restraint members 100 to the piping system components.

It will be appreciated that tether straps 140 and/or assembly straps 150 may be removed after the mechanical restraint members have been bonded to the piping system components. Alternatively, tether straps 140 and/or assembly straps 150 may be left in place. As noted previously, an advantage of leaving tether straps 140 in place is that they may act to resist radial outward forces and/or movement of the components.

Figure 27:
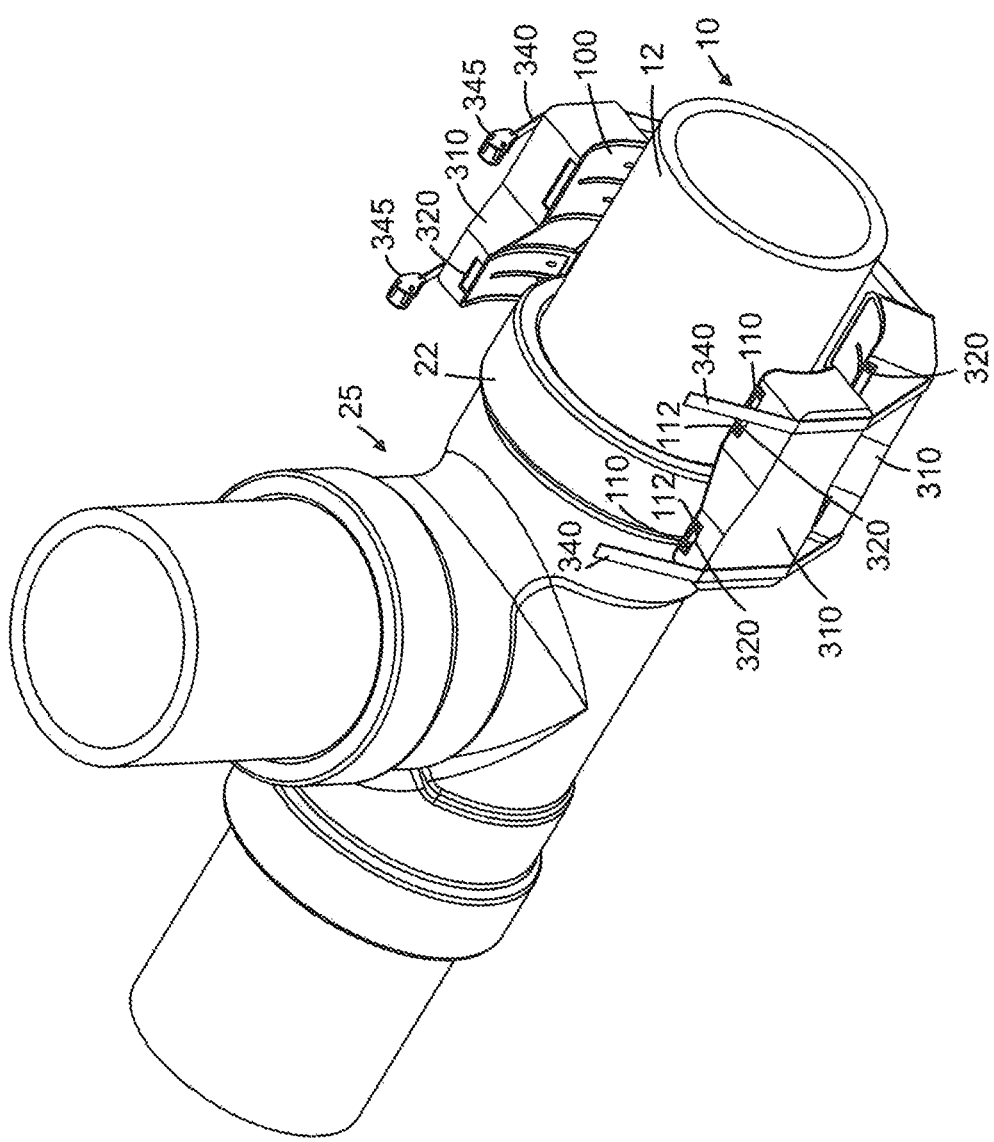
FIG. 27 is a perspective view of the pipe end and T-fitting of FIG. 13, with an assembly tool loaded with mechanical restraint members positioned around the joint in accordance with another embodiment.
Figure 28:
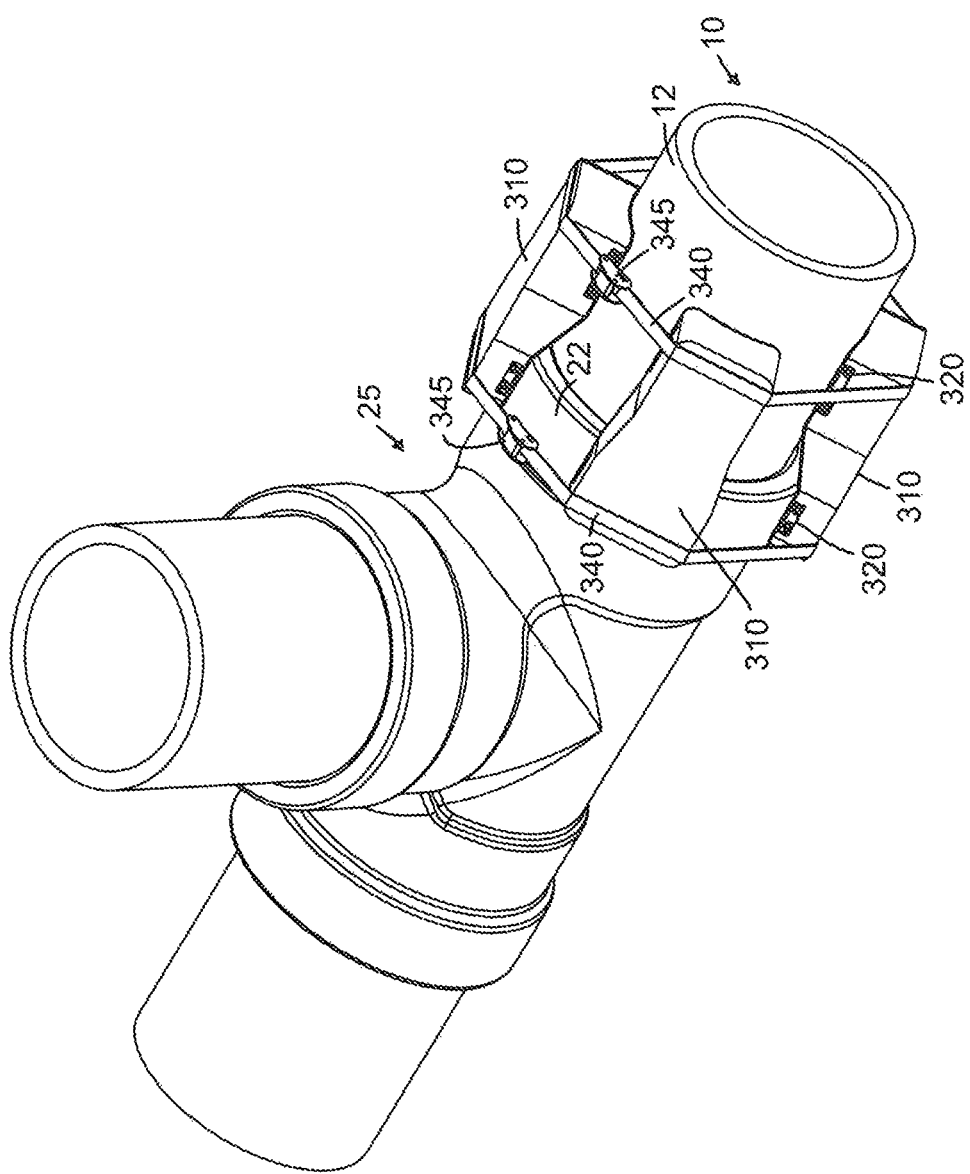
FIG. 28 is a perspective view of the pipe end and T-fitting of FIG. 27, with the mechanical restraint members affixed across the joint using the assembly tool.
Figure 29:
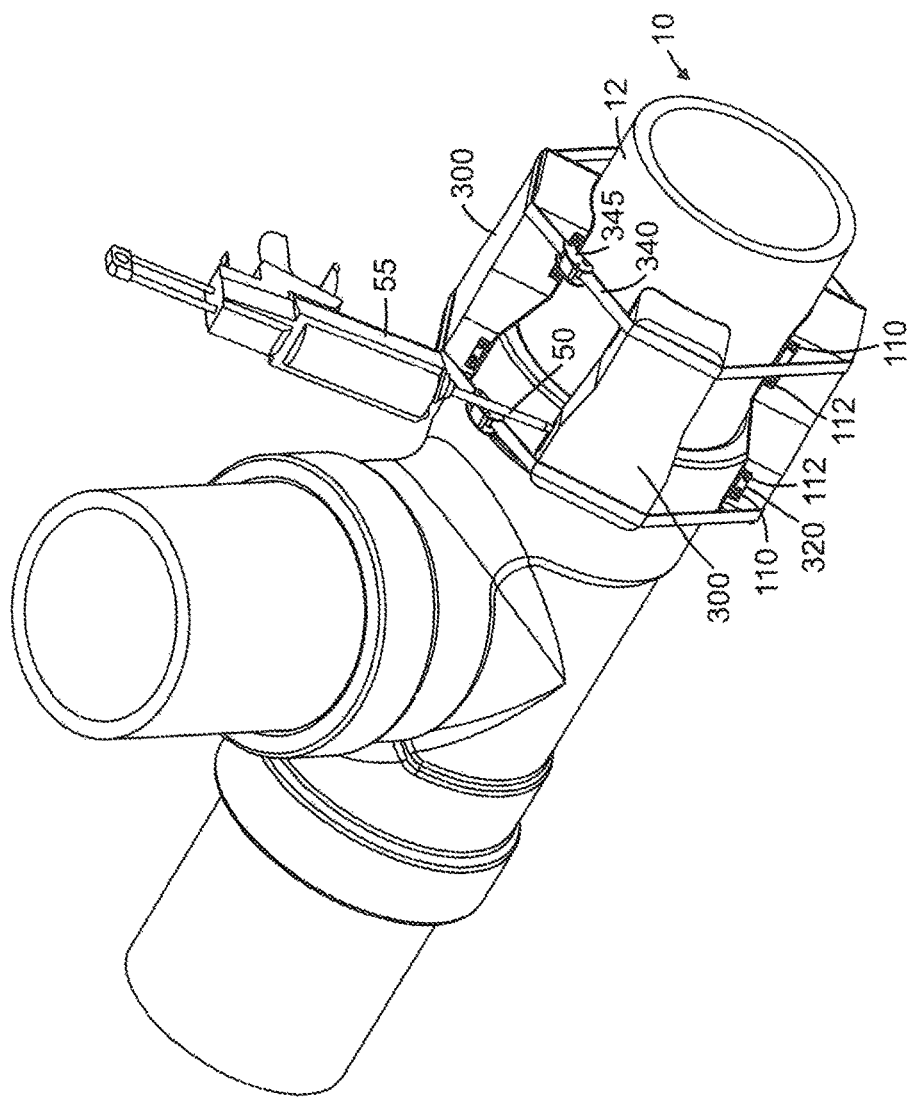
FIG. 29 is a perspective view of the pipe end and T-fitting of FIG. 28, with a bonding agent being injected between a mechanical restraint member and the T-fitting.

FIGS. 27 to 29 exemplify another embodiment of a method of applying a plurality of mechanical restraint members to secure two components of a piping system, utilizing a reusable assembly strap tool 300. Assembly strap tool 300 includes a plurality of baskets 310 connected to a pair of straps 340 in a fixed spacing along the straps 340, forming a linked 'belt' of baskets 310. Each basket is configured to releasably hold a mechanical restraint member 100. Strap 340 may be attached to baskets 310 by any suitable means, such as by an adhesive, welding, one or more hinges, etc.

In use, a mechanical restraint member 100 is positioned in each basket 310, and the strap tool 300 can then be draped over and/or wrapped around the joint, as shown in FIG. 27, with strap 340 providing a desired spacing and/or alignment of the baskets (and thus the mechanical restraint members 100).

First, as illustrated in FIG. 27, once the piping components are positioned as desired with any desired sealing system, the strap tool 300 loaded with mechanical restraint members 100 is draped and/or wrapped about the joint and the position of the mechanical restraint members 100 may be adjusted (if necessary) so that all or a portion of the inner surface of mechanical restraint members 100 (e.g. raised wall or lip 114) at a first end 102 is in contact with an outer surface 22 of one component (in this case fitting 25), and so that all or a portion of the of mechanical restraint members 100 (e.g. raised wall or lip 114) at a second end 104 is in contact with an outer surface 12 of the other component (in this case pipe 10).

Once the mechanical restraint members are in a desired position, straps 340 are tightened and/or secured using tether locks 345, as shown in FIG. 28, thereby affixing the mechanical restraint members to the piping components to be joined.

Once the mechanical restraint members 100 are affixed across the joint, a bonding agent is injected through injection openings 110 (e.g. using injection gun 55 as exemplified in FIG. 29), thereby bonding the mechanical restraint members 100 to the piping system components. A plurality of cutouts 320 in baskets 310 provide access to injection ports 110. It will be appreciated that, alternatively, each basket may have openings aligned with the openings of the mechanical restraint member that it receives. Once the mechanical restraint members have been bonded to the piping system components, assembly strap tool 300 may be removed and subsequently reused.

FIGS. 30 to 33 exemplify another embodiment of a method of applying a plurality of mechanical restraint members to secure two components of a piping system. First, once the piping components are positioned as desired with any desired sealing system, a plurality of mechanical restraint members 100 are positioned across the joint and may be affixed in position using any suitable means, e.g. a tape 130 and/or a temporary adhesive, as discussed previously. It will be appreciated that the mechanical restraint members may be positioned with or without the use of a template 200.

Figure 30:
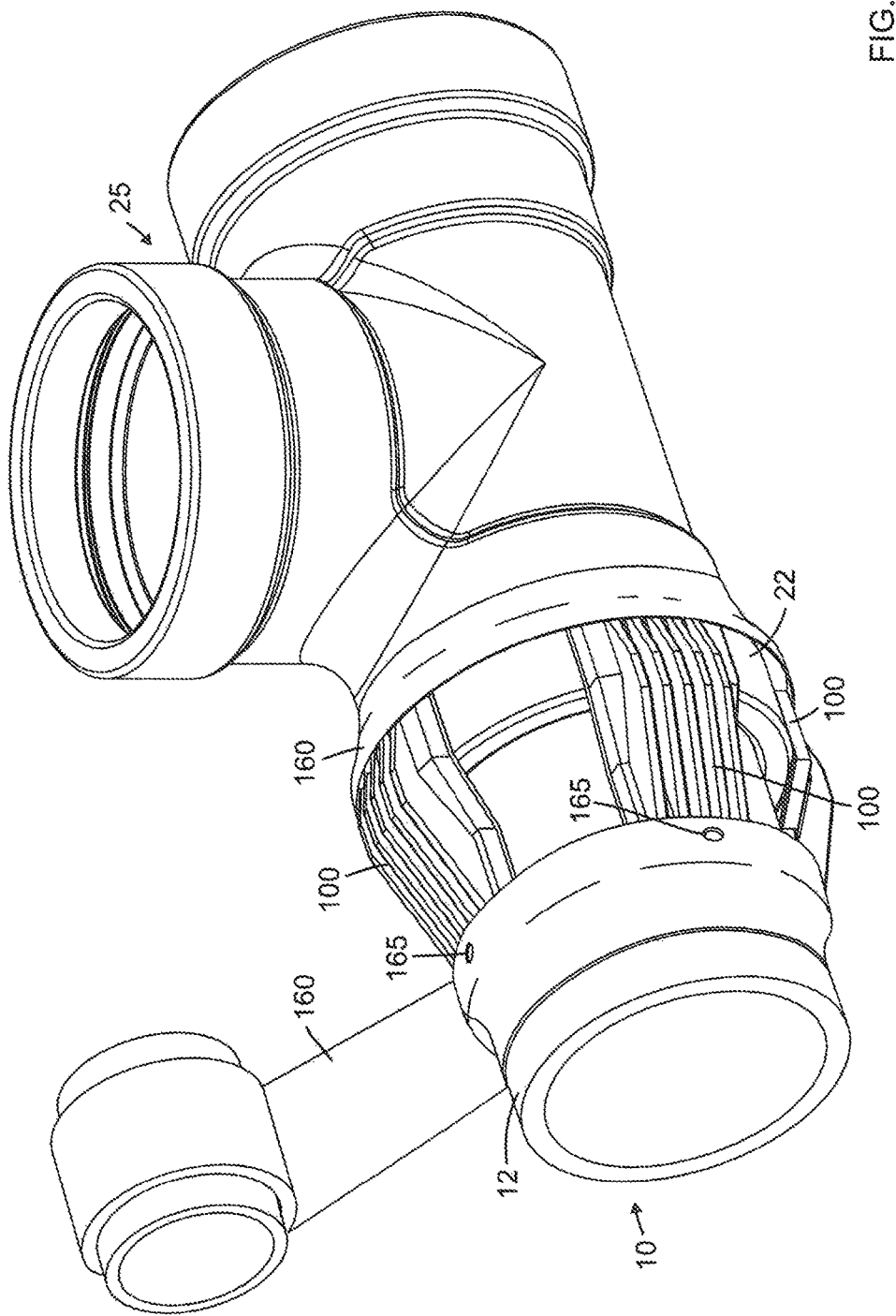
FIG. 30 is a perspective view of the pipe end and T-fitting of FIG. 13, with a plurality of mechanical restraint members positioned around the joint, with a securement wrap being applied to one end of the mechanical restraint members in accordance with another embodiment.

Once the mechanical restraint members are in a desired position, a securement wrap or film 160 is wrapped around one or both ends of the mechanical restraint members 100, as shown in FIG. 30, thereby affixing the mechanical restraint members to the piping components to be joined. Securement wrap 160 is preferably a plastic film, such as a stretch wrap (e.g. a linear low-density polyethylene wrap) with an elastic recovery, a shrink wrap (e.g. a polyolefin wrap) that shrinks in response to e.g. heat, and the like. The inner surface of securement wrap 160 is preferably configured to adhere to its outer surface (e.g. via the application of an adhesive to one or both sides of securement wrap 160, or as an inherent property of the material, such as where securement wrap 160 is a stretch wrap) so that if the wrap is being applied from a spool, once the ends of mechanical restraint member 100 have been wrapped, the securement wrap 160 can simply be cut and the free end adhered to the applied wrap. Alternatively, or additionally, the free end may be secured using a tape and/or an adhesive.

Figure 31:
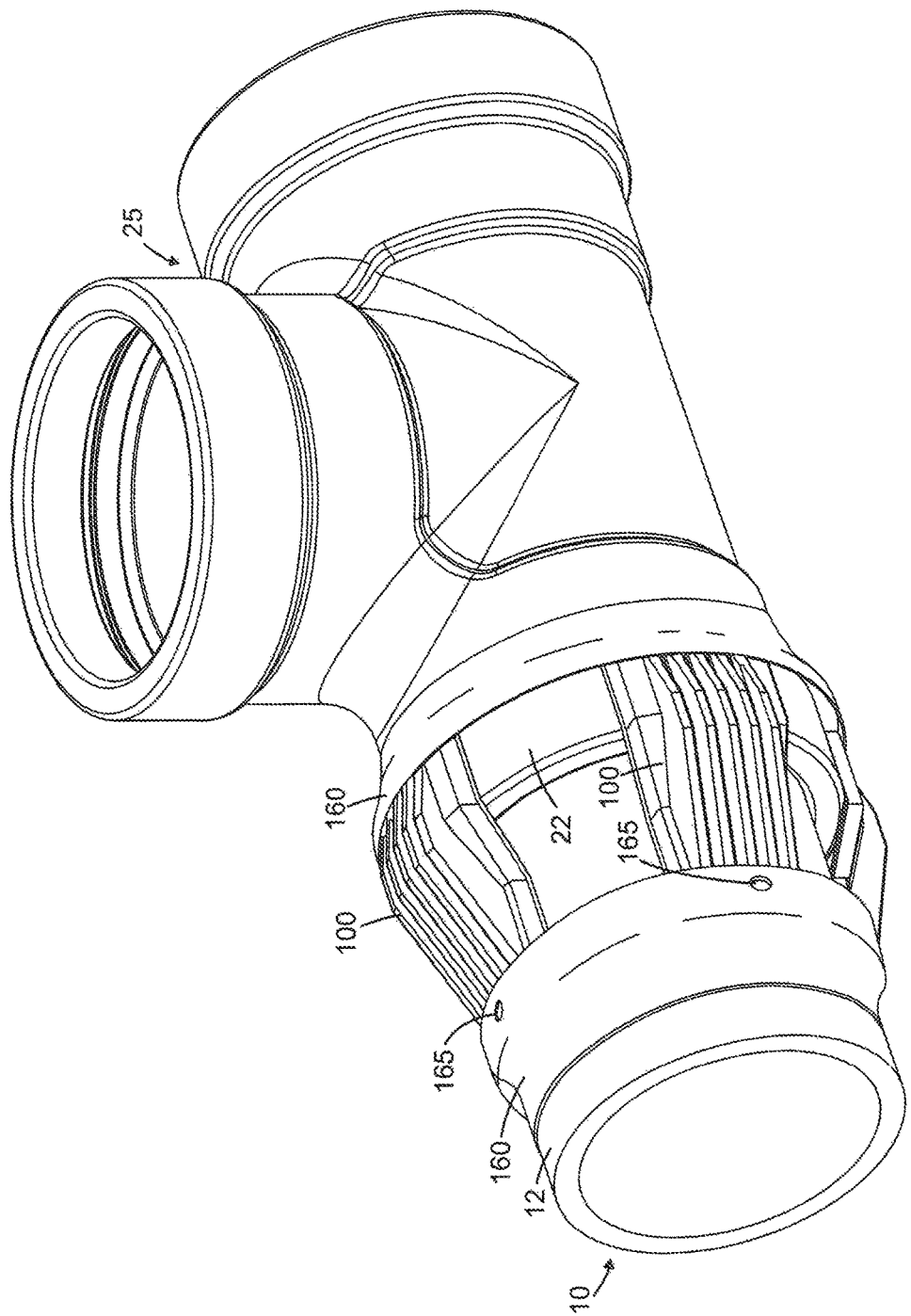
FIG. 31 is a perspective view of the pipe end and T-fitting of FIG. 30, with the mechanical restraint members affixed across the joint using the securement wrap.
Figure 32:
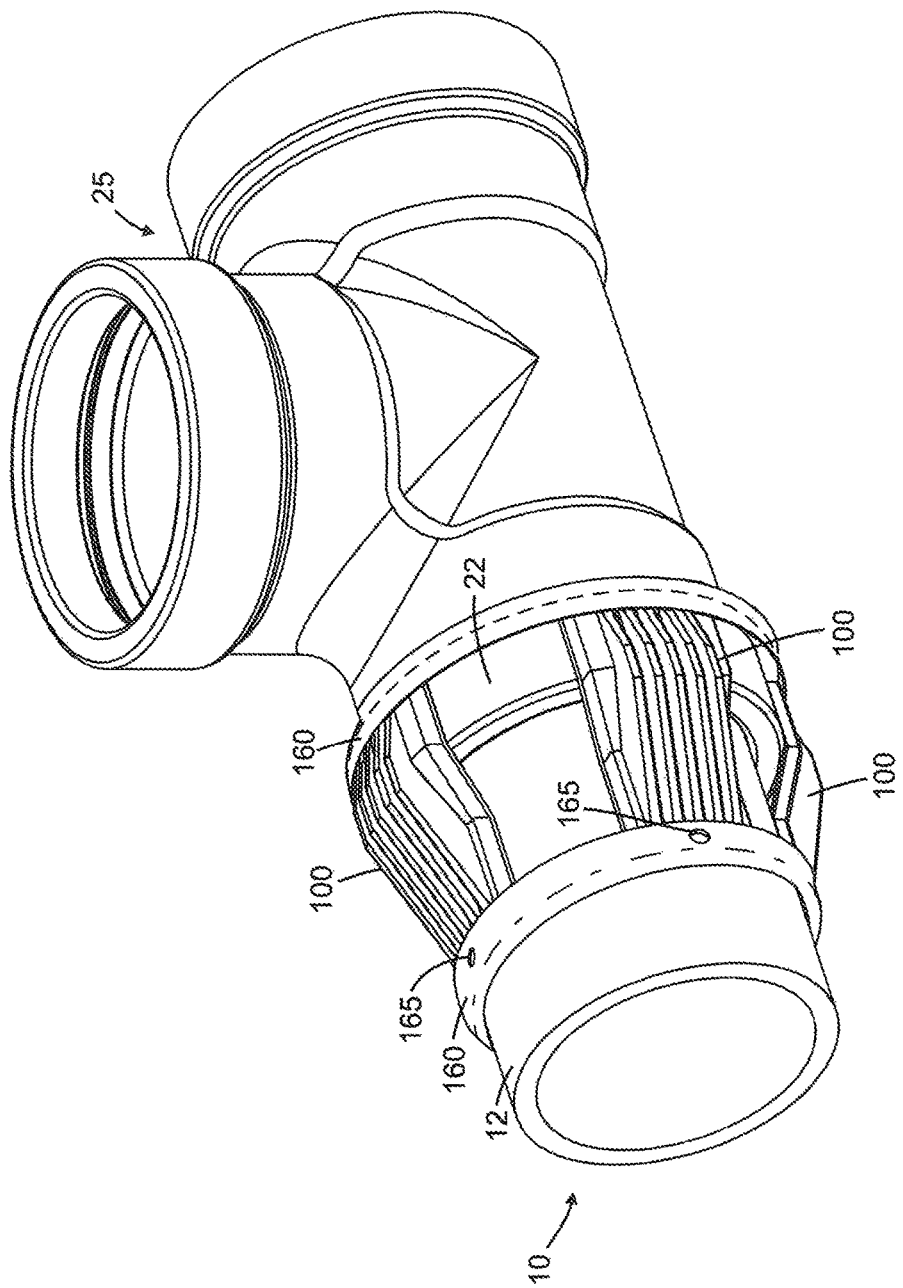
FIG. 32 is a perspective view of the pipe end and T-fitting of FIG. 31, with the mechanical restraint members affixed across the joint using a securement wrap of a different width.
Figure 33:
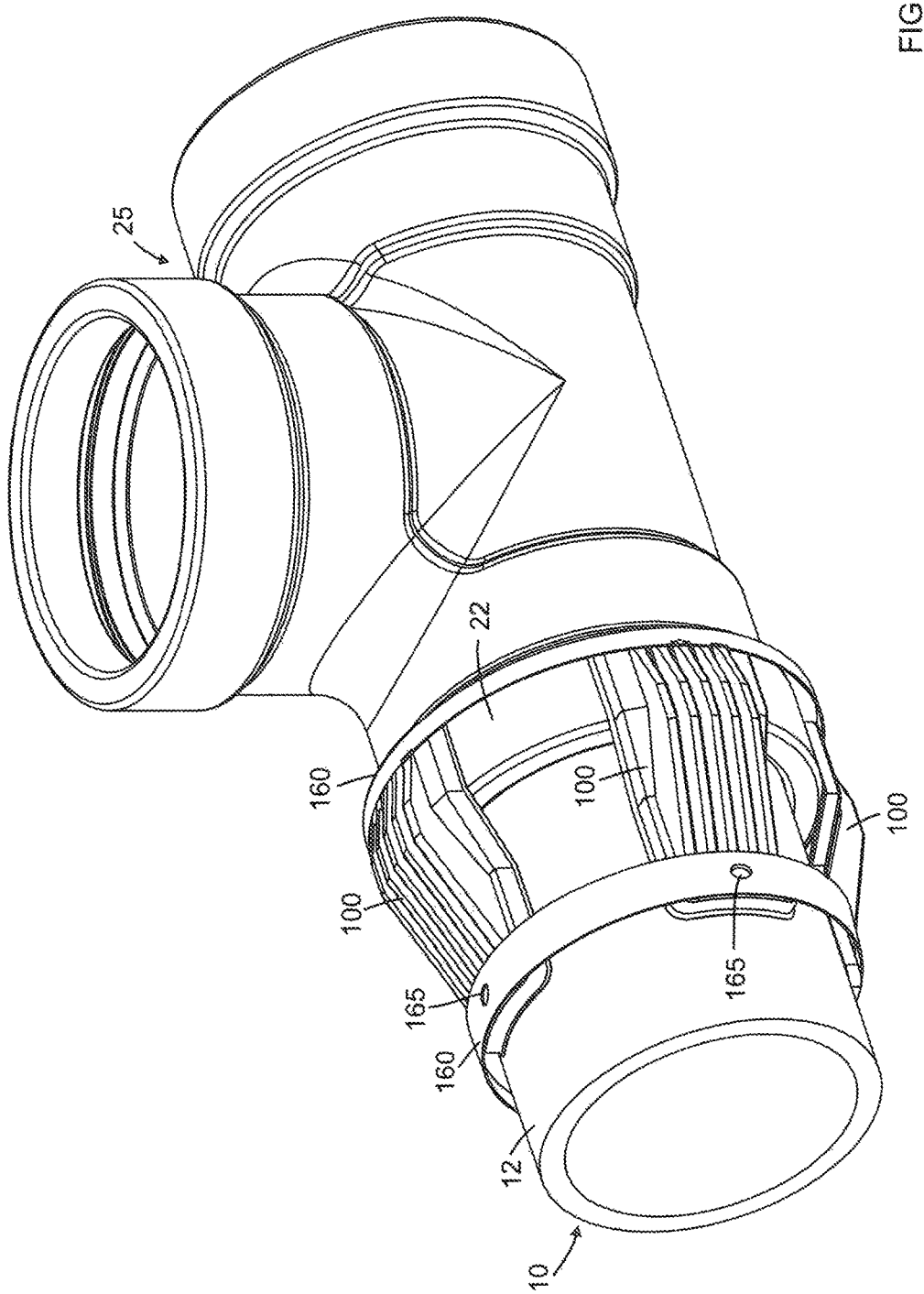
FIG. 33 is a perspective view of the pipe end and T-fitting of FIG. 31, with the mechanical restraint members affixed across the joint using a securement wrap that does not extend past the ends of the mechanical restraint members.

As shown in FIGS. 31 and 32, securement wrap 160 may be wrapped around the ends of the mechanical restraint members so that a portion of the width of the wrap 160 is in contact with the piping system component, while the remainder of the width of the wrap 160 overlies one of the ends of mechanical restraint member 100. Alternatively, as shown in FIG. 33, the entire width of wrap 160 may overlie an end of the mechanical restraint members 100. It will be appreciated that the width of securement wrap 160 may be varied; FIG. 31 illustrates a relatively wide wrap 160, while FIG. 32 shows a narrower wrap.

Once the mechanical restraint members 100 are affixed across the joint, a bonding agent is injected through injection openings 110, thereby bonding the mechanical restraint members 100 to the piping system components. A plurality of holes 165 in wrap provide access to injection ports 110; these holes 165 may be pre-cut into the wrap 160 before it is applied to the mechanical restraint members, or may be provided (e.g. punctured) in wrap 160 once it has been wrapped to affix the mechanical restraint members to the piping system components.

It will be appreciated that wrap 160 may be removed after the mechanical restraint members have been bonded to the piping system components. Alternatively, wrap 160 may be left in place. An advantage of leaving wrap 160 in place is that it may act to resist radial outward forces and/or movement of the components.

Other Variant Embodiments

FIGS. 34 to 37 exemplify another embodiment of a method of applying a plurality of mechanical restraint members to secure two components of a piping system and another variant of a mechanical restraint member. In the embodiments previously described, the plurality of mechanical restraint members are circumferentially spaced apart around the components of the piping system. Alternatively, the mechanical restraint members may overlie all (or substantially all) of the outer surfaces 12, 22 of pipe 10 and fitting 25 at the location of the joint.

Figure 34:
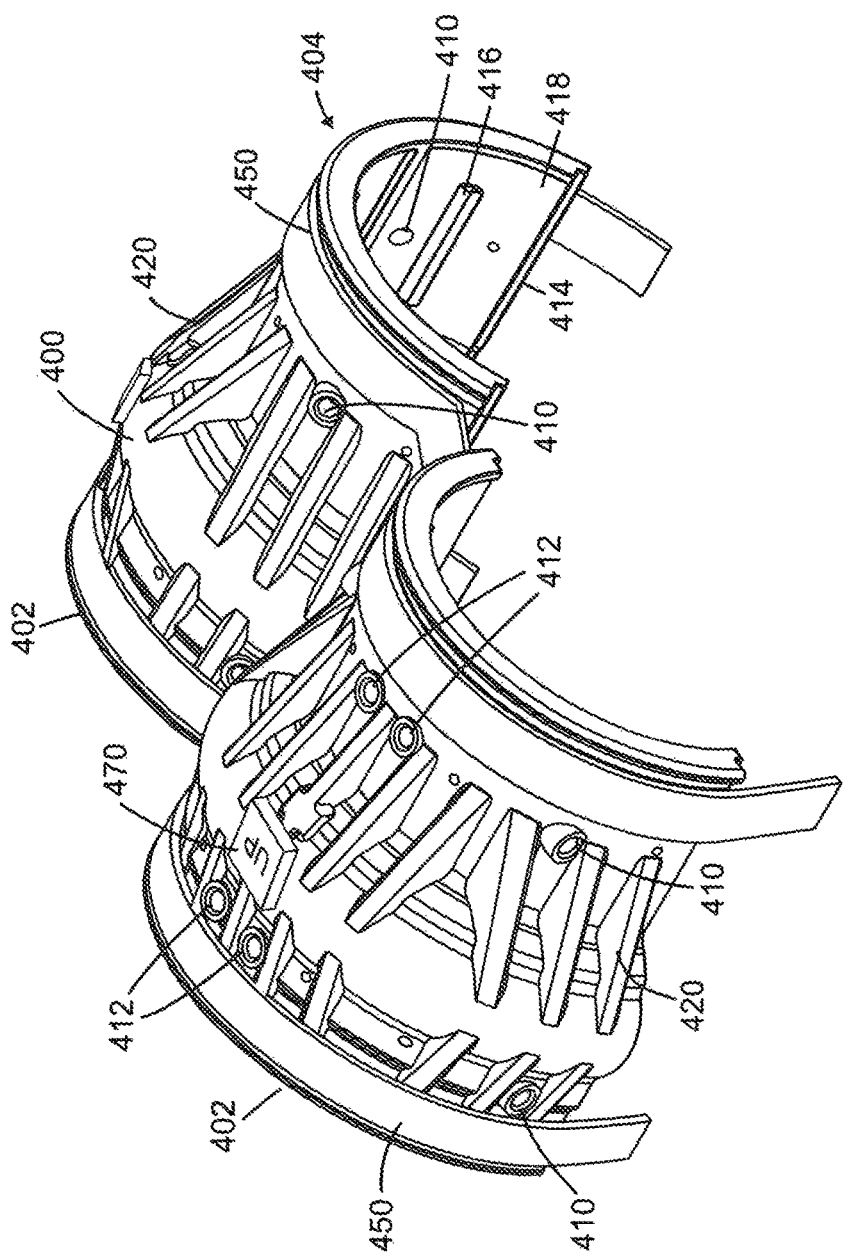
FIG. 34 is a perspective view of a pair of mechanical restraint members in accordance with another embodiment of this disclosure.

As shown in FIG. 34, mechanical restraint members 400 are generally semi-cylindrical, so that two mechanical restraint members 400 can overlie all (or substantially all) of the joint being secured. Mechanical restraint member 400 is otherwise similar to mechanical restraint member 100. Components similar to those in mechanical restraint member 100 have been similarly numbered, and will not be described further.

Mechanical restraint members 400 are illustrated as being joined together with a strap 450. It will be appreciated that mechanical restraint members 400 may be pivotally and/or flexibly attached by any suitable means, such as by an adhesive, welding, one or more hinges, etc.

It will also be appreciated that instead of two semi-circular mechanical restraint members 400, three or more mechanical restraint members 400 (each mechanical restraint member dimensioned to overlie about [(360°)/(# of mechanical restraint members)] of the pipe joint. For example, if five mechanical restraint members 400 are used, each would be configured to overlie about 72° of the circumference of the components of the piping system being joined.

Optionally, one or more of the mechanical restraint members 400 may be provided with a visible marking or other indication of a desired orientation during installation. This desired orientation may be based on, for example, a desired location of the injection ports 410 to facilitate access to the ports during bonding, particularly where the piping components are positioned in an environment with adjacent obstructions (e.g. if the piping components are in a ditch, with limited spacing between the piping components and the lower and/or side walls of the ditch). In the example illustrated in FIG. 34, one of the mechanical restraint members 400 is provided with a marking 470, which in this case indicates that that mechanical restraint member 400 should be positioned on the upper surface of the components of the piping system being joined, ensuring that injection ports 410 are accessible from the sides of the pipe joint, and not e.g. underneath the pipe.

Figure 35:
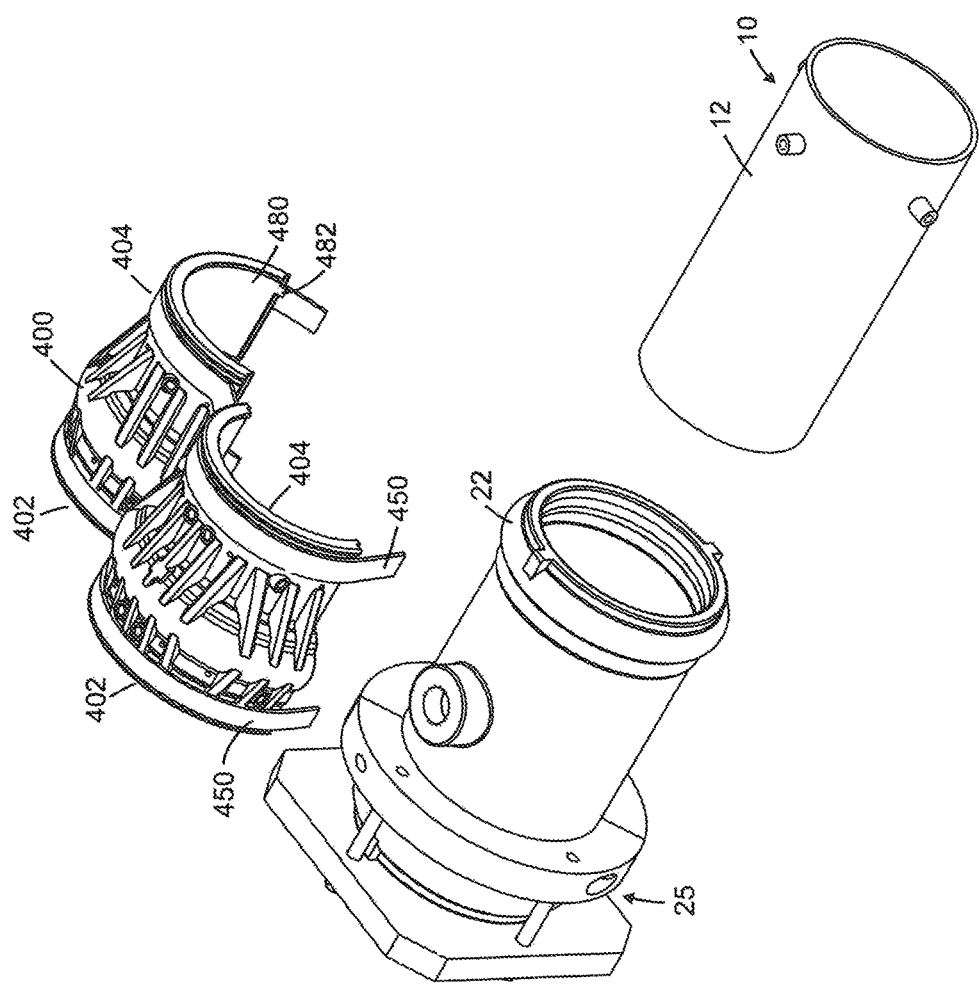
FIG. 35 is a perspective view of a pipe end positioned for installation in a T-fitting in accordance with another embodiment, with the mechanical restraint members of FIG. 34 positioned above the joint, and with a backing sheet applied to an inner surface of the mechanical restraint members.

Optionally, the inner surface of mechanical restraint members 400 may have an applied adhesive (e.g., a temporary adhesive or a tape, as discussed previously) to assist in positioning the mechanical restraint members 400. As illustrated in FIG. 35, the adhesive may be covered by a backing sheet or cover layer 480 to prevent the adhesive from coming into contact with objects and/or the ambient prior to the application of mechanical restraint member 400. Backing sheet 480 preferably has one or more tabs 482 to facilitate removal of the backing sheet 480.

Figure 36:
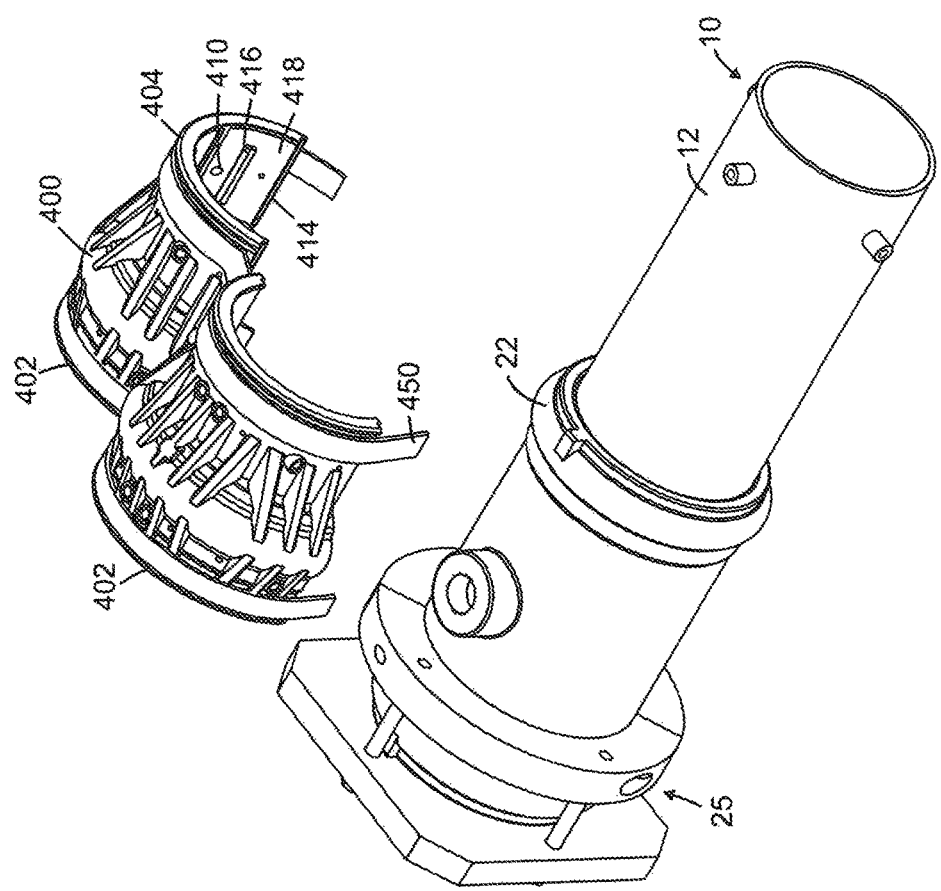
FIG. 36 is a perspective view of a pipe end and T-fitting of FIG. 35, with the pipe end inserted into the T-fitting, and with a positioning template positioned proximate the pipe end, with the backing sheet removed from the mechanical restraint members.

To install mechanical restraint members 400, as shown in FIGS. 35 and 36, once the piping components are positioned as desired with any desired sealing system, and the backing sheet 480 has been removed (as shown in FIG. 36), the mechanical restraint members 400 are closed about the joint, and the position of the mechanical restraint members 400 may be adjusted (if necessary) so that all or a portion of the inner surface of mechanical restraint members 400 (e.g. raised wall or lip 414) at a first end 402 is in contact with an outer surface 22 of one component (in this case fitting 25), and so that all or a portion of the of mechanical restraint members 400 (e.g. raised wall or lip 414) at a second end 404 is in contact with an outer surface 12 of the other component (in this case pipe 10).

Figure 37:
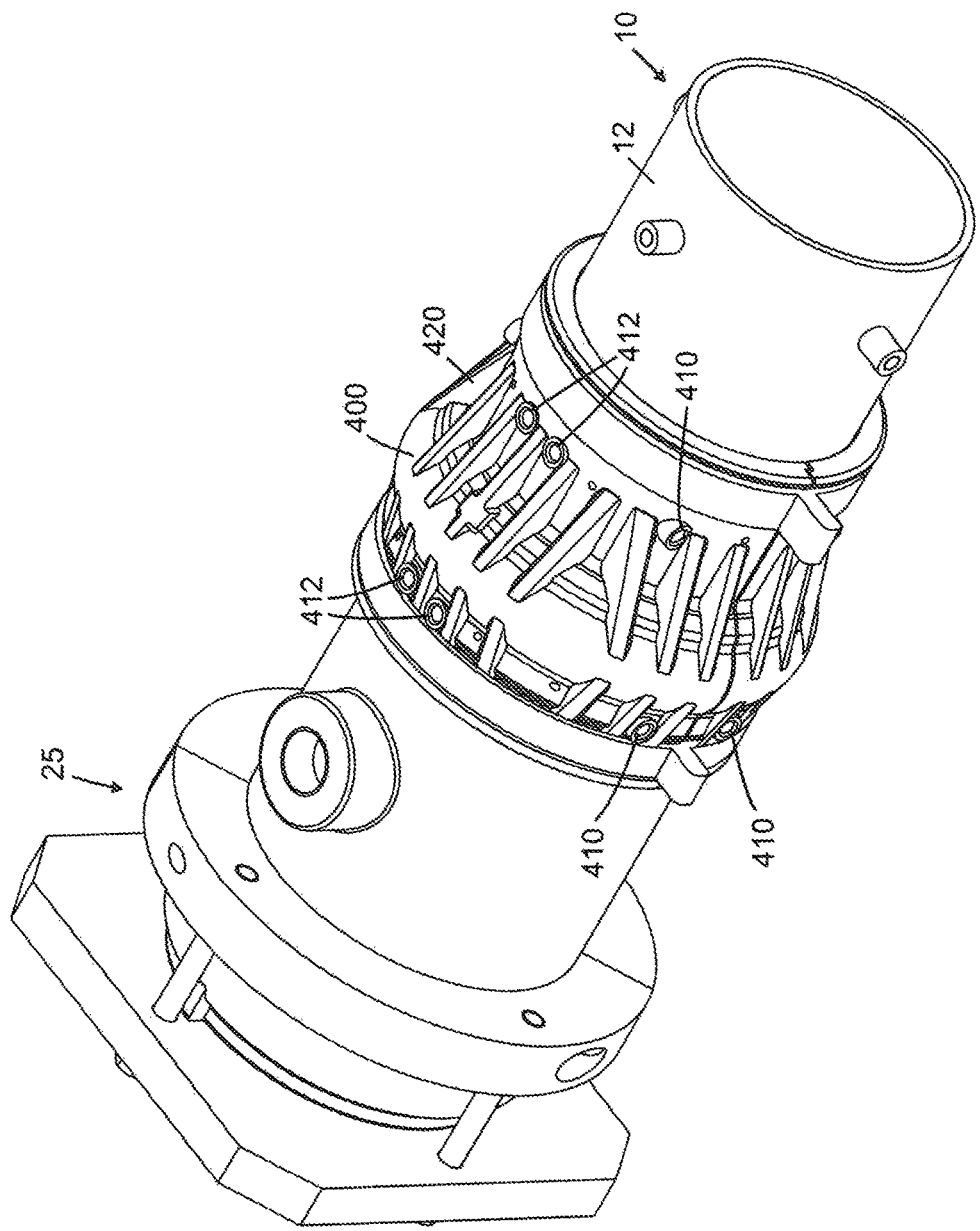
FIG. 37 is a perspective view of the pipe end and T-fitting of FIG. 36, with the mechanical restraint members of FIG. 34 affixed across the joint.

Once the mechanical restraint members 400 are in a desired position, the ends of straps 450 may be connected together and tightened (e.g. clamped) as shown in FIG. 37, thereby securing the mechanical restraint members to the piping components to be joined. A bonding agent may then be injected through injection openings 410, thereby bonding the mechanical restraint members 400 to the piping system components.

Figure 38:
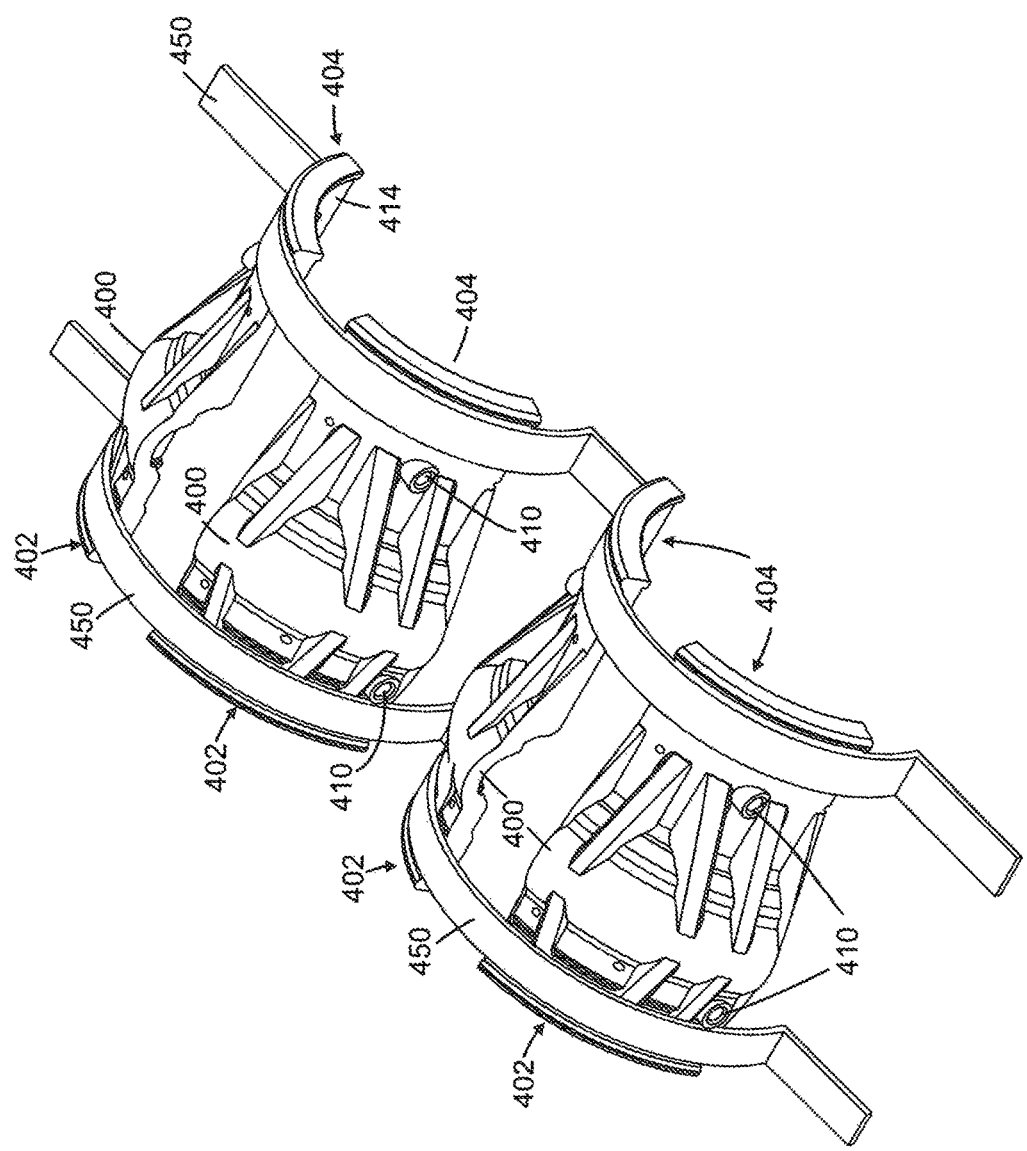
FIG. 38 is a perspective view of a plurality of mechanical restraint members in accordance with another embodiment of this disclosure.
Figure 39:
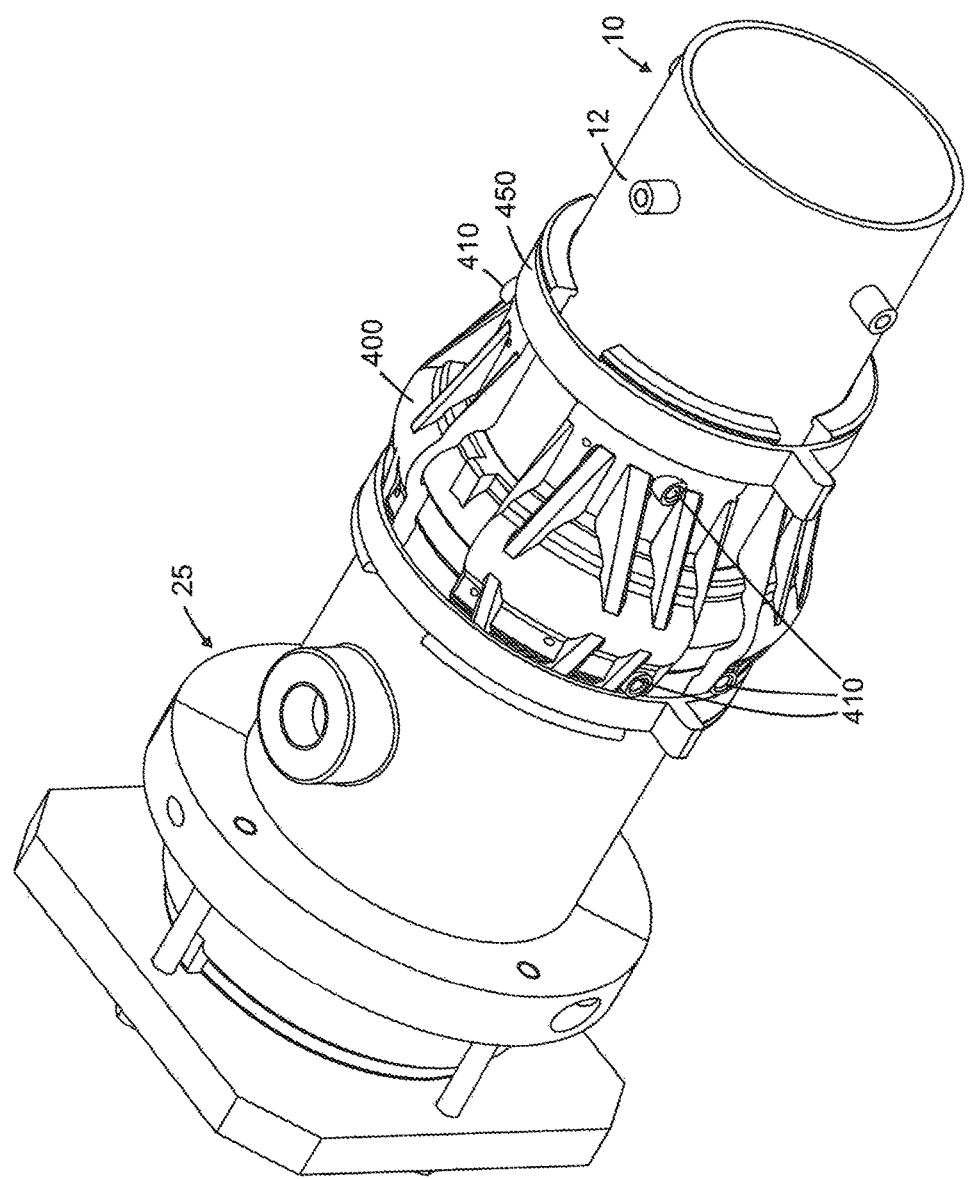
FIG. 39 is a perspective view of the pipe end and T-fitting of FIG. 36, with the mechanical restraint members of FIG. 38 affixed across the joint.

FIGS. 38 and 39 exemplify another embodiment of a method of applying a plurality of mechanical restraint members to secure two components of a piping system, in which the plurality of mechanical restraint members overlie the majority (but not all) of the outer surfaces 12, 22 of pipe 10 and fitting 25 at the location of the joint.

As shown in FIG. 38, mechanical restraint members 400' are dimensioned such that four mechanical restraint members 400' can overlie the majority of the joint being secured. Mechanical restraint member 400' is otherwise similar to mechanical restraint member 400. It will be appreciated that instead of four mechanical restraint members 400', two, three or five or more mechanical restraint members 400' may be used to secure a joint.

Figure 40:
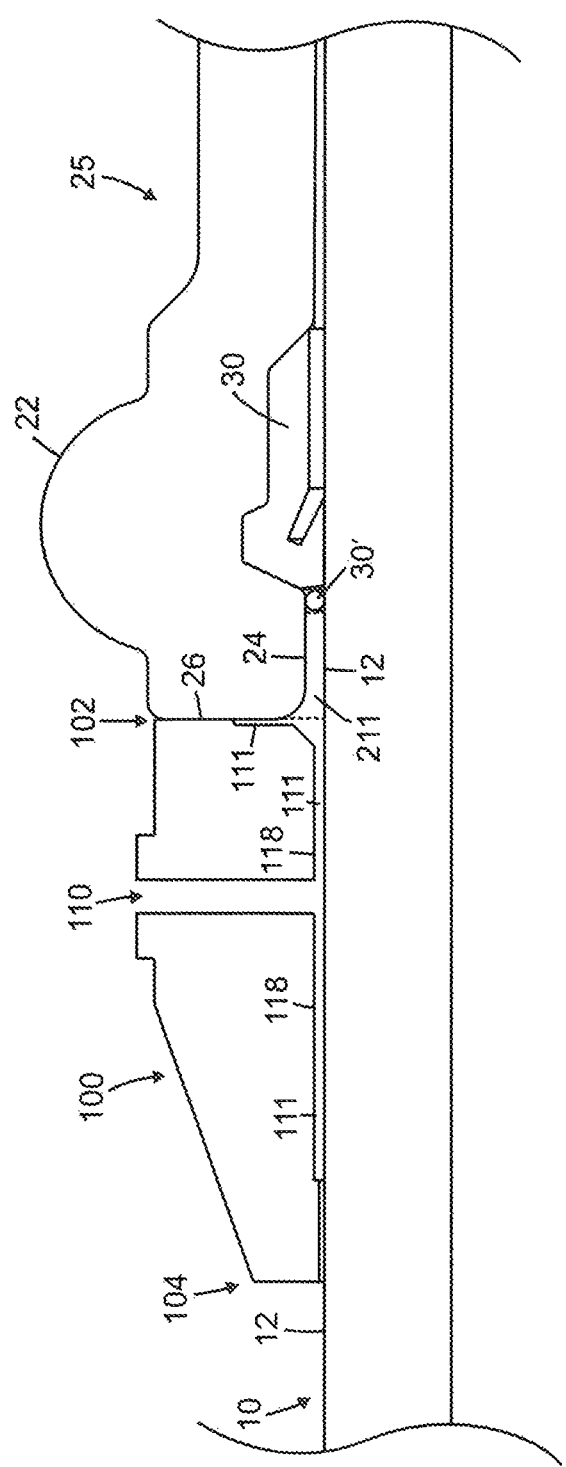
FIG. 40 is a cross-section view of a pipe end and a fitting secured using a mechanical restraint member in accordance with another embodiment of this disclosure.
Figure 41:
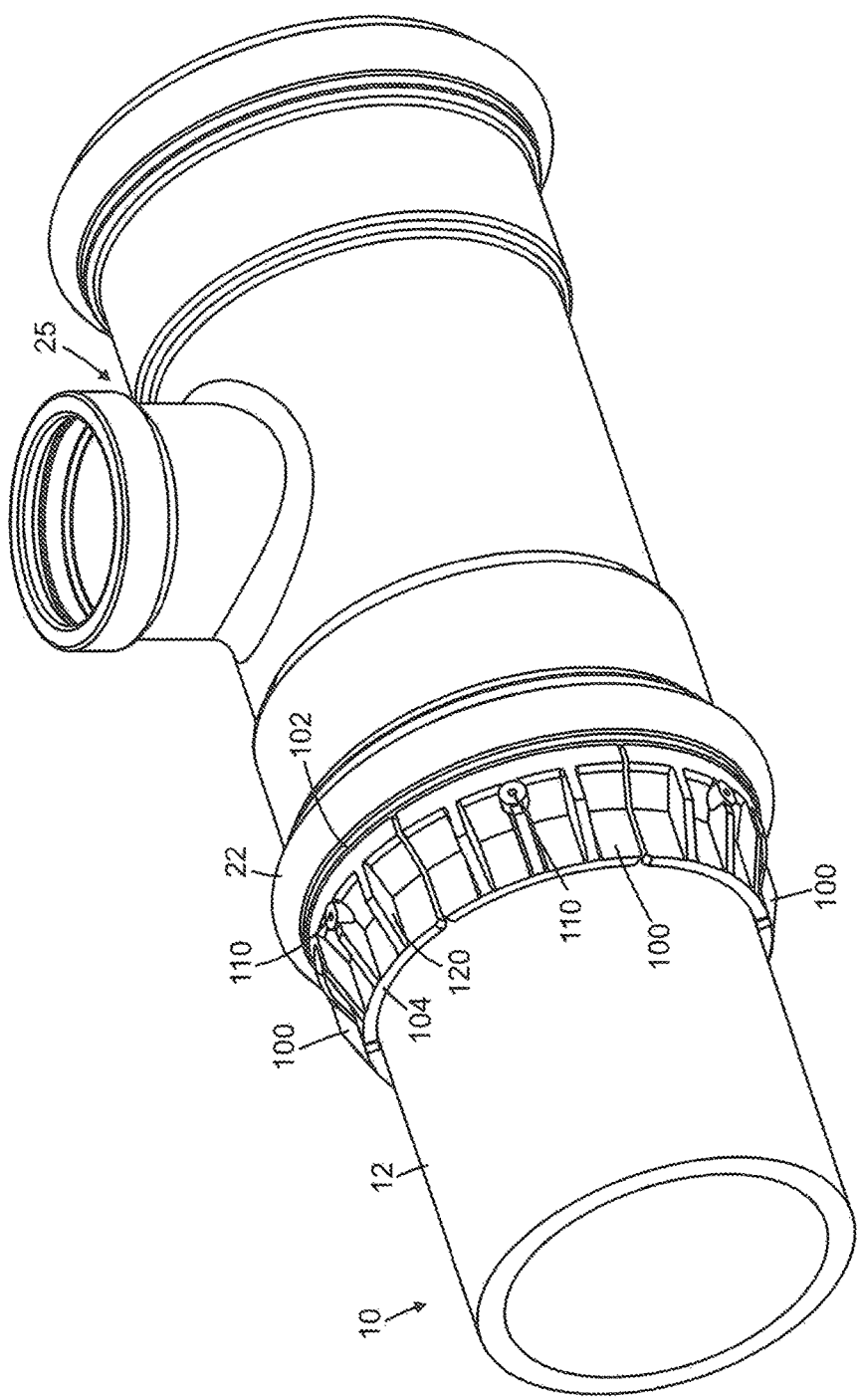
FIG. 41 is a perspective view of a pipe end and fitting secured with the mechanical restraint members of FIG. 40.

FIGS. 40 and 41 exemplify another embodiment of a method of applying a plurality of mechanical restraint members to secure two components of a piping system. In the embodiments previously described, the plurality of mechanical restraint members are bonded to one or more outer surfaces of each of the components of the piping system. Alternatively, the mechanical restraint members may also facilitate the injection of bonding agent between the outer surface of one component (e.g. outer surface 12 pipe 10) and an inner surface of the other component (e.g. inner surface 24 of fitting 25) at the location of the joint.

As shown in FIG. 40, mechanical restraint member 100 is dimensioned to provide a cavity 111 between outer surface 12 of pipe 10, and between end face 26 of fitting 25.

It will also be appreciated that in the configuration exemplified in FIG. 40, when bonding agent is injected into cavity 111 (e.g. via injection passage 110), some of the bonding agent may also flow into the gap between the outer surface 12 of pipe 10 and the inner surface 24 of fitting 25 (shown generally as region 211). Region 211 extends between the components up to gasket 30, or up to an optional secondary gasket 30' which may be provided to restrict the flow of bonding agent.

Bonding at least a portion of the inner surface of one conduit section with the outer surface of the other conduit section (e.g. by injecting bonding agent into region 211) may have one or more advantages. For example, this may increase the total bonded contact area between the outer surface 12 of pipe end 10 and: (i) the inner surface 118 of mechanical restraint member 100, and (ii) the inner surface 24 of fitting 25, when compared to embodiments where the outer surface 12 of pipe end 10 is only bonded to the inner surface 118 of mechanical restraint member 100. An increase in bonded contact area may strengthen the joint formed by mechanical restraint member 100. Alternatively, providing bonding agent in region 211 may allow the same bonded contact area to be provided using a mechanical restraint member 100 having a longitudinally shorter bonding area between mechanical restraint member 100 and outer surface 12 of pipe end 10, as the bonded area in region 211 may allow the mechanical restraint member 100 to be shortened in the longitudinal direction by a proportional amount.

As shown in FIG. 41, once the mechanical restraint members 100 exemplified in FIG. 40 are positioned and/or affixed across the joint, a bonding agent is injected through injection openings 110 into cavity 111 and into region 211, thereby bonding the mechanical restraint members 100 to the piping system components, and bonding the piping system components to each other. It will be appreciated that if the mechanical restraint members are positioned adjacent each other, then the bonding agent may extend in an annular band around the outer surface 12 of conduit 10 (e.g., the bonding agent in region 211 may be annular). Alternatively, if the mechanical restraint members are spaced apart, then the bonding agent will be provided at discrete locations in region 211 around the outer surface 12 of conduit 10.

Figure 42:
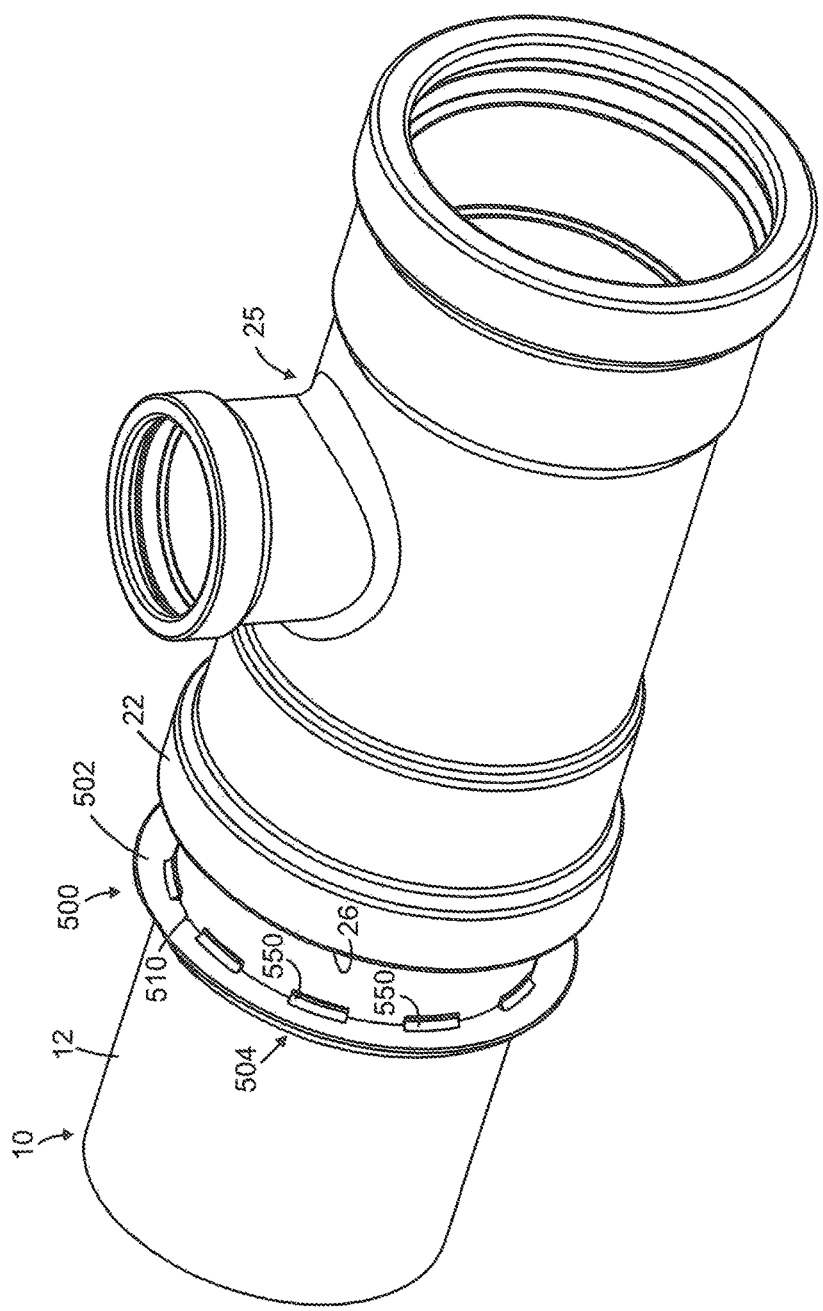
FIG. 42 is a perspective view of a pipe end and fitting with a mechanical restraint member in accordance with another embodiment of this disclosure positioned around the pipe end.
Figure 43A:
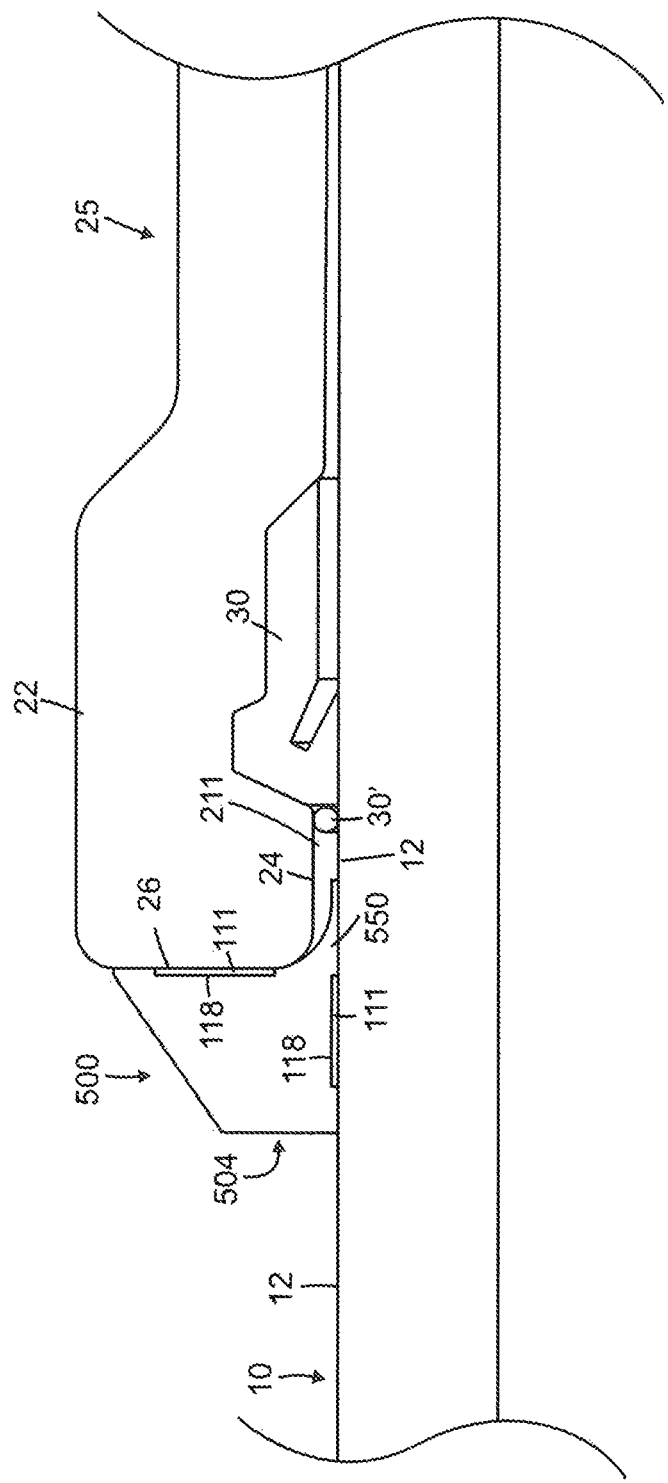
FIG. 43A is a cross-section view of a pipe end and a fitting secured using the mechanical restraint member of FIG. 42, taken through the center of a longitudinally extending tab of the mechanical restraint member.
Figure 43B:
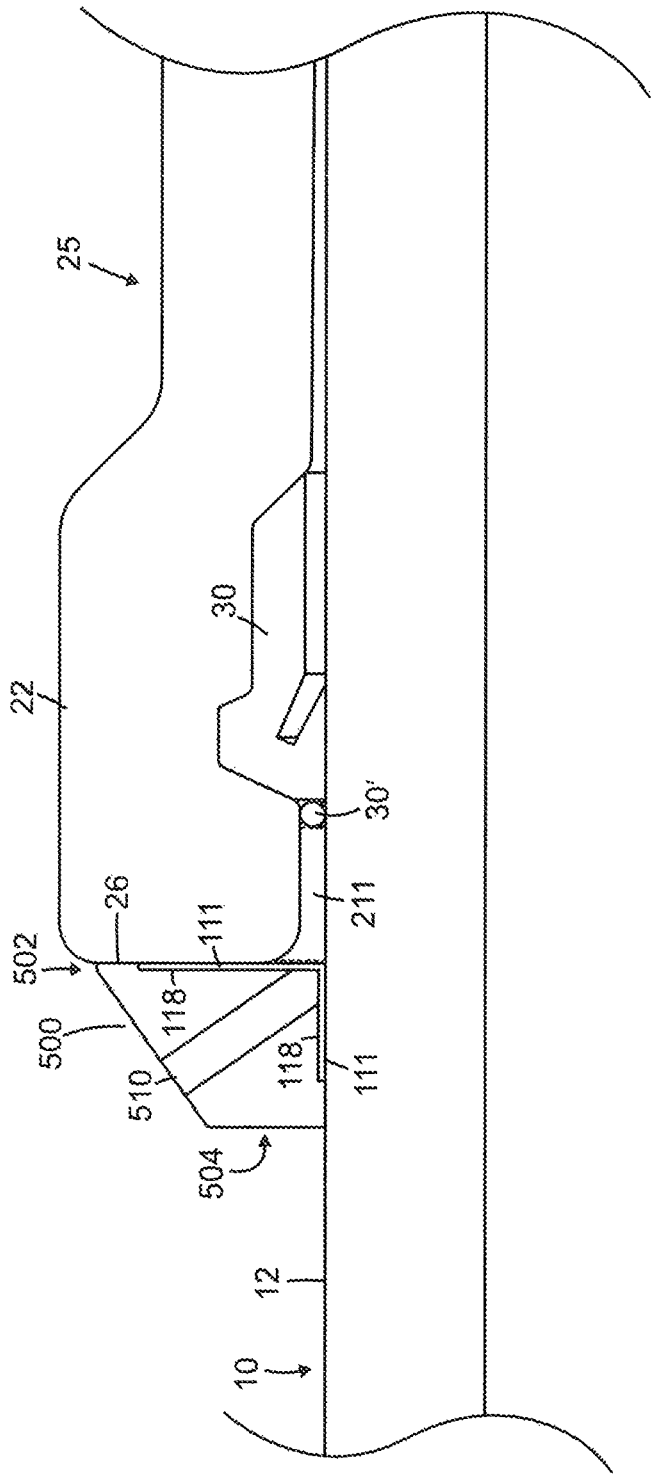
FIG. 43B is a cross-section view of a pipe end and a fitting secured using the mechanical restraint member of FIG. 42, taken through the center of an injection passage positioned between a pair of longitudinally extending tabs of the mechanical restraint member.

FIGS. 42-44 exemplify another embodiment of a method of securing two components of a piping system using a mechanical restraint member. Similar to the embodiments described with reference to FIGS. 40 and 41, this embodiment may facilitate the injection of bonding agent between the outer surface of one component and an inner surface of the other component at the location of the joint, as well as into cavities provided on an outer surface of one of the conduits (e.g., the conduit inserted into the mouth of another conduit) and an end face of a conduit (e.g., the end face of the mouth of the receiving conduit). As exemplified, a single mechanical restraint member 500 may be used.

As shown in FIGS. 42 and 44, mechanical restraint member 500 is an annular member, dimensioned to be slideably positionable around one component of the piping system (in this case, pipe end 10). It will be appreciated that mechanical restraint member 500 need not extend around the entire perimeter of the component (e.g. it may be a generally C shaped member). Alternatively, it will be appreciated that a plurality of discrete mechanical restraint members may be used as exemplified previously.

Mechanical restraint member 500 has a plurality of longitudinaly extending flanges or tabs 550 extending from a first end 502 of mechanical restraint member 500. As shown in FIG. 43A, tabs 550 are dimensioned to fit between an outer surface of one component (e.g. outer surface 12 pipe 10) and an inner surface of the other component (e.g. inner surface 24 of fitting 25) when the first end 502 of mechanical restraint member 500 is positioned against that other component (e.g. end face 26 of fitting 25). Thus, tabs 550 encourage at least a minimum level of alignment (e.g. axial concentricity) of the pipe components being joined. Put another way, tabs 550 act as spacers to ensure that a gap is provided between surfaces 12 and 24, the gap being at least as thick as tabs 550, thereby ensuring that region 211 has at least a minimum height (i.e. a minimum distance between surfaces 12 and 24) around the entire joint.

As shown in FIG. 43A, an injection passage 510 is preferably positioned between a pair of tabs 550, thereby facilitating the injection of bonding agent into annular region 211 and into one or more cavities 111 defined between mechanical restraint member 500 and the outer surfaces of the piping system components being joined.

As shown in FIG. 44, once the mechanical restraint member 500 is positioned and/or affixed against the components being joined, a bonding agent is injected through injection opening 510 into cavity 111 and into region 211, thereby bonding the mechanical restraint members 100 to the piping system components, and bonding the piping system components to each other. While only one injection passage 510 is illustrated, it will be appreciated that two or more injection passages 510 may be provided.

According to each of these methods, each mechanical restraint member 100 is positioned such that cavity or cavities 111 are closed by the outer surfaces 12, 22 of the piping system components. A temporary adhesive may be used to affix the mechanical restraint members in position. This permits the mechanical restraint members to be positioned and repositioned as may be needed. The mechanical restraint members may then be secured in position by, e.g., one or more tether straps 140, securement wraps 160 or other member that extends around the outer surface of the mechanical restraint members, so as to provide sufficient securement such that the mechanical restraint members remain in position during the injection of the bonding agent.

It will be appreciated that, if the bonding agent is pre-applied in the cavities, an exterior securement member may not be required.

It will be appreciated that an exterior securement member may be provided only on one longitudinal end of the mechanical restraint members.

It will be appreciated that an exterior securement member may be left in place after the mechanical restraint members have been bonded to the piping system components to resist radial outward forces and/or movement of the components, which may prevent the components and/or the seal between them from leaking, cracking, or otherwise becoming damaged due to radial components of forces imposed by the internal hydraulic pressure of fluid being conveyed and/or forces imposed by a flowing mass of liquid within the piping system when it changes direction.

It will also be appreciated that, if an exterior securement member is used, then a temporary adhesive may not be used to affix the mechanical restraint members in position.

In an alternative embodiment (not shown), two piping system components may be restrained by providing (e.g. bonding) one or more exterior securement members to the outer surfaces of each of the piping system components using a bonding agent, and these may then be used to secure one or more mechanical restraint members in position. The bonding agent may then be used to secure the mechanical restraint members in position.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method for joining a first conduit section having a longitudinally extending open first end and an inner surface with a second conduit section having a longitudinally extending end and an outer surface, the method comprising:
   a) inserting a first end of the second conduit section in the open first end of the first conduit section thereby defining a joint between the first conduit section and the second conduit section;
   b) directly bonding at least a portion of the inner surface of the first conduit section to at least a portion of the outer surface of the second conduit section thereby forming a fluid tight seal between the first and second conduit sections;
   c) wrapping a mechanical restraint member around the joint; and,
   d) securing a first end of the mechanical restraint member to an outer surface of the first conduit section and securing a second end of the mechanical restraint member to the outer surface of the second conduit section whereby the mechanical restraint member extends from the outer surface of the first conduit section to the outer surface of the second conduit section
   wherein the mechanical restraint member comprises a plurality of discrete longitudinally extending members positioned around a perimeter of the joint wherein the longitudinally extending members are spaced apart from each other, each longitudinally extending member having a first member end and a second member end, wherein the first member end and the second member end are longitudinally spaced apart, and each member end has an outer surface and an inner surface,
   wherein, when the mechanical restraint member is attached to the first and second conduits, the first member end has a first cavity defined between the inner surface of the first member end and the outer surface of the first conduit section and the second member end has a second cavity defined between the inner surface of the second member end and the outer surface of the second conduit section, each cavity having a flow channel formed by at least one inner wall and an injection opening is provided at one end of the flow channel and an outlet opening is provided on another end of the flow channel and the method further comprises injecting a bonding agent into each of the first cavity and the second cavity.

2. The method of claim 1 wherein the portion of the inner surface of the first conduit section is bonded to the portion of the outer surface of the second conduit section at a plurality of discrete locations around a circumference of the second conduit section.

3. The method of claim 1 wherein the portion of the inner surface of the first conduit section is bonded to the portion of the outer surface of the second conduit section in a continuous band around a circumference of the second conduit section.

4. The method of claim 1 further comprising inserting a spacer between the inner surface of the first conduit section and the outer surface of the second conduit section.

5. The method of claim 1 wherein the step of forming a fluid tight seal comprises inserting a sealing member between the first and second conduit sections.

6. The method of claim 1 wherein each cavity has longitudinally extending side walls and the injection opening is provided on one of the longitudinally extending side walls.

7. The method of claim 1 wherein the inner wall of each cavity comprises a concave channel provided therein.

8. The method of claim 1 wherein the injection opening is provided on a side wall and the outlet opening is provided on the same side wall as the injection opening.

9. The method of claim 1 wherein each cavity is surrounded by a perimeter wall and a compressible material is provided on an exposed surface of the perimeter wall of each cavity.

10. The method of claim 1 wherein step (b) comprises bonding the mechanical restraint member to the first and second conduit sections along generally longitudinally extending portions of the outer surface of the first and second conduit sections and bonding the mechanical restraint member to a portion of the outer surface of at least one of the first and second conduit sections that extends at an angle to the generally longitudinally extending portions.

11. The method of claim 10 wherein the mechanical restraint member is bonded to the portion of the outer surface of the at least one of the first and second conduit sections that extend generally transverse to the generally longitudinally extending portions.

12. The method of claim 1 wherein each cavity is surrounded by a perimeter wall and an inner surface of the perimeter wall at the first end of the mechanical restraint member is substantially planar, an inner surface of the perimeter wall at the second end of the mechanical restraint member is substantially planar, and wherein the substantially planar surfaces are offset from each other in a plane transverse to a plane of the inner surface of the perimeter wall at the first end.

13. The method of claim 12 wherein the mechanical restraint member has a longitudinal axis, and wherein each cavity has transversely extending sidewalls that has an arcuate profile when viewed along the longitudinal axis.

14. The method of claim 13 wherein the transversely extending sidewalls of the first cavity at the first member end have a different arcuate profile than the transversely extending sidewalls of the second cavity at the second member end.

* * * * *